United States Patent
Nguyen et al.

(10) Patent No.: US 6,825,941 B1
(45) Date of Patent: Nov. 30, 2004

(54) MODULAR AND EXTENSIBLE PRINTER DEVICE DRIVER AND TEXT BASED METHOD FOR CHARACTERIZING PRINTER DEVICES FOR USE THEREWITH

(75) Inventors: Amanda Nguyen, Bothell, WA (US); Ganesh Pandey, Kirkland, WA (US); Alvin Scholten, Redmond, WA (US); Zhanbing Wu, Bellevue, WA (US); Eigo Shimizu, Seattle, WA (US); Peter Wong, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 09/157,895

(22) Filed: Sep. 21, 1998

(51) Int. Cl.[7] .............................. G06F 3/12; G06F 13/00
(52) U.S. Cl. ...................................... 358/1.15; 358/1.13
(58) Field of Search .............................. 358/1.15, 1.11, 358/1.13

(56) References Cited

U.S. PATENT DOCUMENTS

| | | | |
|---|---|---|---|
| 5,604,843 A | 2/1997 | Shaw et al. .................. | 395/101 |
| 5,619,635 A | * 4/1997 | Millman et al. ............ | 395/768 |

OTHER PUBLICATIONS

*The Unicode Standard Version 2.0*, The Unicode Consortium, Addison–Wesley Press, 1997.

* cited by examiner

Primary Examiner—Gabriel Garcia
Assistant Examiner—Douglas Tran
(74) Attorney, Agent, or Firm—Leydig, Voit & Mayer, Ltd.

(57) ABSTRACT

A modular Universal Printer Driver is provided which dramatically improves the extensibility of the driver architecture and the support for printer features. This driver operates in conjunction with OEM developed minidrivers which utilize the text based Generic Printer Description (GPD) format of the instant invention. The universal driver allows the GPD text based minidrivers to add and define new features introduced by the printer OEM. The universal driver also allows the GPD minidriver to modify, add, or replace the standard user interface provided by the universal driver. The universal driver and the text based GPD minidrivers are included in a computer system for outputting data to an output device, such as a printer. This system includes an application program which invokes a plurality of graphics device interface functions to control the sending of data to the printer. Within the system, a graphics device interface invokes device driver functions for controlling the outputting of data. The text based minidriver contains a characterization of the output device, and an implementation of device specific device driver functions invoked by the graphic device interface. This text based minidriver outputs this data to the universal driver. This universal driver incorporates the text based characterization passed by the minidriver. The universal driver implements the device specific driver functions and controls the outputting of data to the printer in accordance with the incorporated text based characterization.

22 Claims, 16 Drawing Sheets

MODULAR AND EXTENSIBLE PRINTER DEVICE DRIVER AND TEXT BASED METHOD FOR CHARACTERIZING PRINTER DEVICES FOR USE THEREWITH

FIELD OF THE INVENTION

This invention relates to output device characterization methods and device drivers, and more particularly to a method for characterizing and customizing output printer devices and a driver architecture for use therewith.

BACKGROUND OF THE INVENTION

The phenomenal growth of the computer industry in both the commercial and consumer market segments has spawned an increasing number of companies who provide both software and peripheral hardware products to the market. It becomes the job of the operating system designer to coordinate and ensure compatibility of data flow within, between, and without of the computers on which this software and peripheral hardware is installed. To ensure that the literally thousands of application programs are able to output their data to peripheral printing devices, the operating system designers have developed a graphics device interface (GDI). The GDI affects the output data from the application programs by invoking functions which allow access to printing devices in a device-independent manner. This GDI provides a uniform interface between the literally thousands of application programs and the output peripheral devices to which these programs wish to send data to be printed.

While the GDI provides a uniform interface from the application programs, it is unable to produce actual printer control commands which are capable of driving each of the hundreds of different models of printer devices available on the market. In the past each individual printer $10_1, 10_2, \ldots 10_n$ required its own individual printer driver $12_1, 12_2, \ldots 12_n$ as illustrated in FIG. 15. These individual printer drivers $12_1, 12_2, \ldots 12_n$, implemented various control functions for their respective printers based upon the standardized output from the graphics device interface 14. These standard functions included initialization, information, output, attribute, mode, and escape. While each of these individual monolithic printer drivers provided the necessary interface to allow proper driving of each individual printer model, they were typically were several megabytes in size. The need for such extensive printer dirvers impacted not only the individual printer manufacturer, but also the individual computer system 16 into which it was to be installed. Specifically, a computer system 16 would require a significant amount of memory dedicated to the storage of individual printer drivers if more then one printer were to be supported by the system 16. This obviously limited the space remaining within the computer system 16 for storage of application programs 18. In addition, because of the complexity of printer drivers, different printer drivers tend to have various quirks (or bugs) that cause great headache for application developers. Consistent, high-quaility printing is a luxury for users. For the same reason, many printer devices do not have drivers for everyOS platoform. For example, many popular consumer printers dondo nott have Windows NT drivers.

For the purpose of easing the development of Windows printer drivers and improving the driver quality across the board, engineers at Microsoft developed a new universal printer driver to be included within the Windows operating system. This new universal printer driver included a standard set of device driver functions based on device characterization which is needed to drive the individual printers. As illustrated in FIG. 16, the computer system 19 implementing the universal driver still utilizes the graphics device interface (GDI) 14 as a means of coordinating the output from the various application programs. The GDI 14 function invokes the device driver functions of a minidriver $17_1, 17_2, \ldots 17_n$ which correspond to and contain the characterization of individual printer devices $10_1, 10_2, \ldots 10_n$.

The difference in this system from that illustrated in FIG. 15 is that the operating system includes the unidriver 15 which includes a standard set of device driver functions required to drive a printing device. In this way, the individual printer manufactures need not provide this coding. In order to actually drive any particular printer device, the unidriver 15 must receive individual printer characterization information from a selected minidriver $17_1$. The universal driver 15 then stores this device characterization data, preferably within a device context, to be used by the device driver functions of the universal driver 15. Other device driver functions of the minidriver $17_1$ forward their invocation to the universal driver 15 by invoking an analogous function of the universal driver 15. In this way, the printer hardware manufacturer needs only supply a relatively small minidriver which contains characterization data for their particular device and which will be used by the unidriver 15 to actually drive the printer. This unidriver/minidriver system is described in U.S. Pat. No. 5,604,843 to Shaw et al. for METHOD AND SYSTEM FOR INTERFACING WITH A COMPUTER OUTPUT DEVICE, the disclosure and teachings of which are incorporated herein by reference.

While this system provides significant advantages over the prior operating system requirement of large monolithic printer drivers, the inability of this universal driver 15 to support continued advances from printer manufacturers, and the difficulty of coding and debugging the required minidriver format has become apparent. Specifically, the architecture of this prior universal printer driver could be likened to a database into which individual printer characterization data from the minidriver must be directly mapped. As such, new features supplied by the printer manufacturers could not be supported by the universal driver because there was nowhere within the universal driver for this new function to be mapped. A new feature could only be implemented if its support were included in a new release of a new version of the universal driver. However, new version releases often lagged quite significantly behind the introduction of new printers having advanced features. As a result of this inability to map new features into the existing universal driver, many original equipment manufacturers (OEMs) reverted to writing their own monolithic printer drivers to allow full support functionality of their new printing devices.

Additionally, the structure of the universal driver required that the minidrivers be of a specific binary format. Since development and coding of these binary minidrivers was difficult at best, Microsoft introduced a graphical user interface (GUI) tool called unitool to aid the software engineer in writing these minidrivers. This unitool driven generic printer characterization (GPC) was intended to provide an application independent way of describing the total functionality and capabilities of one or more printers supplied by a printer OEM. Once this GPC file had been written using the unitool GUI, it was then compiled and linked into a resource DLL. This compiled and linked resource DLL was then installed for use by the universal driver. Unfortunately, if a bug were discovered in the GPC file, the entire process would need to be repeated. This process included accessing the unitool GUI, modifying the binary GPC characterization file, recompiling and relinking this GPC file into the resource DLL, and then reinstalling this compiled and linked resource DLL for use by the unidriver. This significantly impacted the time required for debugging and development of the individual minidrivers.

Because of its rigid architecture, the universal driver provided very limited support for any customization, and that which was provided was only in the areas of command callback, raster dump, filter graphics, and font related callbacks. Additionally, the universal printer driver architecture was neither modular nor extensible further limiting its ability to allow for customized support of new features. This resulted in a master-slave relationship between the universal driver and the minidriver, constraining the support and functionality to its implemented structure and supported features. This resulted in a great deal of consternation within the printer OEM community.

SUMMARY OF THE INVENTION

The universal printer driver (Unidrv5) of the instant invention is a new 32-bit universal printer driver developed by Microsoft for initial implementation in Windows NT5.0. Compared to previous versions of a universal printer driver in various Windows operating systems (OS), the Unidrv5 of the instant invention is designed to dramatically improve the extensibility of the driver architecture and the support for printer features. A key new feature of the instant invention includes a new printer data description format called Generic Printer Description (GPD). Compared to GPC/UNITOOL described above, GPD offers much improved capability to describe printer devices. The architecture of Unidrv5 also supports extensive original equipment manufacturer (OEM) customization interface. This extensibility allows OEM's to plug in special code for customizing the UI, bitmap handling, font and text processing, and general printer control.

The Unidrv5 of the instant invention utilizes a flexible modular architecture which allows enhancements to the driver to be implemented to provide better support for more varieties of output devices, and to improve the output quality, ease of use and performance without the necessity for redesign. Examples include the support for a generic font installer interface, limited vector printing capability, using page content analysis to improve printing quality and performance, and offering more flexibility in UI customization including complete UI functionality replacement.

Generic Printer Description (GPD) is a new text-based printer description file format for creating minidrivers that run with the Unidrv5 of the instant invention. In a preferred embodiment of the instant invention, there is one GPD file for each printer model. But different printers can share GPD data by using the *Include capability in GPD. A GPD file describes all the features on a printer and how to display and invoke these features. It also contains printer-specific commands and attributes that enable the Unidrv5 to generate the correct printer-ready output data. Compared to the binary-based GPC file format used by previous versions of UNIDRV, GPD offers several key advantages.

First, GPD provides support for generic features. This allows adding support for new printer features (such as Print Density, Stapling, etc.) without any change to the Unidrv5. Second, GPD also provides support for custom help. A printer vendor can specify a custom help file to augment the default help file, which would provide users specific context-sensitive help for generic features and other features. Third, GPD provides support for installable options. This allows minidriver developers to specify which printer options are installable. The driver UI asks the user which options are actually installed and allow users to select only those that are installed. Fourth, GPD provides support for various types of constraints. This allows minidriver developers to specify constraints between option selections, such as "the combination of 720 dpi, plain paper and color printing is an invalid configuration", or constraints between option installations, or constraints between option installation and option selection.

Additionally, GPD provides support for value dependency. This generic mechanism gives minidriver developers great power to describe any kind of dependency between printer commands and/or attributes. Combined with the new command parameter specification scheme, it significantly reduces the need to write command callback code. Further, GPD provides a new command parameter specification scheme. In GPC, each printing command (ex. x-move-to) has a pre-defined list of parameters and there are only limited ways (as supported in EXTCD structure) to manipulate the actual parameter values. GPD, however, allows each command to pick any parameters from a pool of standard variables (essentially a partial snapshot of the printer and driver state that the Unidrv5 maintains). GPD also supports arbitrary arithmetic manipulation of these parameters. Additionally, GPD provides great extensibility. It is very easy to add new features, printer commands or attributes to the GPD file without any impact on Unidrv5. The GPD parser parses the data into a single binary format and Unidrv5 never needs to worry about different binary formats, as was the case with GPC revisions.

The driver user interface (UI) of the Unidrv5 utilizes a similar tree view UI as used by Windows NT4.0 printer drivers, as shown in FIG. 7. Standard Properties are included on the layout and paper/quality property sheets illustrated in FIG. 8.

The driver UI, implemented as the user-mode DRIVERUI.DLL, displays all printer features specified in GPD, whether they are standard or generic. For generic features, they are displayed in the order listed in the GPD file generally. The driver UI also enforces the constraints specified in the GPD file. It checks on installable options and allow users to select only those options that are actually installed.

The Unidrv5 of the instant invention preferably is titled UNIDRV.DLL. It handles all DDI calls and generates printer-specific output data based on information in the given GPD file. Unidrv5 also handles raster printing. Unidrv5 supports a large set of printer raster data formats. This includes all types of dot-matrix printers, serial ink jet printers, and page printers. Both monochrome and color printing are supported. In fact, the minidriver developer can define multiple color printing modes in GPD, for example, one with driver rendering in 4 bpp format and another in 24 bpp format. Unidrv5 performs the necessary data conversion and/or halftone to generate raster data ready for the printer. The GPD file can specify what is the default printing mode. It could even suppress the monochrome mode if desired. Unidrv5 also provides color matching support by using ICM2.0 on the host machine. Printer vendors can provide ICC color profiles for their printers and make the association via the printer's .INF file.

Unidrv5 supports device-resident fonts, font cartridges, host-based bitmap fonts, and host-based TrueType fonts. Unidrv5 has built-in support for incremental downloading of TrueType fonts as PCL soft fonts (bitmap and maybe outline). It also supports OEM plug-in's to download TrueType fonts in other printer-specific formats. Unidrv5 also supports FE fonts and wide device fonts (i.e. fonts with more than 256 glyphs). It also supports font substitution (substituting device fonts for system TrueType fonts for better performance).

In the render mode, OEM's can write a plug-in module to extend the capability of Unidrv5 in the various areas. First, an OEM can extend the capability of Unidrv5 in the area of raster data processing. Unidrv5 allows OEM's to hook out raster processing at two levels: at the band level where Unidrv5 would pass a whole band of data; or at the scanline level where Unidrv5 would pass a buffer of raster data for feeding one print head pass. OEM's can also define custom halftone patterns (up to 256×256 size) in the GPD file. Unidrv5 passes the information of the currently selected halftone pattern to GDI which uses it instead of a standard system halftone pattern. Second, an OEM can extend the capability of Unidrv5 in the area of font downloading. Unidrv5 supports an extensible font downloading interface to allow minidrivers to support non-PCL formats. Additionally, an OEM can extend the capability of Unidrv5 in the area of command callbacks. For any GPD command, the minidriver can specify a callback id in order to gain control at the point of emitting that particular command. This essentially gives minidrivers an extensive set of injection points where they can influence the output data stream dynamically. OEM's can also hook out any DDI function for state checking and information caching.

Unidrv5 color support has many improvements compared to previous drivers. First, Unidrv5 adds support for dithered text and allows the driver to query the original brush color at DrvTextOut time. This enables Unidrv5 to achieve WYSIWYG effect on text colors, resulting in better text quality. Unidrv5 also has improved halftone support by improving the standard set of halftone patterns for better output. quality. Unidrv5 also adds support for custom halftone patterns provided by the printer driver. Additionally, Unidrv5 also supports custom image processing. Unidrv5 allows OEM's to plug in special code for optimized halftone and/or color correction at the backend. Unidrv5 supports ICM2.0 for better color output quality.

Figure 1:
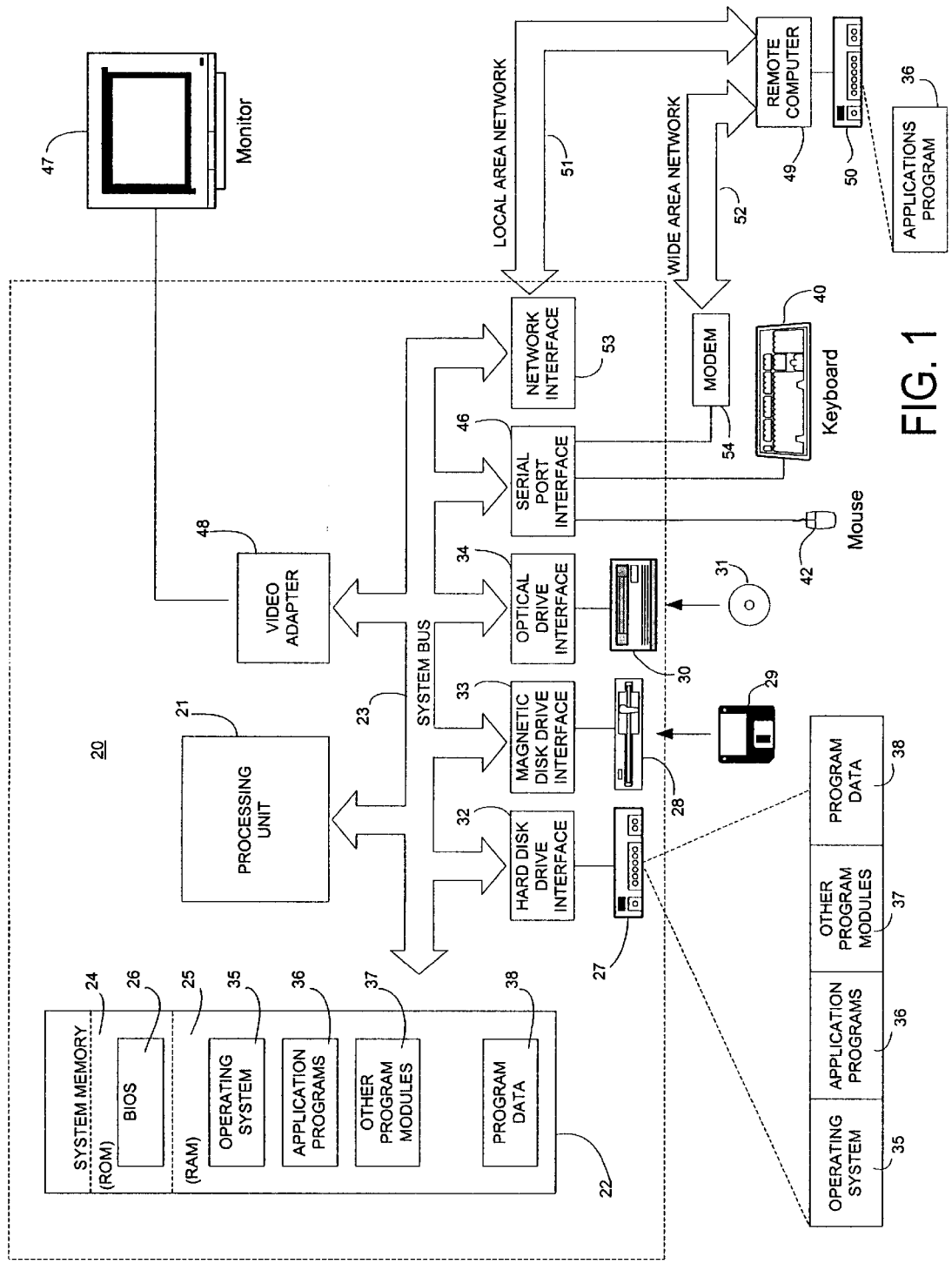
FIG. 1 is a simplified block diagram illustrating an exemplary operating environment suitable for application of the instant invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DESCRIPTION OF THE PREFERRED EMBODIMENT

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, microprocessor systems, microprocessor-based or programmable computer electronics, network PCs, minicomputers, mainframe computers, and the like. The invention may also be practiced and distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purposed computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during startup, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other date for the personal computer 20. Although the exemplary environment described herein employs a hard disk, a removable magnetic disk 29 and a removable optical disk 31, it should be appreciated by those skilled in the art that other types of computer readable media which can store data that is accessible by the computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system busy 23 via an interface, such as a video adapter 48. In addition to the monitor, personal computers typical include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device, or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN working environment, the personal computer 20 is connected to the local network 51 through a network interface or adapter 53. When used in a WAN networking environment, the personal computer 20 typically includes a modem 54 or other means for establishing communications over the y-area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing the communications link between the computers may be used.

Figure 2:
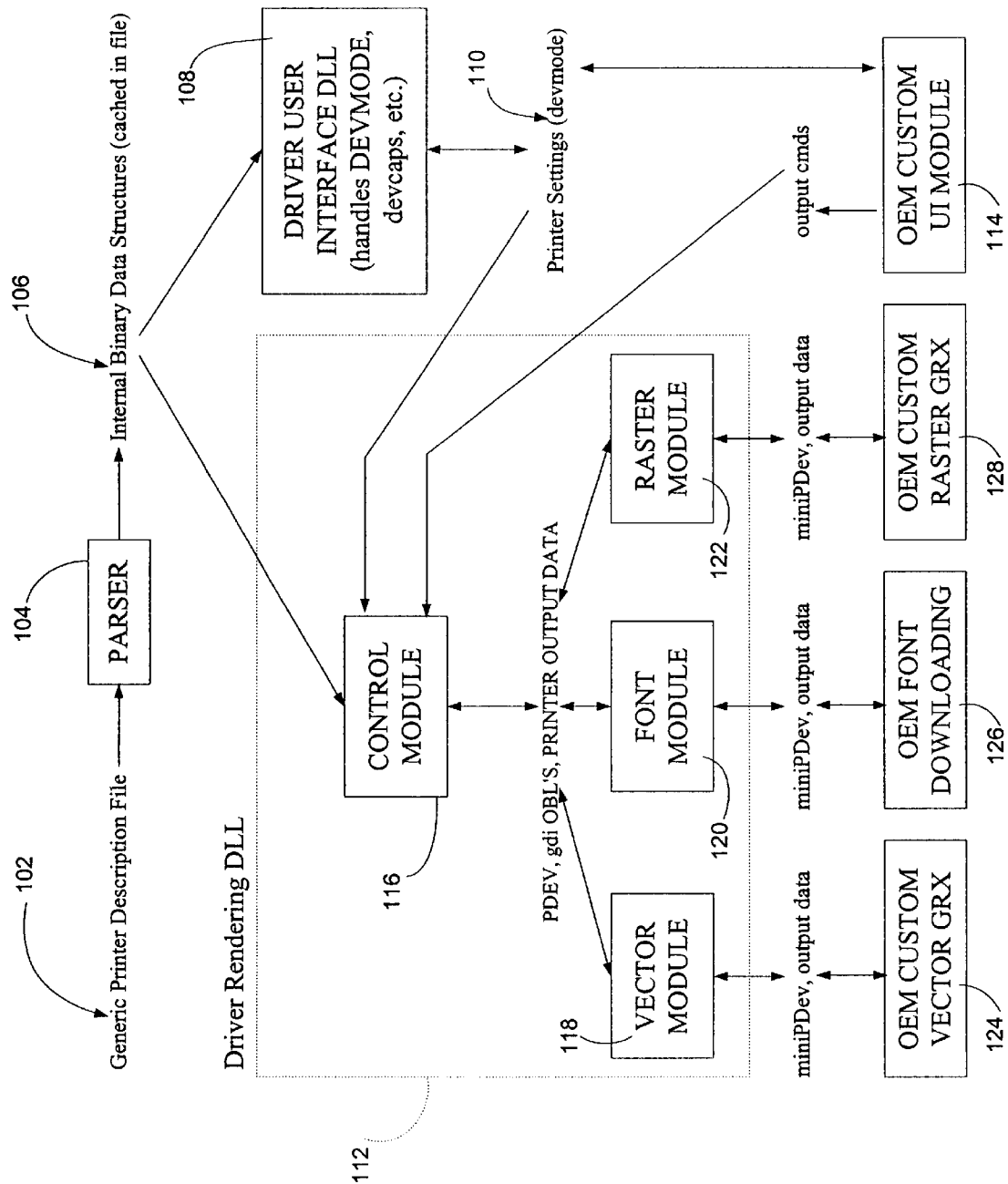
FIG. 2 is a simplified block diagram illustrating data flow between components of an embodiment of the instant invention.

Turning now to the Universal Printer Driver (Unidrv5) of the instant invention, this Unidrv5 allows original equipment manufacturers (OEMs) to provide customization components (plugins) to modify the standard driver user interface and the output data stream sent to the printer. A simplified view of the data flow between the components of the universal printer driver of the instant invention and the OEM developed generic printer description (GPD) file is illustrated in FIG. 2. As may be seen from this figure, the driver architecture is open, i.e. the OEMs are allowed to plug-in custom functions wherever appropriate. This allows this architecture to be very extensible, allowing OEMs to support new printers and features between additional releases of the universal driver of the instant invention. Additionally, because most OEM presumably know better how to generate outputs tailored for their specific printers, better graphics and text quality also results, especially for ink jet printers. As may be seen from FIG. 2 the driver architecture is modular. This modular driver architecture is composed of multiple well-defined modules based on functionality. Any particular printer may use some or all of these modules' functionality as desired by the OEM.

As may be seen from FIG. 2, the design of the generic printer description (GPD) file 102 has a significant influence on the driver's flexibility. A detailed description of the GPD format, features, and advantages is included more fully hereinbelow. The GPD parser 104 parses the text based GPD file into internal binary data structures 106. The parser 104 is called only once when the printer is installed. After that, the driver accesses the cached binary data structures 106 unless the GPD file 102 has since been updated. The parser 104 also generates helpful error and warning messages for improper GPD files. Note that the GPDfile format continues to evolve over time to order to provide new printing functionality.

The driver user interface (UI) DLL 108 is a separate DLL that handles all device capability/setting queries and presents the graphical user interface (GUI). This DLL 108 interacts with the user and applications, and it provides the device and document settings 110 for the rendering driver 112. The support provided by the driver user interface DLL of OEM custom UII 14 exists at two different levels. First, the OEM adds custom items and/or makes minor changes to the standard UI. In this scenario the driver controls the UI and its overall look and feel. Second, the OEM may replace the functionality of the UI DLL 108 completely for cases where the first level of support cannot accommodate the OEM requirements.

The driver rendering control 112 covers all DDI calls and font-related calls. The driver rendering DLL's 112 primary function is to convert DDI calls into printer-specific data and send them to the spooler. This DLL 112 also handles information queries regarding the device surface, such as fonts, brushes, colors, etc.

The control module 116 within the driver rendering DLL 112 initializes pdev and sets up the dispatch for rendering DDI calls based on the printer's capability. It also handles banding and dumping raster data to the printer. Both banding and non-banding methods are supported.

Also within the driver rendering DLL 112, a font module 120, and a raster module 122. The font module 120 enumerates device fonts and handles TextOut DDI, including downloading true type fonts to the printer. This module 120 will handle interfacing with font downloaders. In 4 bpp mode bitmap fonts should be half-toned as well, i.e. more than eight colors. The driver also supports gray scale fonts, including both bitmap fonts and device fonts. The raster module 122 handles all bitmap related DDI calls, whether the target is a compatible memory bitmap, or the banding buffer, or the printer's surface. This module 122 also supports OEM custom half-toning and color correction DLL interface. It also supports OEM custom dithering patterns.

Figure 3:
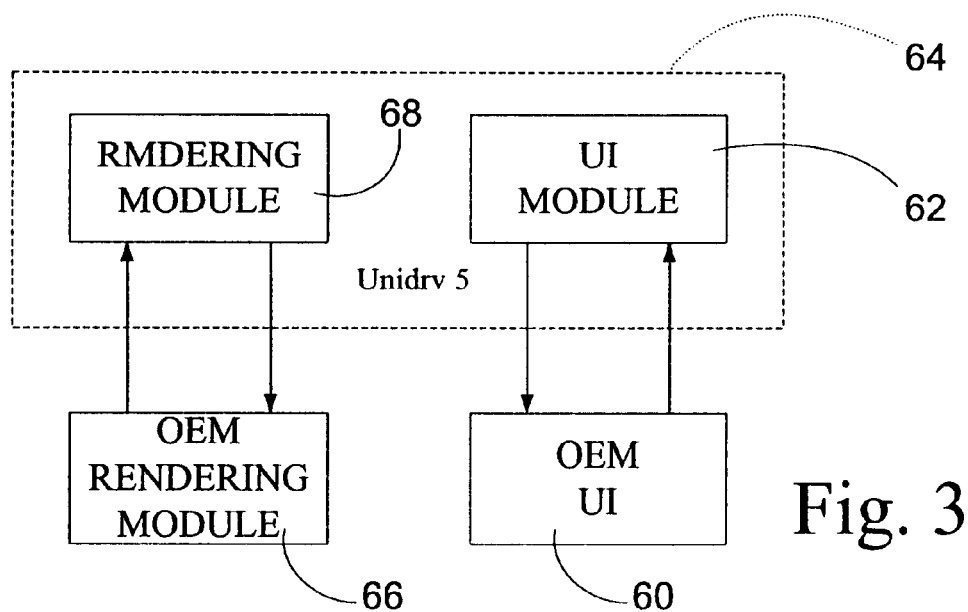
FIG. 3 is a simplified block diagram illustrating high level modular interface between the universal printer driver of the instant invention and the OEM customization modules written in accordance with the GPD of the instant invention.

In a preferred embodiment of the instant invention, the driver allows for multiple OEM plugin modules as illustrated in FIG. 3. First, the OEM plugin can have an user interface (UI) module 60 which interacts with the UI module 62 of the printer driver 64 of the instant invention. This module is responsible for UI customization and reporting device capabilities. Second, the OEM plugin can include an OEM rendering module 66 which interacts with the rendering module 62 of the printer driver 64. This module is responsible for customizing the output data stream.

It is not necessary to have both modules 60, 66 to customize a printer; one or both modules can be present depending on the needs of the OEM. If, however, multiple OEM plugins are provided for a printer driver 64, it is up to the OEM who creates the INF file for the printer to ensure that these plugins work well with each other. The driver of the instant invention calls these modules in a predefined order described more fully hereinbelow. The driver of the instant invention supports up to 16 OEM plugins for each printer.

There are several reasons for providing OEMs the capability to customize the standard printer driver 64 of the instant invention. First, OEMs can provide custom features specific to their printer models that are not specifically supported by the driver of the instant invention. This requires that the OEM present an UI to display the features and perhaps sending appropriate data to the printer while printing. Second, printer OEMs can differentiate their printers by customizing the look and feel of the UI presented to the user. This may preferably involve complete functionality replacement of the standard UI provided by the universal printer driver of the instant invention. Third, OEMs can provide a custom help file to supplement or replace the standard driver help content. This is especially helpful for generic features supported in Generic Printer Description (GPD) files and for added custom features. If the OEM is replacing the whole UI functionality, this help file will be used by the OEM UI module 60.

The driver of the instant invention includes functionality to ensure backward and forward compatibility of the OEM plugins. This feature is known as "build once and run always." This functionality ensures that "Older" OEM plugins will work with the "Newer" Unidrv5 driver of the instant invention. For example, OEM plugins built for NT5 should work with NT6 (or greater) Unidrv driver. Any changes to the customization interface are transparent to OEM plugins. This functionality also ensures that "Newer" OEM plugins will work with "Older" Unidrv5 driver of the instant invention. For example, OEM plugins built for NT6 (or greater) should work with the Unidrv5 driver of the instant invention which is first being implemented in NT5, assuming the OEM plugin support older customization interfaces (i.e. NT 5 interface).

In order to fulfill the requirements above, OEM plugins are preferably Component Object Model (COM) components. COM is an industry wide specification standard, providing a standard for the driver and plugins to follow to ensure seamless compatibility with each other. COM specifies that a client (Unidrv5 driver of the instant invention) communicates with the component (OEM plugins) through an interface, where an interface is a set of functions that a component implements and the clients use. To find out whether a component supports a specific interface, the client queries the component for the interface, using an interface identifier, a unique constant that is associated with a specific interface. Conversely, the OEM plugins can use the Unidrv5 driver as helper function component.

As COM components, OEM plugins are able to encapsulate the implementation details of the customization interface. To the Unidrv5 driver of the instant invention, the OEM plugin is just a set of interfaces. The driver doesndoes nott know all the interfaces that the component supports, only the interface OEM plugin publishes for any given interface identifier. As OEM customization interfaces evolve, these new interfaces will also be supported, in addition to supporting old interfaces. This way, multiple interfaces allows the support of new interfaces as well as older interfaces. To comply with COM specification, a new interface and interface identifier will be defined as described herein if any of the following conditions are changed: the number of functions in an interface; the order/meaning/return value/type of return value of any functions in an interface; the number of parameters in a function; and/or the order/types/meaning of the parameters in a function.

The driver subsystem of the instant invention can be treated as a set of 4 COM components which communicate to each other solely via interfaces. The first two, as stated above, are the Rendering module 68 and the User Interface (UI) module 62 of the Unidrv5 driver 64 of the instant invention. The last two COM components are the OEM supplied Rendering plugin module 66 and the OEM supplied User Interface plugin module 60. For simplicity, the following assumes that there is one OEM supplied UI 60 and Rendering 66 plugin, although the OEM may supply more than one or none of each type of plugin. Additional plugins still communicate with the system driver of the instant invention using the same interfaces as the first plugin, and plugins do not communicate among themselves. Therefore, adding more plugins does not change the manner in which the interfaces are used.

As will now be apparent to one skilled in the art, the system User Interface 62 and OEM UI 60 plugin modules communicate via the IPrintOemUI and IPrintOemDriverUI interfaces, while the system rendering modules 68 and OEM rendering plugins 66 communicate via the IPrintOemUni and IPrintOemDriverUni interfaces. Additionally, the IPrintOemUni interface allows the Unidrv5 of the instant invention to access the methods implemented by the Unidrv5 OEM plugin rendering module 66. Further, the IPrintOemDriverUni interface allows the Unidrv5 OEM plugin rendering module 66 to access the render mode helper function services implemented by Unidrv5 64. The IPrintOemUI interface allows the system UI module 62 to access the methods implemented by the OEM UI plugin module 60. Finally, the IPrintOemDriverUI interface allows the OEM UI plugin module 60 to access the UI helper function services implemented by the system UI module 62.

Figure 4:
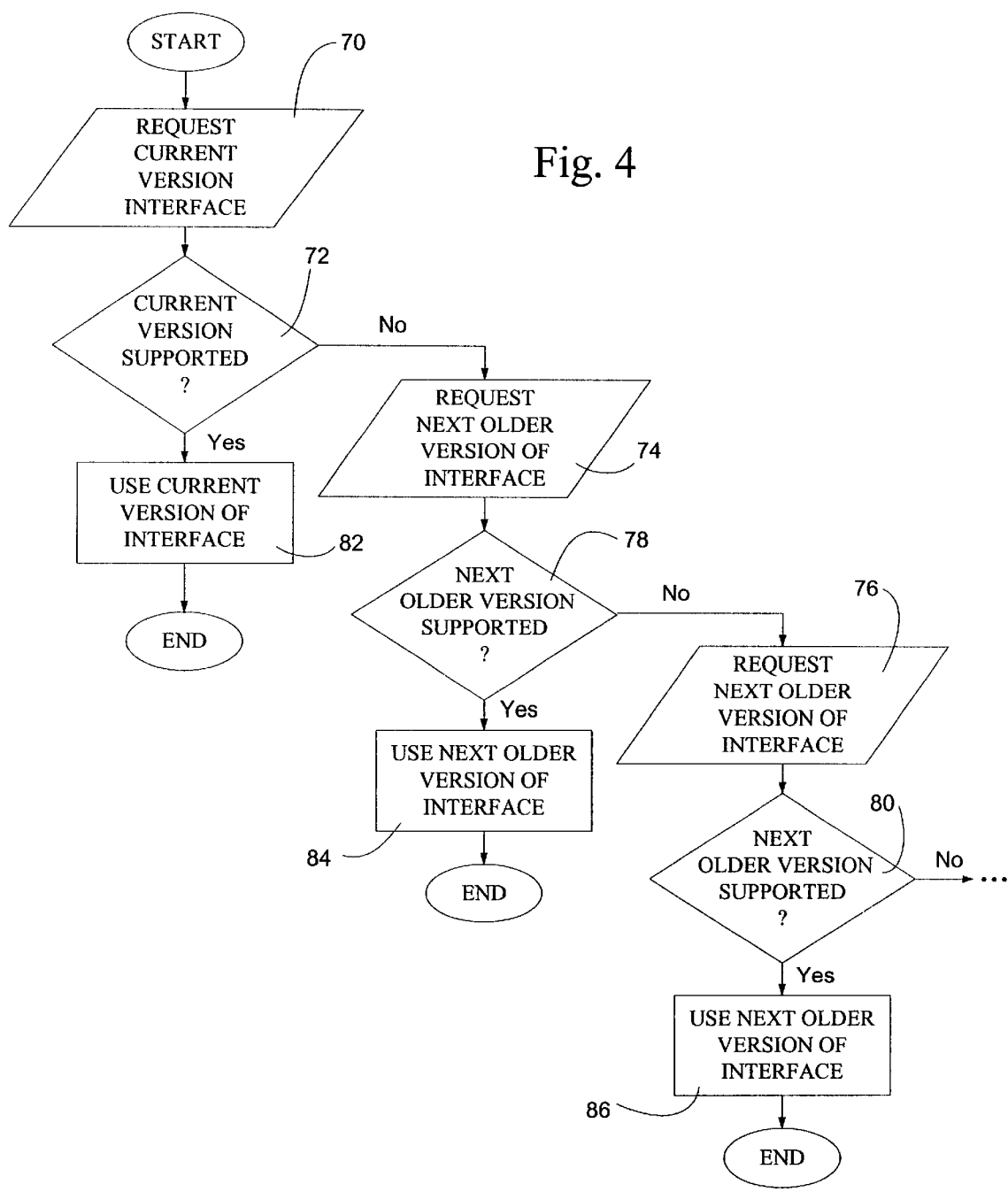
FIG. 4 is a simplified flow diagram illustrating system operation allowing for built—once—run—always functionality.

The OEM must also implement a subset of the COM Class Factory interface. That interface is also defined below. Each interface consists of a set of Methods or Member functions, which may be accessed once a pointer to the interface has been obtained. Not all methods are implemented, so components should be able to handle cases where a method returns E_NOTIMPL. It is expected that as the system drivers and printer hardware are enhanced, new member functions will be needed and existing functions may become obsolete. As this occurs, a new interface will be defined in accordance with the teachings of the instant invention. The system drivers will always support all previous interfaces in addition to the current interface. OEM plugins may choose to support some, all or none of the previous interfaces depending on the level of backward compatibility and functionality desired. As shown in FIG. 4. Unidrv5 will always start by querying for the current OEM interface 70 and if that is not supported by the OEM plugin 72, will work backwards, requesting older 74 and older interfaces 76 until one is found 78, 80 that is supported by the OEM plugin 82, 84, 86. An OEM plugin that supports only the original interface is guaranteed to work with any future version of Unidrv5, but it may not be able to take advantage of features available through the more recent interfaces.

For the purposes of version control, each of the types of interfaces listed above is independent of each other. For example, assume a new version release (i.e. NT6) supports new version interfaces: IPrintOemUni6, IPrintOemDriverUni6, IPrintOemUI6, and IPrintOemDriverUI6. The OEM UI module may choose to implement the original IPrintOemUI interface while using the enhanced IPrintOemDriverUI6 helper functions interface. Similarly the version of the interfaces used or implemented by the OEM UI module have no bearing on the version of the interfaces used or implemented by the OEM Rendering Module.

In addition to the core UI/rendering module functionality, OEM plugins are also responsible for implementing and exposing the class factory. A class factory is a COM component with a single job: creating other components. To be more specific, a particular class factory creates components that correspond only to a single, specific CLSID. OEM plugins first need to define an object that implements the IClassFactory interface and implement its member functions as illustrated generally in FIG. 5. Among the member functions, CreateInstance is class factory specific.

```
HRESULT CreateInstance(
  IUnknown *pUnkOuter,
  const IID &iid,
  void **ppv)
``` pUnkOuter: Specifies the controlling IUnknown interface of aggregation. Since there is no aggregation, the function should return CLASS_E_NOAGGREGATION if this parameter is not NULL.

iid: Specifies the OEM interface driver wants to communicate with, which is always IID_IUnknown.

ppv: Returns pointer to the requested interface (IUnknown), which will be used by the driver to query for the specific OEM interface.

CreateInstance should create a new instance of the object that implements the corresponding OEM interface defined by the driver (i.e. IPrintOemUI, IprintOemUni, etc). It should return S_OK if succeeded, and return appropriate error code (refer to COM specification) otherwise.

After the class factory is implemented, it needs to be exposed so that the driver will be able to locate the class factory after it has loaded the OEM plugins. To expose its class factory, OEM plugins must export the function DllGetClassObject.

```
HRESULT DllGetClassObject(
  const CLSID &clsid,
  const IID &iid,
  void **ppv)
``` clsid: Specifies the class ID of the class factory being requested. Driver's UI module will pass in CLSID_OEMUI and driver's rendering module will pass in CLSID_OEMRENDER. The function should return CLASS_E_CLASSNOTAVAILABLE if clsid does not match these two CLSIDs defined in NT DDK header file.

iid: Specifies the interface in the class factory with which driver wants to talk to, which is always IID_IClassFactory.

ppv: Returns pointer to the requested interface (IClassFactory), which will be used by the driver to ask the class factory to create plugin components (by calling its member function CreateInstance).

DllGetClassObject should return S_OK if succeeded, and return appropriate error code (refer to COM specification) otherwise.

OEM plugins must export another function DllCanUnloadNow, which will be called during plugin unloading by the driver to ask OEM plugin whether it can be unloaded or not.

HRESULT DllCanUnloadNow( )

In this function, OEM plugin should check whether it is serving any components. If not, the function should return S_OK and the plugin will be unloaded by the driver. Otherwise, it should return S_FALSE and the plugin will not be unloaded.

Figure 5:
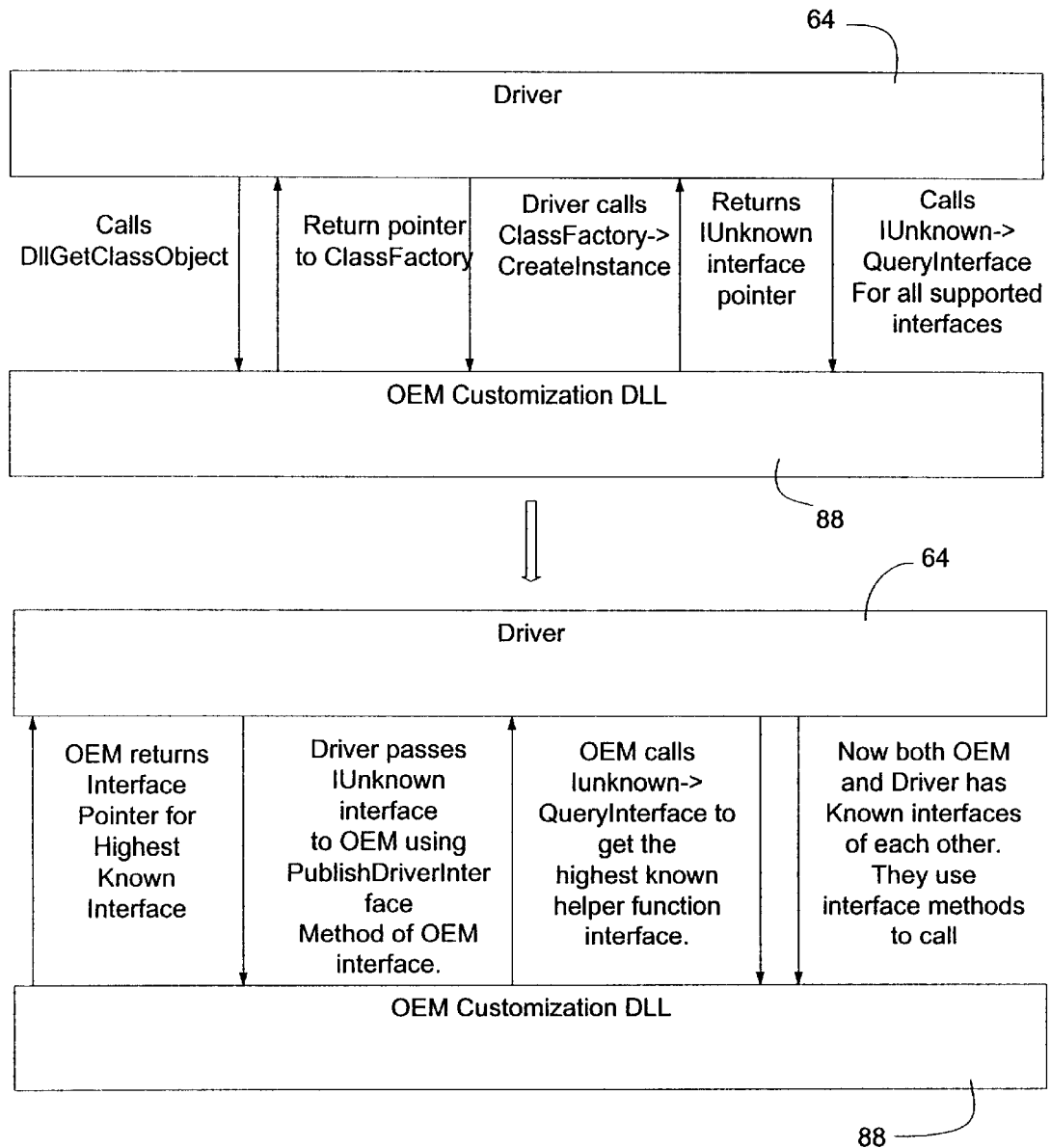
FIG. 5 is a simplified data exchange diagram illustrating communication between COM components in accordance with the instant invention.

The above discussion illustrates the need for COM. The components talk to each other using a known interface. Driver 64 and OEM customization DLL 88 are components as illustrated in FIG. 5. They are also clients for each other. So driver 64 is a client for OEM customization component 88 and at the same time OEM customization component 8 is a client for driver 64. They interact with each other using two types of interfaces. The OEM interface is used by the driver of the instant invention to call different OEM customization functions. The driver helper function interface is used by the OEM to call driver provided helper functions like DrvWriteSpoolBuf.

It is recognized that the driver and OEM can have different versions. To make sure that they work together, the interaction starts with establishing a relationship, which involves finding out which interface the OEM component supports as discussed above and as illustrated in FIG. 5. This involves getting the class factory interface from the OEM component 80 and using this interface to get the IUnknown interface. To do this driver 64 does a GetProcaddress for standard COM function DllGetClassObject. If the OEM component 88 does not export this function, then driver 64 assumes that OEM is not supporting COM interface. If this function is exported and driver 64gets an IUnknown, then it uses IUnknown->QueryInterface to query interface. Driver 64 starts asking for highest known interface. If the OEM 88 component does not know about that interface, it fails the call. Driver 64 then asks for next lower interface and keeps calling till OEM 88 returns success. Now driver 64 knows which interface OEM component 88 supports. This approach allows driver 64 to use the highest known OEM interface, so that no functionality is lost.

Once the driver finds out about the OEM component's interface, it creates IUnknown interface for its own helper function interface. The driver passes IUnknown interface pointer to OEM component using PublishDriverInterface method of OEM interface. Once OEM gets the IUnknown interface pointer from driver, it should call IUnknown->QueryInterface to find out which helper function interface is supported by the driver. The OEM component should also query from highest known interface to lowest known interface. Driver will return success for the known interface and failure if the interface is not known. Now the OEM component also has the interface pointer of the highest known helper function interface. OEM saves this interface in it is own data structure. Now that both driver and OEM have known interfaces, they can then use interface functions to call each other. Using this method the driver of the instant invention can work with any version of the OEM component. OEM can also write the component in such a way that it supports all known driver helper function interfaces. This will make the OEM DLL "Build Once Run Always."

In COM implementation all the methods have to be written, even if they do not do anything. The method normally returns E_NOTIMPL if it is not implemented. This makes the implementation easier but degrades the performance. The driver has to call the OEMs for every method of the interface. Unidrv5 needs to know whether or not the OEM implements some methods before it calls the method. This is needed for appropriate initializations. To obtain this information ahead of time, Unidrv5 queries the OEM component for implemented methods by calling GetImplementedMethod in the OEM interface. GetImplementedMethod takes a method name as a parameter. If a given method is implemented the OEM component returns S_OK otherwise it returns S_FALSE. Unidrv5 caches this information and calls only the implemented methods.

Once the job is done, the driver of the instant invention releases the OEM interface by calling Release method. It then does a GetProcAddress on standard COM function DllCanUnloadNow and calls it. This function must be exported by the OEM component. OEM should release any driver interface at this time and all the memory allocated for an interface. If the OEM has no more instances of its interface DllCanUnloadNow returns S_OK and driver unloads the OEM DLL. If all the instances of OEM interface are not released, then this function returns failure and OEM DLL is not unloaded.

OEM plugins are installed in the system as special dependent files of the printer driver. They are preferably listed in the CopyFiles entry of printer driver's INF file. One of the dependent files is preferably a configuration file with INI filename extension. Its purpose is to help to identify other dependent files. The INI file can be either an ANSI or a Unicode text file. It is recommended that Unicode text file be used to avoid potential localization problems. (Notepad can save text file in Unicode format.) The INI filename should be specific enough to avoid conflicts with INI files from other OEMs. The format of an INI file is defined as:

[section]
key=value
. . .

Currently, only [OEMFiles] section is meaningful to the driver. Entries outside of [OEMFiles] section are ignored. Lines starting with '#' character are treated as comments.

Each OEM plugin can have up to two entries in the INI file: OEMDriverFileN, and OEMConfigFileN, where N is a number from 1 upward. When multiple OEM plugins are present, they are called in the order of increasing N. OEMDriverFileN entry specifies the OEM rendering module, and OEMConfigFileN entry specifies the OEM UI module. Any of the two entries can be omitted if the plugin has no corresponding module, but at least one entry must be present. In the following example, there are two OEM plugins associated with the driver. Notice that the second plugin does not have a user mode UI module.

OEM plugin configuration file for . . .
[OEMFiles]
OEMDriverFile1=OEMDRV1.DLL
OEMConfigFile1=OEMUI1.DLL
OEMDriverFile2=OEMDRV2.DLL It is important to note that filenames listed in [OEMFiles] section must not have any directory prefix. Also, there must not be any spaces before or after the "=" specifier. These files will be copied into appropriate system directories during the installation process. The driver can determine the full path to those directories, which is not trivial in order to point-and-print to work smoothly.

Figure 6:
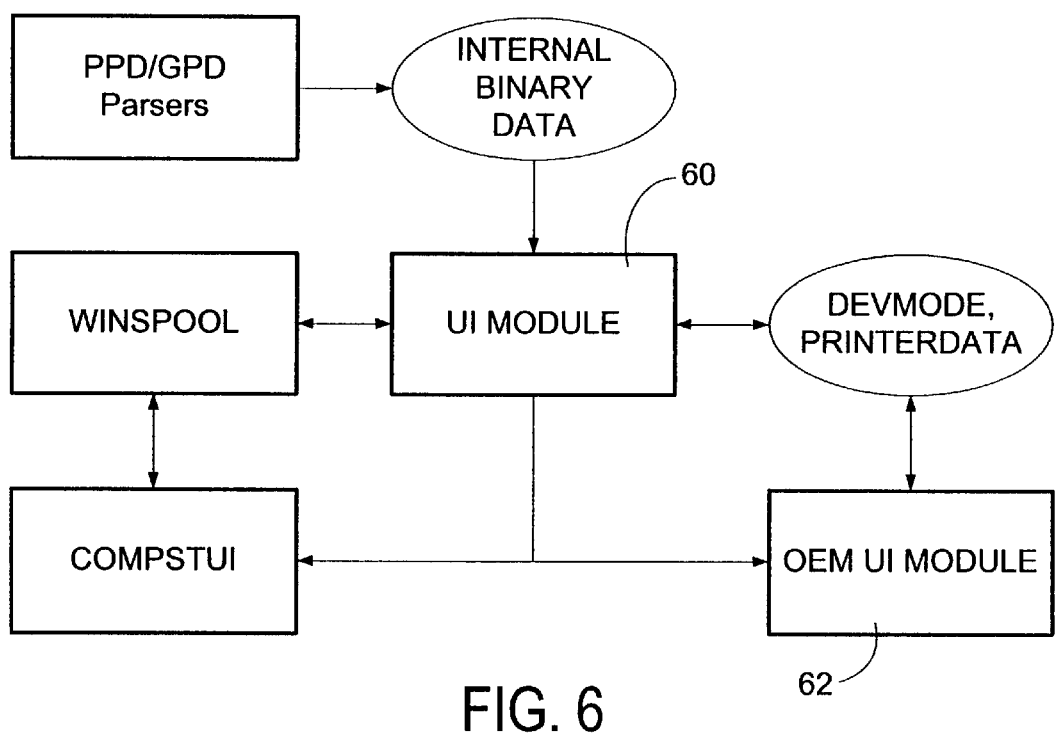
FIG. 6 is a simplified module/function interface diagram illustrating functional interfaces between elements of the instant invention.
Figure 7:
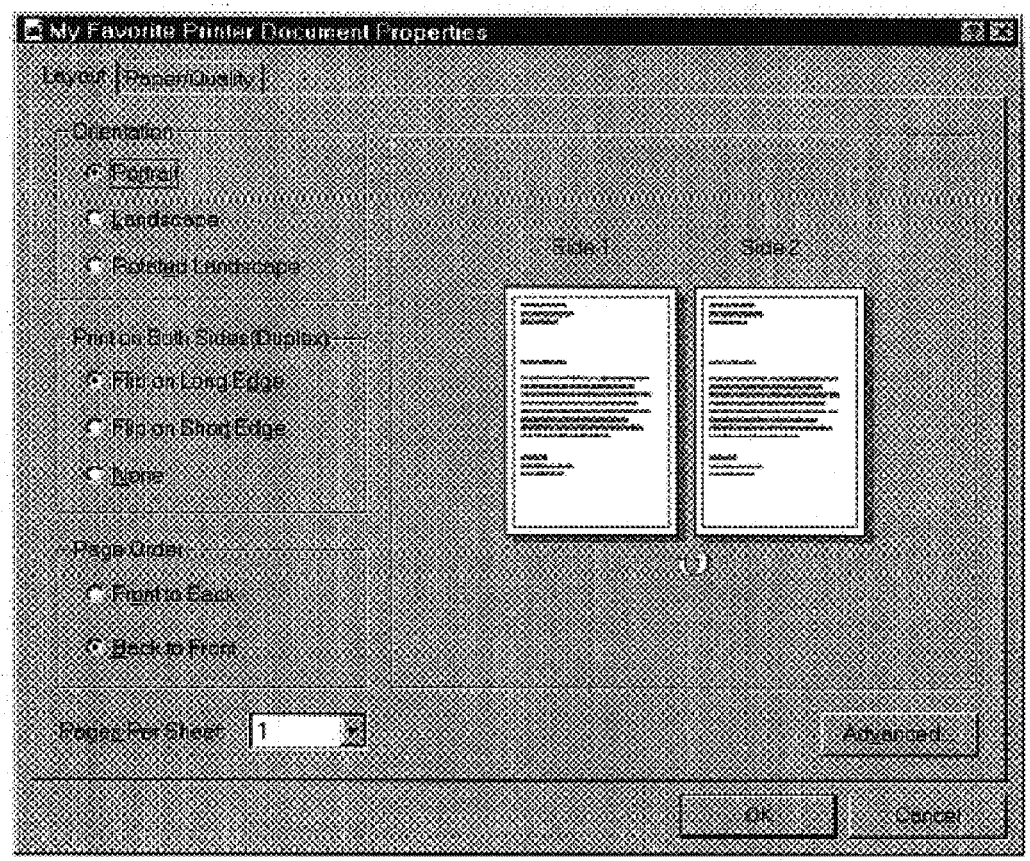
FIG. 7 is a UI default document properties illustration as generated by a component of the instant invention.
Figure 8:
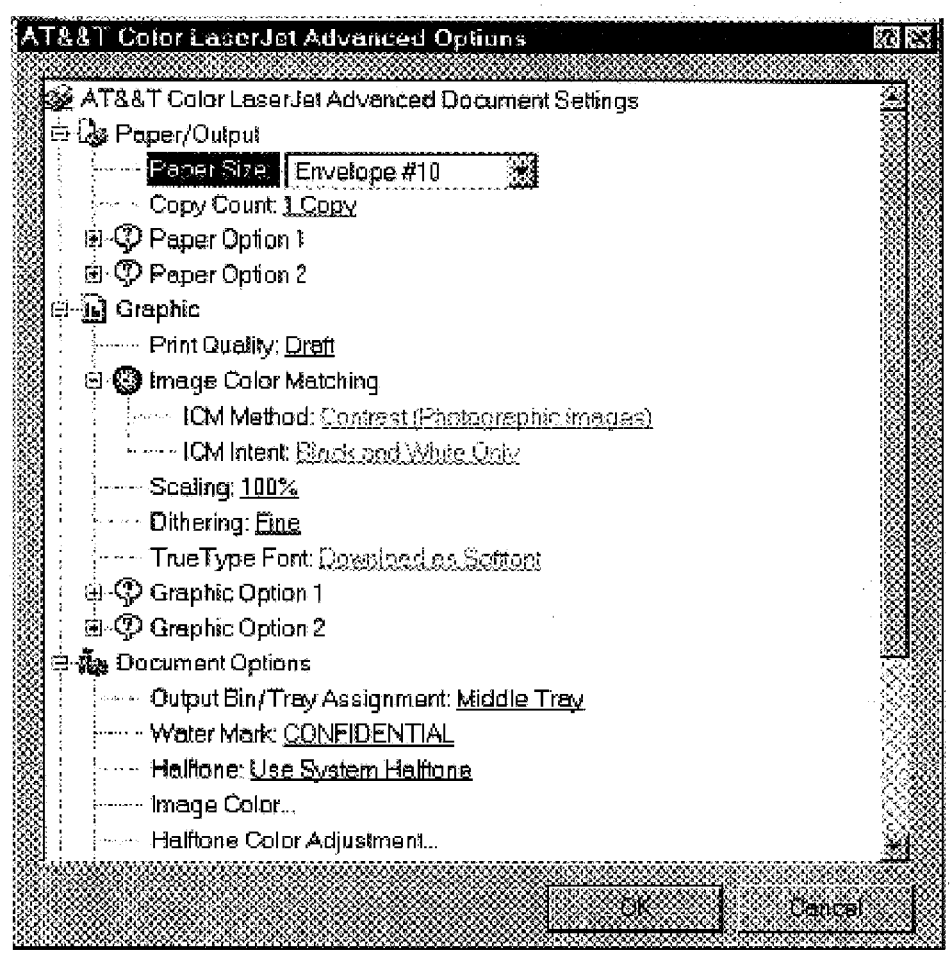
FIG. 8 is a UI default document properties advanced sheet illustration as generated in accordance with an embodiment of the instant invention.

The OEM UI 60 module is a 32-bit Dynamic Link Library (DLL) that runs in user mode and interacts with the Microsoft printer driver UI modules as shown in FIG. 6. The OEM UI module 60 can modify the standard UI first by adding nodes to the standard treeview in the device settings and the Advanced dialog in the printing preference UI (see FIG. 8). Additionally, it can modify the standard UI by adding property sheet pages to the driver UI.

For the UI control, the printer driver UI module interacts with the OEM UI modules 62 through functions, OEMGetInfo, OEMDevMode, OEMCommonUI, and a callback function for processing printer properties and document properties callback messages. The OEMGetInfo function is called by the driver when the OEM module is loaded to get the signature or version of the plugin. It is defined as follows:

```
HRESULT
GetInfo(
    IN DWORD dwMode,
    OUT PVOID pBuffer,
    IN DWORD cbSize,
    OUT PDWORD pcbNeeded
);
``` dwMode: Identify the query type. It can be any of the following values:
OEMGI_GETSIGNATURE
OEMGI_GETVERSION
pBuffer: Pointer to output buffer which holds the return data.
cbSize: Specifies the size of the buffer pointed by pBuffer.
pcbNeeded: Pointer to a DWORD. Returns the number of bytes written into the output buffer by the OEM plugin. If the output buffer is not large enough, OEM plugin should return FALSE and set the error code to ERROR_INSUFFICIENT_BUFFER. In that case, this variable returns the size of the expected output buffer.
Return Value:
S_OK if the function succeeds, E_FAIL if it fails. The reason for the failure should be set via SetLastError.
GetInfo(OEMGI_GETSIGNATURE) is used to get the 4-byte OEM signature. This signature is used by the driver to uniquely identify the OEM plugin and its private devmode information. So it should be chosen with care in order to avoid conflict with other OEM plugins. Zero is not allowed to be used as a signature. Small integers should be avoided as well. One scheme is to use a four-character abbreviation which is relevant to a particular company and/or products. If multiple OEM plugins use the same signature, only the first plugin will be loaded. OEMGetInfo (OEMGI_GETVERSION) is used to get OEM plugin's version number. Same signature and version information should also be used in OEM_DMEXTRAHEADER structure described below.

Figure 9:
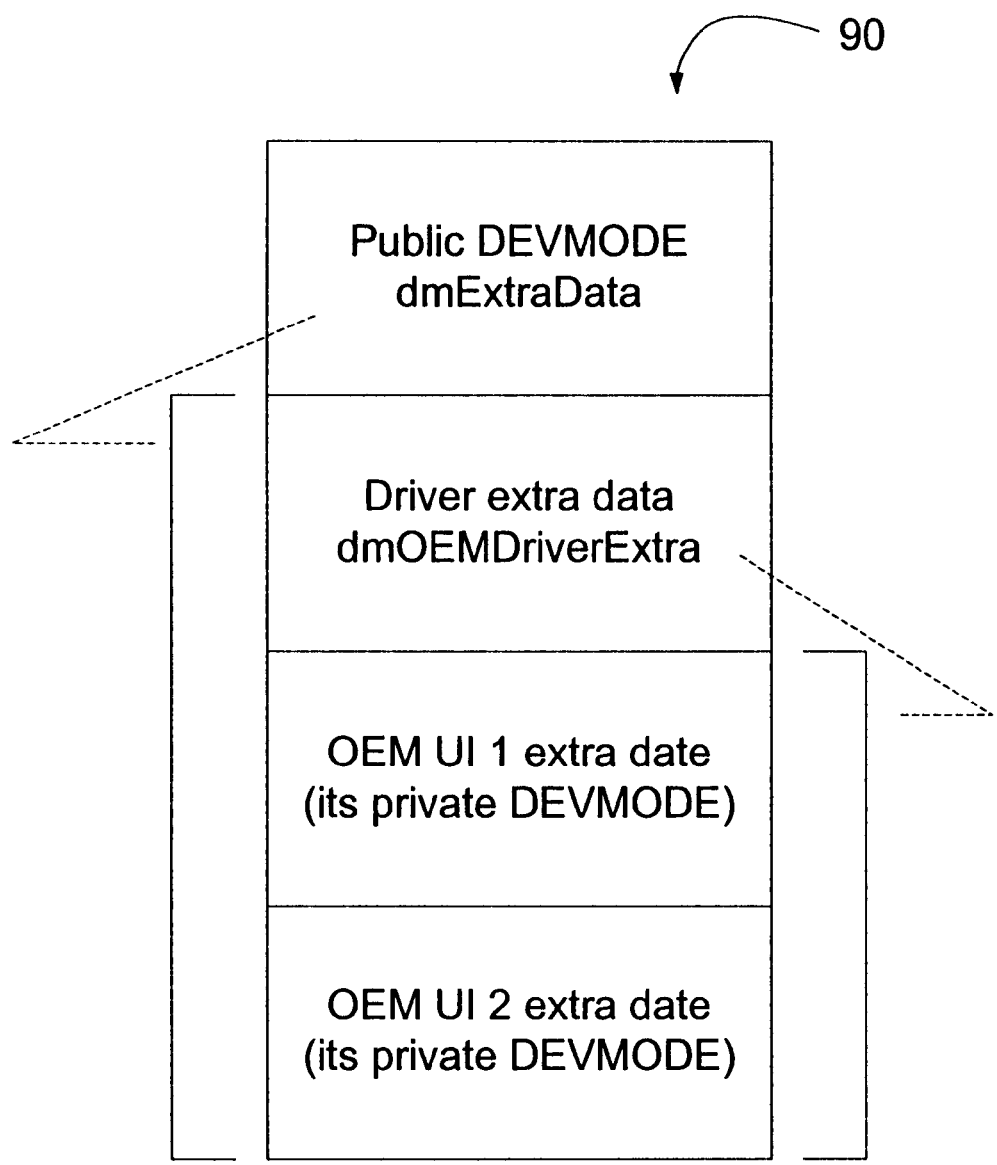
FIG. 9 is a simplified data structure diagram illustrating an aspect of the instant invention.

Devmode support is required only if the OEM plugin needs a private devmode. The OEM plugins can store their own private data in the devmode. The overall structure of the devmode 90 is as shown in FIG. 9. Note that to the application and the spooler, all of the extra data appears to be owned by driver.

Figure 10:
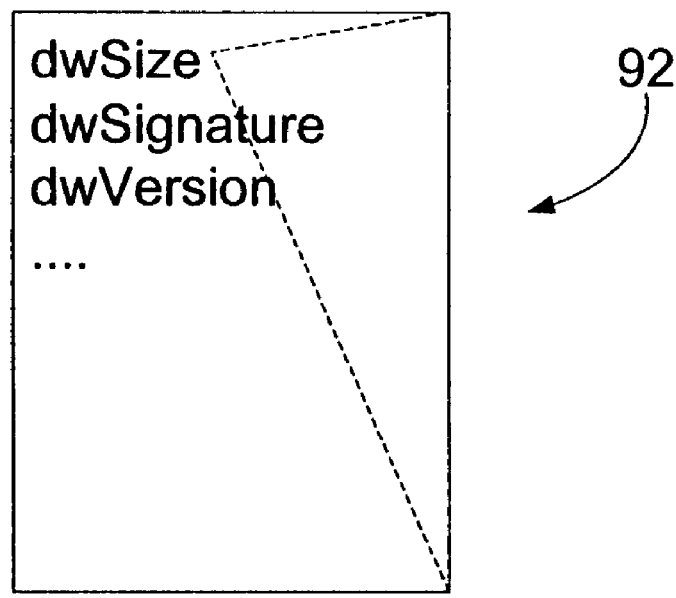
FIG. 10 is a simplified data structure diagram illustrateing an aspect of the instant invention.

OEM private devmode must always start with the following structure 92 as illustrated in FIG. 10.

```
typedef struct_OEM_DMEXTRAHEADER {
    DWORD    dwSize;
    DWORD    dwSignature;
    DWORD dwVersion;
} OEM_DMEXTRAHEADER, *POEM_DMEXTRAHEADER;
``` dwSize: Size of OEM private devmode in bytes, including the header itself.

dwSignature: OEM plugin signature.

dwVersion: OEM plugin version number.

An OEM plugin is called to get the size of its private DEVMODE, initialize its private DEVMODE with default values, convert an arbitrary version DEVMODE to its current version private DEVMODE, and validate an existing OEM private DEVMODE and merge the information into an output devmode.

All of these happen through the DevMode function:

```
HRESULT
DevMode(
    IN DWORD    dwMode,
    POEMDMPARAM pOemDMParam
    );
``` dwMode: One of the following constants (more details on these later):
OEMDM_SIZE
OEMDM_DEFAULT
OEMDM_CONVERT
OEMDM_MERGE pOemDMParam: pointer to OEMDMPARAM structure defined as following.

```
typedef struct_OEMDMPARAM {
    DWORD cbSize;
    PVOID pdriverobj;
    HANDLE hPrinter;
    HANDLE hModule;
    PDEVMODE pPublicDMIn;
    PDEVMODE pPublicDMOut;
    PVOID pOEMDMIn;
    PVOID pOEMDMOut;
```

-continued

```
    DWORD cbBufSize;
} OEMDMPARAM, *POEMDMPARAM;
``` cbSize: Size of OEMDMPARAM structure.

pdriverobj: Reference pointer to driver's data structure. This is used to call DrvGetDriverSetting.
In rendering module, it is the same as pdevobj. In UI module, it is the poemuiobj.

hPrinter: Handle to the current printer.

hModule: Instance handle to the OEM plugin DLL.

pPublicDMIn: Pointer to input public devmode.

pPublicDMOut: Pointer to output public devmode.

pOEMDMIn: Pointer to input OEM private devmode.

pOEMDMOut: Pointer to output OEM private devmode.

cbBufSize: Size of output OEM private devmode buffer.

Return value:
S_OK if the function succeeds, E_FAIL if it fails, or E_NOTIMPL if it is not implemented.
E_FAIL return value from OEM plugin causes the driver to fail its current entry point and return error to its caller (e.g. spooler or GDI). Specifically, OEM plugin should not return E_FAIL just because the input devmode is invalid. It should take what valid information from the input devmode and use appropriate defaults for invalid fields.

An OEM plugin should be very careful when accessing devmode fields, either public or private. It must take into consideration of different versions of devmode. Devmode may grow by adding new fields to the end for both public and private parts. An OEM plugin must be able to handle older smaller devmode by verifying the validity of a field before accessing it, and handle future bigger devmode by recognizing that the size may grow. For the most part, this has already been taken care of by the driver. Except for OEMDM_CONVERT, the driver will provide OEM plugin with its current version DEVMODE.

Conceptually, the driver goes through the following steps upon receiving an arbitrary input devmode. First, it calls DevMode(OEMDM_SIZE) to get the size of OEM private devmode, allocates enough memory, and calls devMode (OEMDM_DEFAULT) to let OEM plugin provide its default devmode settings. Second, it then calls DevMode (OEMDM_CONVERT), with the default OEM private devmode allocated in the previous step in pOEMDMOut in case it is needed. OEM plugin must be prepared to deal with the fact that the input OEM private devmode may be from an older or a new version of the OEM plugin. If it is the same version, then it can simply copy the input devmode to the output buffer. Third, the converted OEM private devmode is finally merged with the printer's default devmode information. (Set through "Printing Preferences . . . " menu item from the "Printers" folder.) The driver calls DevMode (OEMDM_MERGE) with the printer default devmode as output and the converted devmode from step 2 as input. It is important to note that an OEM plugin should never assume that it can locate its extra data from the top of the public devmode. All access to its private devmode data must happen through pOEMDMIn and pOEMDMOut.

Figure 11:
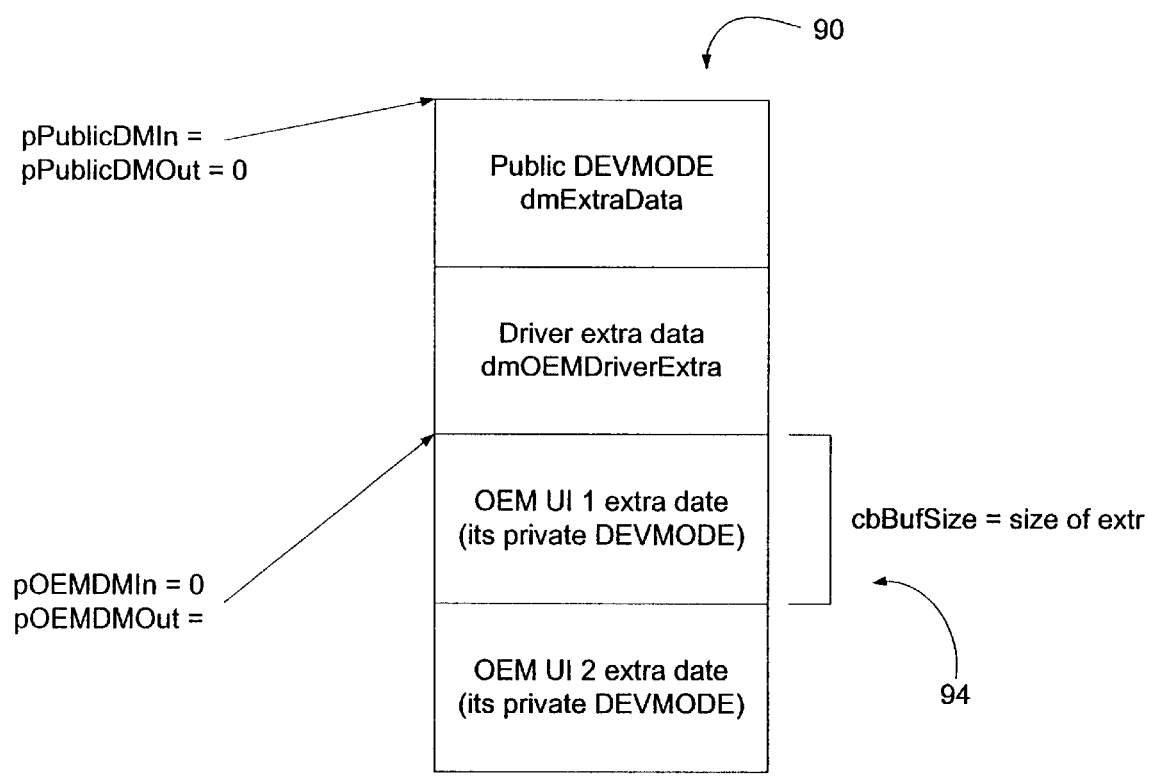
FIG. 11 is a simplified data structure diagram illustrating an aspect of the instant invention.

To get the size of an OEM plugin's private devmode, the driver calls DevMode with the dwMode field set to OEMDM_SIZE. OEM plugin should put the size required for its private devmode data in the cbBufSize field 94 of OEMDMPARAM structure and return TRUE to indicate success as illustrated in FIG. 11. If an OEM plugin does not need a private devmode, it should not implement DevMode function from its DLL.

| Field | In | Out |
|---|---|---|
| CbSize | sizeof(OEMDMPARAM) | — |
| Pdriverobj | Reference to driver's data structure | — |
| HPrinter | Handle to the current printer | — |
| HModule | Handle to OEM plugin DLL | — |
| PPublicDMIn | NULL | — |
| PPublicDMOut | NULL | — |
| POEMDMIn | NULL | — |
| POEMDMOut | NULL | — |
| CbBufSize | 0 | size of OEM private devmode |

To fill the OEM private devmode with default values, the driver calls DevMode with dwMode set to OEMDM_DEFAULT.

| Field | In | Out |
|---|---|---|
| CbSize | sizeof (OEM_DEVMODEPAPAM) | — |
| Pdriverobj | Reference to driver's data structure | — |
| HPrinter | Handle of Printer | — |
| HModule | Handle to OEM plugin DLL | — |
| PPublicDMIn | Points to input public DEVMODE containing default values set by the driver | — |
| PPublicDMOut | NULL | — |
| POEMDMIn | NULL | — |
| pOEMDMOut | Pointer to output OEM private devmode buffer | OEM plugin should fill the output buffer with its default private devmode settings. |
| cbBufSize | size of OEM private devmode | — |

Figure 12:
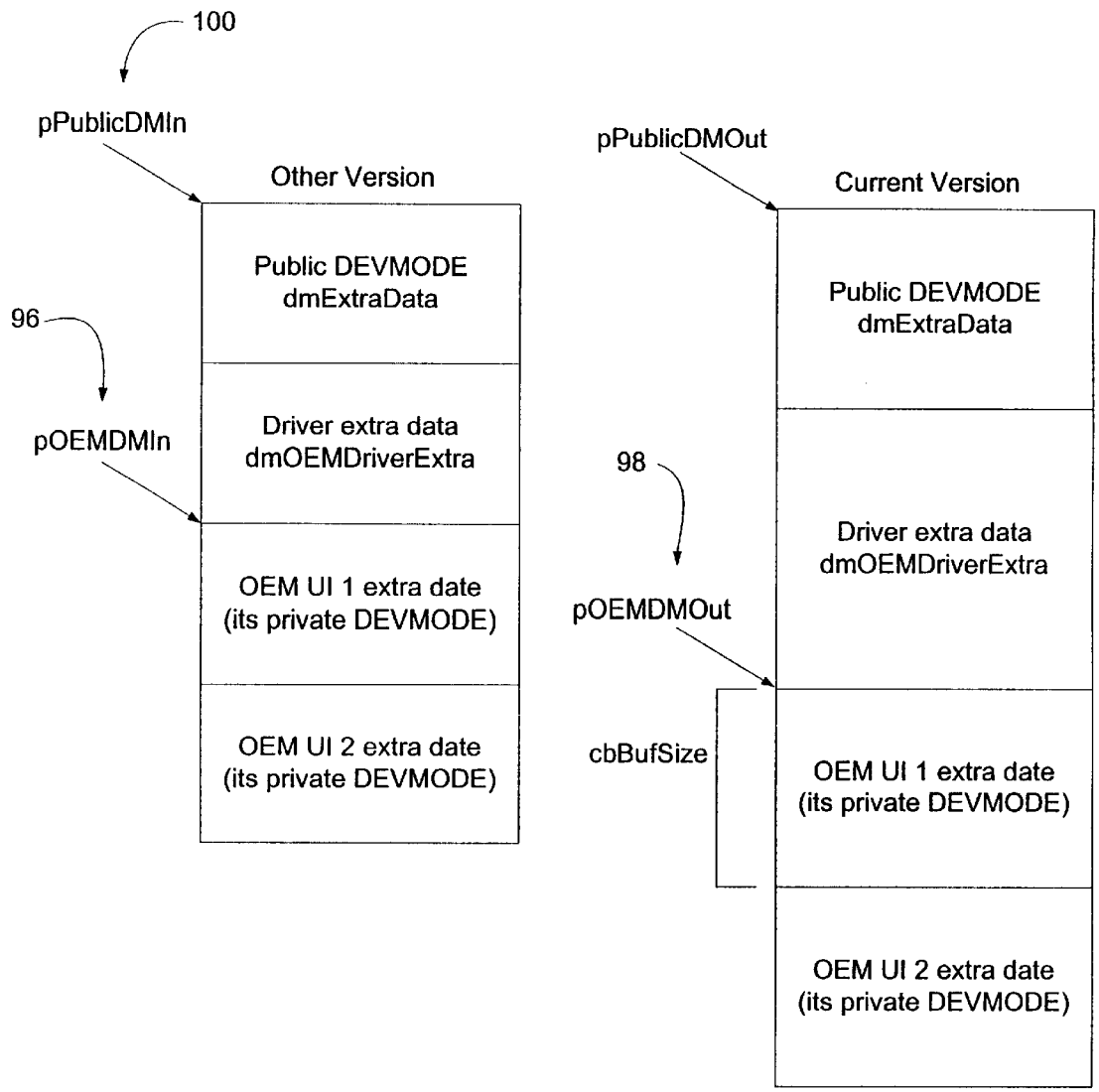
FIG. 12 is a simplified data structure diagram illustrating an aspect of the instant invention.

The driver calls DevMode with dwMode set to OEMDM_CONVERT to request an OEM plugin to convert its private devmode to the current version (without validation) as illustrated in FIG. 12.

| Field | In | Out |
|---|---|---|
| CbSize | sizeof(OEM_DEVMODEPARAM) | — |
| Pdriverobj | Reference to driver's data structure | — |
| HPrinter | Handle to the current printer | — |
| HModule | Handle to OEM plugin DLL | — |
| PPublicDMIn | Pointer to input public devmode | — |
| PPublicDMOut | Pointer to output public devmode, containing information which the driver has already converted from the input devmode | — |
| POEMDMIn | Pointer to input OEM private devmode to be converted | — |
| POEMDMOut | Pointer to output OEM private devmode buffer, containing the default current version OEM private devmode information | OEM plugin should convert the input devmode and stores the result in the output devmode buffer. |
| CbBufSize | size of current version OEM private devmode | — |

As Windows NT supports printer connections over the network, pOEMDMIn 96 could point to data from older, newer or current version of the same OEM plugin. An OEM plugin converts this to the current format retaining as much information as possible, and copies it to the output buffer pOEMDMOut 98. OEM plugin should not access any bytes beyond (PBYTE) pOEMDMIn+pOEMDMIn→dwSize. Some caution should be exercised as well when accessing fields in pPublicDMIn 100.

Figure 13:
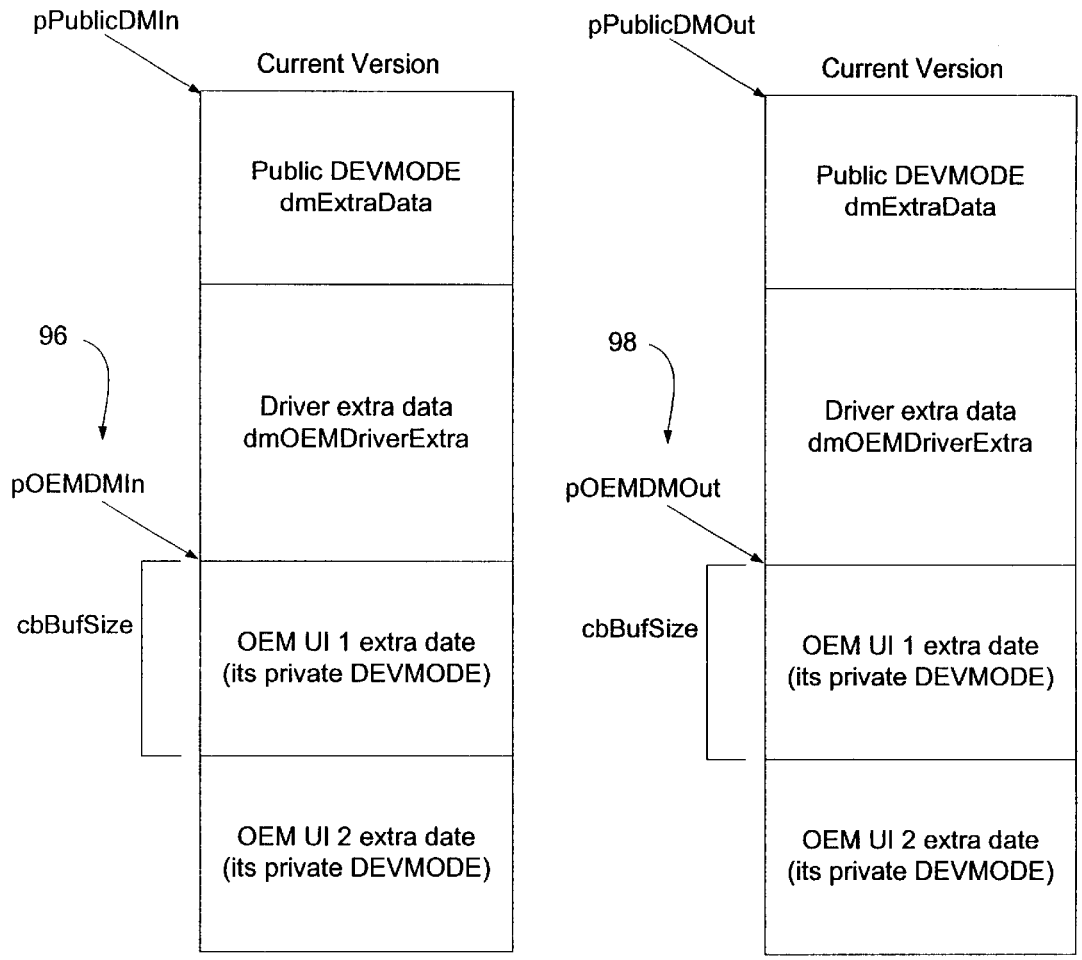
FIG. 13 is a simplified data structure diagram illustrating an aspect of the instant invention.

The driver calls DevMode with dwMode set to OEMDM_MERGE to request an OEM plugin to validate the information in the input private devmode and merge it with the default private devmode, placing the result in the output buffer (pOEMDMOut) 98 as illustrated in FIG. 13. OEM plugin can assume both pOEMDMIn 96 and pOEMDMOut 98 point to its version devmodes, although pOEMDMIn may contain invalid information.

| Field | In | Out |
|---|---|---|
| CbSize | sizeof(OEM_DEVMODEPARAM) | — |
| Pdriverobj | Reference to driver's data structure | — |
| HPrinter | Handle of Printer | — |
| HModule | Handle of OEM module | — |
| PPublicDMIn | Points to input public devmode | — |
| PPublicDMOut | Points to output public devmode | — |
| POEMDMIn | Points to input OEM private devmode, containing information returned from OEMDevMode (OEMDM_CONVERT) | — |
| POEMDMOut | Points to output OEM private devmode, containing valid current version OEM private settings. | OEM plugin should merge any valid information from the input devmode into the output devmode. |
| CbBufSize | size of OEM private devmode | — |

The driver allows OEM plugins to access and update driver's private settings through DrvGetDriverSetting and DrvUpdateUISetting and DrvUpgradeRegistrySetting helper functions. OEM plugins can obtain the address of these helper functions in the driver's helper function interface, IPrintOemDriverUI.

DrvGetDriverSetting helper function allows the OEM plugins to access the driver's private setting.

```
HRESULT
DrvGetDriverSetting(
    PVOID pdriverobj,
    PCSTR Feature,
    PVOID pOutput,
    DWORD cbSize,
    PDWORD pcbNeeded,
    PDWORD pdwOptionsReturned
);
``` pdriverobj: Reference pointer to driver's data structure.

Feature: Specifies what feature the caller is interested in.

pOutput: Points to output buffer.

cbSize: Specifies the size of the output buffer.

pcbNeeded: Returns the minimum size for the output buffer.

pdwOptionsReturned: Returns the number of options currently selected for the specified feature.

Feature specifies the name of the feature in which the caller is interested. The name must be an ANSI string containing only printable ASCII characters. The name should come from the printer description file. For generic printer features, the output buffer will return the name(s) of currently selected option(s). The output will be in the MULTI_SZ form, i.e. a sequence of nul-terminated ASCII character strings followed by an extra nul-character at the end.

If the value of Feature is less than 0x10000, then Feature refers to one of the predefined driver features. For a list of predefined driver feature indices, refer to OEMGDS_ constants defined in printoem.h. Index values from 1 to 0x7fff refer to document-sticky settings in the current devmode. Index values from 0x8000 to 0xffff refer to printer-sticky settings in the registry. For predefined driver features, the meaning of output value varies.

To determine how big the output buffer should be, DrvGetDriverSetting should be first called with pOutput set to NULL and cbSize set to 0. DrvGetDriverSetting will return E_FAIL in this case and the last error code will be set to ERROR_INSUFFICIENT_BUFFER.

In most situations, an output buffer size of 64 bytes should be big enough. So OEM plugins may want to start out with a buffer of this size to avoid having to call DrvGetDriverSetting twice.

Return Value

S_OK if the function succeeds, E_FAIL if it fails, or E_NOTIMPL if it is not implemented DrvUpdateUISetting helper function allows the OEM plugins to update the driver's UI settings and shows UI constraints, if applicable. This function is valid only while the UI is present.

```
HRESULT
DrvUpdateUISetting(
    PVOID    pdriverobj,
    PVOID    pOptItem,
    DWORD    dwPreviousSelection,
    DWORD    dwMode
);
``` pdriverobj: Reference pointer to driver's data structure.

pOptItem: Specifies the OPTITEM that contains the information to be updated in driver's settings.

dwPreviousSelection: Specifies the previous selection of the OPTITEM. This selection is used to restore the UI setting to the previous selection once a contraints is found with the new selection and the user wishes to cancel the selection.

dwMode: Specifies the document property mode or device property mode.
    OEMCUIP_DOCPROP—This function is called from DrvDocumentPropertySheets
    OEMCUIP_PRNPROP—This function is called from DrvDevicePropertySheets Return Value S_OK if the function succeeds, E_FAIL if it fails, or E_NOTIMPL if it's not implemented.

The OEM plugin calls this helper function to upgrade their device settings stored in private registry keys into the driver's internal private data. This function is needed only if the OEM, in previous driver version, had stored device settings, which are now part of the GPD file, in private registry keys. This is necessary and valid only when called from OEM's UpgradePrinter function.

```
HRESULT
DrvUpgradeRegistrySetting(
    HANDLE    hPrinter,
    PCSTR     pFeature,
    PCSTR     pOption
);
``` hPrinter: Handle to printer driver module.

pFeature: Pointer to FEATURE keyword name to upgrade.

pOption: Pointer to OPTION keyword name to upgrade.

The driver will use the (pFeature, pOption) pair to upgrade its internal data to the requested settings.

Return Value

S_OK if the function succeeds, E_FAIL if it fails, or E_NOTIMPL if it's not implemented.

OEM plugins can add, replace or hide nodes in the treeview display on the device settings UI or the Printing Preferences UI. To accomplish this, an OEM plugin should implement the CommonUIProp function. The driver calls CommonUIProp to give OEM plugin a chance to add its UI items after the driver's items. An OEM plugin can also modify the driver's items at this point. The driver first calls this function to get the number of OPTITEMs that the OEM wishes to add, allocates the required memory for OPTITEMs, and calls this function again for the OEM to provide the OPTITEMs. Note that any memory required to fill out the OPTITEMs, such as OPTTYPEs and OPTPARAMs, can be allocated by the OEM from the memory heap supplied by the driver. The driver is responsible for disposing the heap when the items are no longer needed. The behavior is the same for both DocumentPropertySheets items and PrinterPropertySheets items.

```
HRESULT
CommonUIProp(
    DWORD          dwMode,
    POEMCUIPPARAM  pOemCUIPParam
);
``` dwMode: one of the following values.
    OEMCUIP_DOCPROP—This function is called from DrvDocumentPropertySheets
    OEMCUIP_PRNPROP—This function is called from DrvDevicePropertySheets pOemCUIPParam: pointer to OEMCUIPPARAM structure defined below.

```
typedef struct _OEMCUIPPARAM {
    DWORD       cbSize;
    POEMUIOBJ   poemuiobj;
    HANDLE      hPrinter;
    PWSTR       pPrinterName;
    HANDLE      hModule;
    HANDLE      hOEMHeap;
    PDEVMODE    pPublicDM;
    PVOID       pOEMDM;
    DWORD       dwFlags;
    POPTITEM    pDrvOptItems;
    DWORD       cDrvOptItems;
    POPTITEM    pOEMOptItems;
    DWORD       cOEMOptItems;
```

```
        PVOID      pOEMUserData;
        OEMUICALLBACK   OEMUICallback;
} OEMCUIPPARAM, *POEMCUIPPARAM;
``` cbSize: Size of OEMCUIPPARAM structure.

poemuiobj: Reference pointer to driver's data structure; used to call DrvGetDriverSetting.

hPrinter: Handle to the current printer.

pPrinterName: Name of the current printer.

hModule: Instance handle to OEM plugin DLL.

hOEMHeap: Handle to a memory heap from which OEM plugin should allocate all of its memory.

pPublicDM: Points to public devmode.

pOEMDM: Points to OEM private devmode.

dwFlags: the fMode parameter passed in for either DrvDocumentPropertySheets or DrvDevicePropertySheets.

pDrvOptItems: Points to driver's UI items (array of OPTITEM's).

cDrvOptItems: Count of driver's UI items.

pOEMOptItems: Points to OEM plugin's UI items.

cOEMOptItems: Count of OEM plugin's UI items.

pOEMUserData: Points to OEM plugin's private data.

OEMUICallback: Address of OEM plugin's UI callback function.

Return Value

S_OK if the function succeeds, E_FAIL if it fails, or E_NOTIMPL if it's not implemented.

The table below summarizes the contents of the OEMCUIPPARAM structure for the first call to get OEM plugin's OPTITEM count: (Although this example is for OEMCUIP_DOCPROP, it is very similar for OEMCUIP_PRNPROP.)

| Field | In | Out |
|---|---|---|
| CbSize | sizeof(OEMCUIPPARAM) | — |
| Poemuiobj | Reference to driver's data structure | — |
| HPrinter | Handle to the current printer | — |
| PPrinterName | Name of the current printer | — |
| HOEMHeap | Handle to OEM memory heap | — |
| PPublicDM | Pointer to public DEVMODE | — |
| POEMDM | Pointer to OEM private devmode | — |
| DwFlags | fMode passed in for DrvDocumentPropertySheets call | — |
| PDrvOptItems | NULL | — |
| CDrvOptItems | Expected count of driver's OPTITEMs | — |
| POEMOptItems | NULL | — |
| COEMOptItems | 0 | count of OEM OPTITEMs |
| POEMUserData | NULL | — |
| OEMCUIPCallback | NULL | — |

The second call asks the OEM plugin to actually fill out its OPTITEMs:

| Field | In | Out |
|---|---|---|
| CbSize | sizeof(OEMCUIPPARAM) | — |
| Poemuiobj | Reference to driver's data structure | — |
| HPrinter | Handle to the current printer | — |
| PPrinterName | Name of the current printer | — |
| HOEMHeap | Handle to OEM memory heap | — |
| PpublicDM | Pointer to public DEVMODE | — |
| POEMDM | Pointer to OEM private devmode | — |
| DwFlags | fMode passed in for DrvDocumentPropertySheets call | — |
| PDrvOptItems | Points to driver's OPTITEMs | — |
| CDrvOptItems | Count of driver's OPTITEMs | — |
| POEMOptItems | Points to OEM's OPTITEMs buffer | Filled out OPTITEMs |
| COEMOptItems | count of OEM OPTITEMs | — |
| POEMUserData | NULL | pointer to OEM private data |
| OEMCUIPCallback | NULL | address of OEM UI callback function | pOEMUserData field should return a pointer to OEM plugin's private data structure. Later during callbacks, the driver will give OEM plugin a pointer to this same OEMCUIPPARAM structure. OEM plugin can easily obtain a pointer to its private data from there. If dwMode is OEMCUIP_PRNPROP, there will be no devmode information and both pPublicDM and pOEMDM will be NULL.

```
typedef LONG (APIENTRY *OEMCUIPCALLBACK)(
    PCPSUICBPARAM pCallbackParam,
    POEMCUIPPARAM pOemCUIPParam
    );
```

During dialog processing, COMPSTUI normally calls the driver to process messages for node items. For example, the driver gets called by compstui when there is a selection change or when the user presses OK or Cancel. The driver first processes the message itself and then calls each OEM plugin to give them a chance to process the message as well.

In addition to PCPSUICBPARAM pointer from COMPSTUI, the driver passes an additional parameter to OEM plugin's callback function. This is a pointer to the same OEMCUIPPARAM structure that the driver passed to CommonUIProp earlier.

Given OEMCUIPPARAM, OEM plugin can easily determine whether a particular item pOptItem belongs to it:

pOptItem>=pOemCUIPParam→pOEMOptItems &&
pOptItem−pOemCUIPParam→pOEMOptItems<pOemCUIPParam→cOEMOptItems If OEM plugin does not care about a particular message (e.g. if the message was meant for a UI item belonging to some other component), it should return CPSUICB_ACTION_NONE from its callback function. Otherwise, it should process the message and return an appropriate result value. Result values from different components (the driver and OEM plugins) are combined as follows:

1. If the callback reason is CPSUICB_REASON_APPLYNOW:

As soon as one of the components returns CPSUICB_ACTION_NO_APPLY_EXIT, the driver returns that result value to compstui. Otherwise, the result value must be CPSUICB_ACTION_ITEMS_APPLIED.

2. Otherwise, the precedence for different result values is defined as (in decreasing order):

CPSUICB_ACTION_REINIT_ITEMS
CPSUICB_ACTION_OPTIF_CHANGED
CPSUICB_ACTION_NONE

Figure 14:
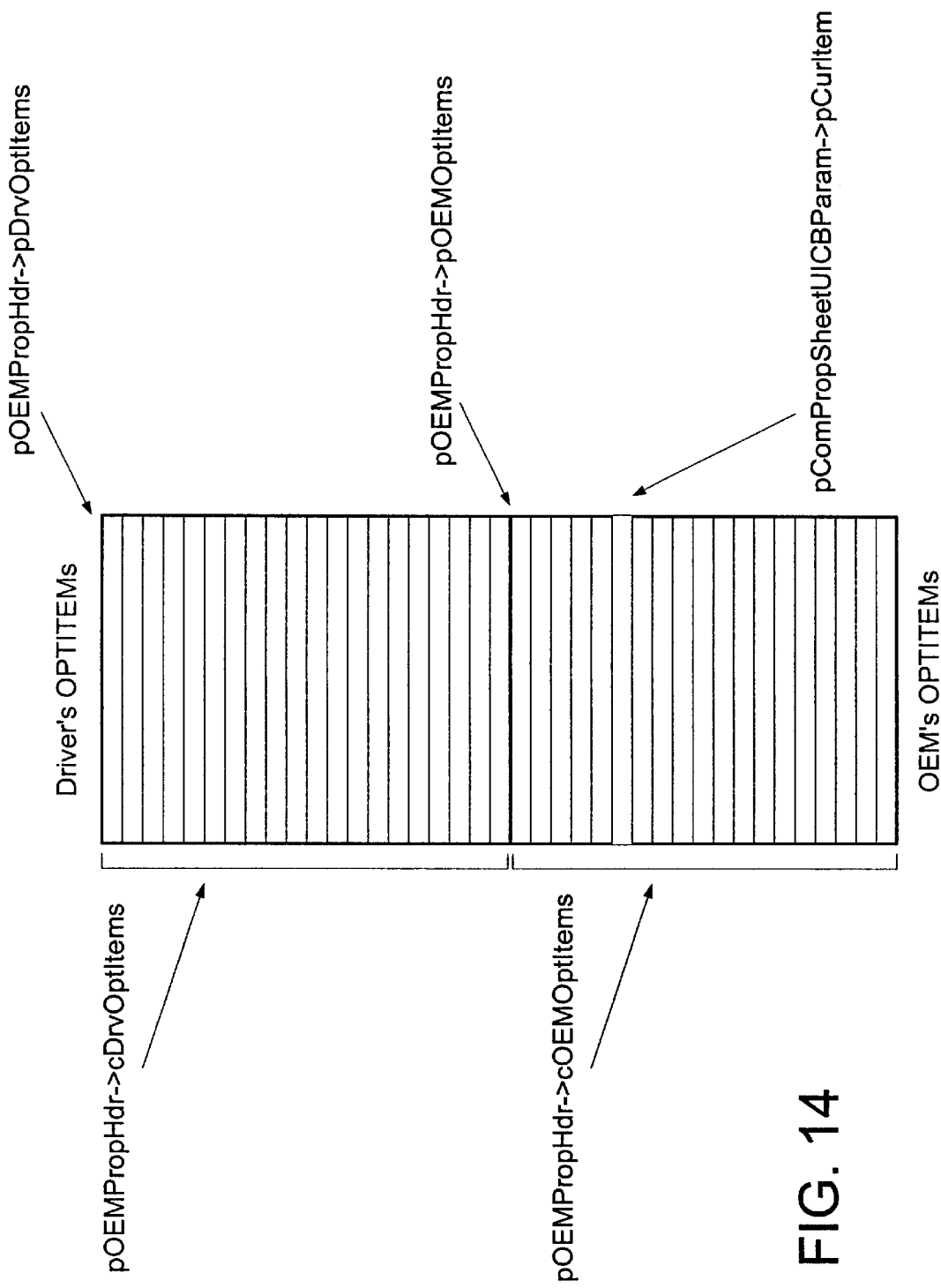
FIG. 14 is a simplified data structure diagram illustrating an aspect of the instant invention.
Figure 15:
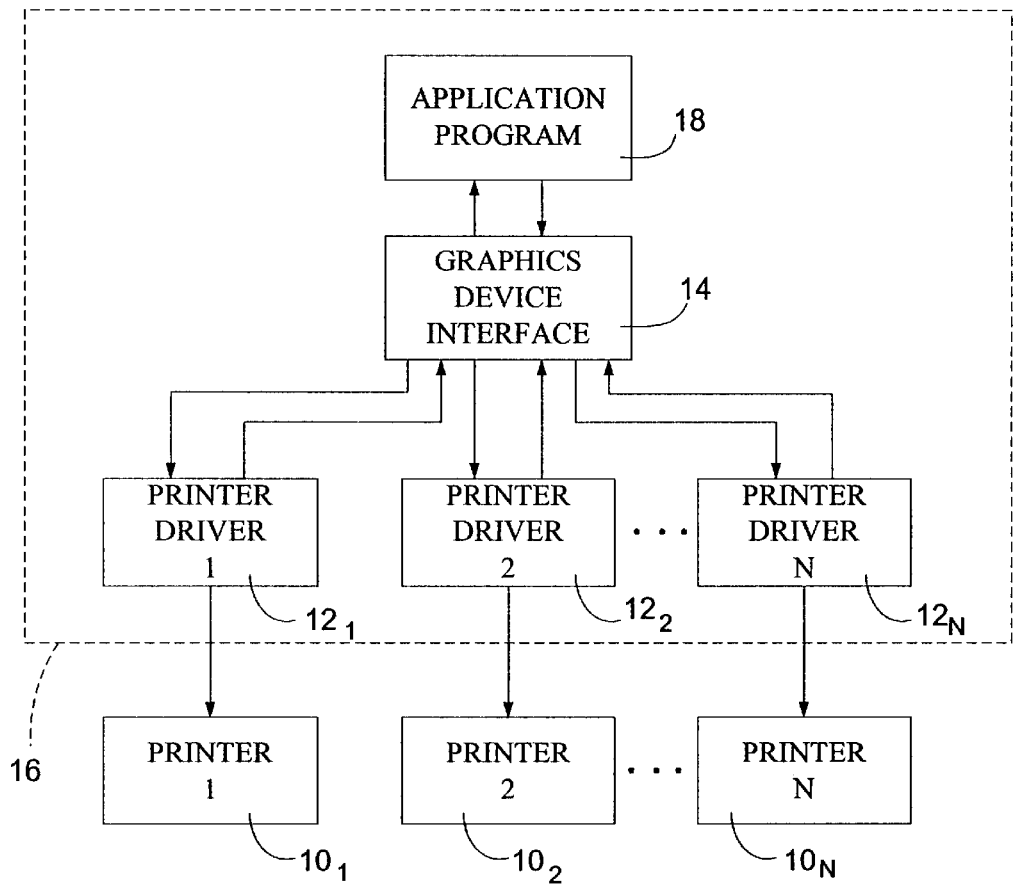
FIG. 15 is a simplified block diagram of a prior operating system requiring individual printer drivers for each individual printer.
Figure 16:
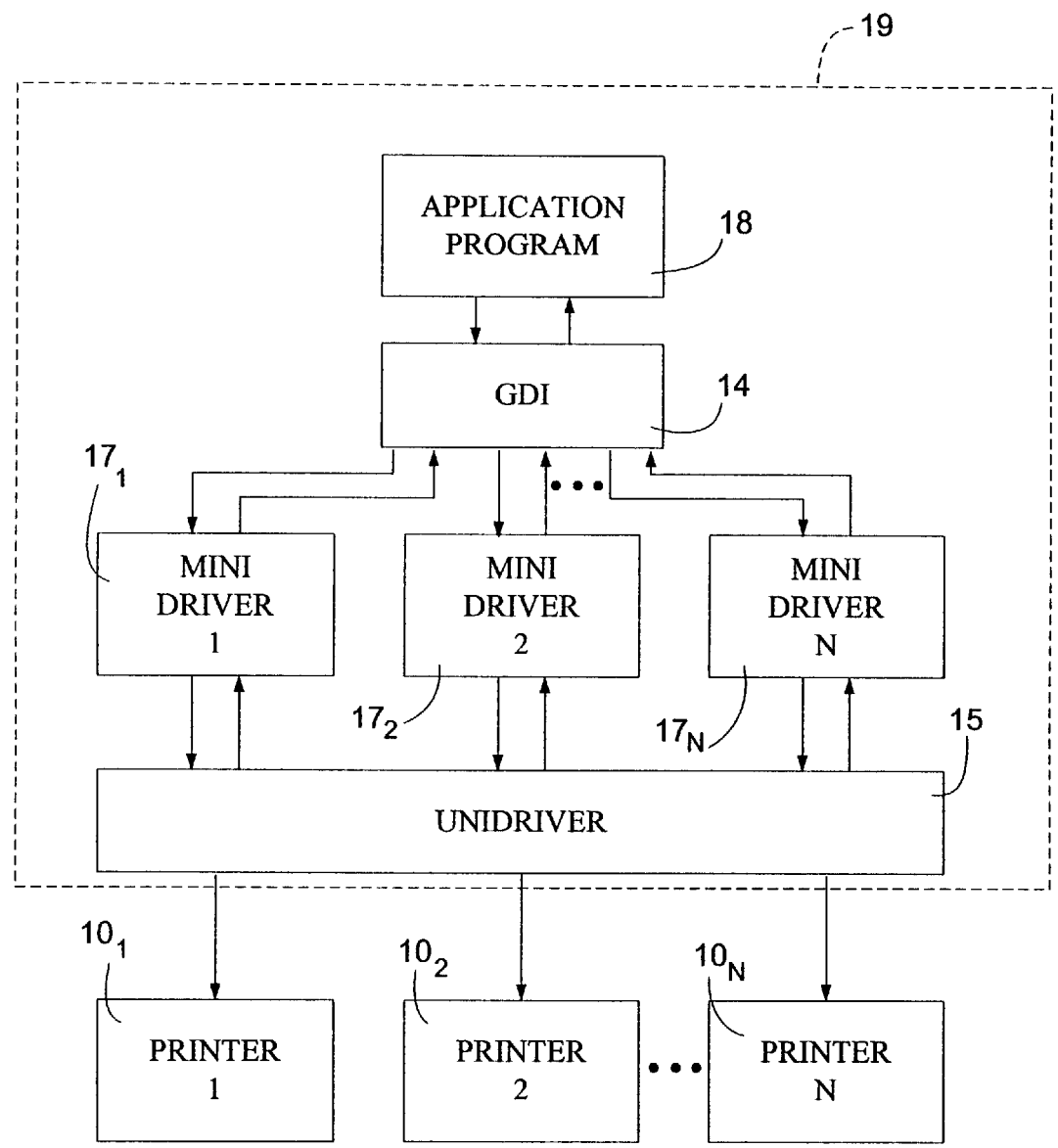
FIG. 16 is a simplified block diagram of an overall computer system architecture incorporating minidrivers and a unidriver to provide appropriate interface and control of multiple printers.

FIG. 14 illustrates what happens during a callback when an item selection changes.

An OEM plugin may add its own property sheet pages to existing property sheet pages provided by the spooler and driver. This is accomplished by the two functions described below. If an OEM plugin does not have its own property sheet pages, then it should not implement these functions.

```
HRESULT
DocumentPropertySheets(
    PPROPSHEETUI_INFO pPSUIInfo,
    LPARAM    lParam
    );
HRESULT
DevicePropertySheets(
    PPROPSHEETUI_INFO pPSUIInfo,
    LPARAM    lParam
    );
```

Note: The driver will always add its own pages before calling compstui to add OEM pages. The control flow is as follows:

1. Application calls spooler's DocumentProperties API.
2. Spooler adds its pages and tells compstui to call the driver's DrvDocumentPropertySheets entry point.
3. compstui calls the driver which adds its own pages and asks compstui to call OEM's DocumentPropertySheets function.
4. compstui calls OEM plugin's DocumentPropertySheets function.

When multiple OEM plugins are present, the driver adds it pages, and then calls each OEM DLL in turn (through compstui).

The driver passes an OEMUIPSPARAM structure as a parameter to each OEM plugin's DocumentPropertySheets and DevicePropertySheets functions. To get a pointer to this parameter, an OEM plugin should do the following at the beginning of DocumentPropertySheets or DevicePropertySheets:

pOemUIPSParam=(POEMUIPSPARAM) pPSUIInfo→lParamInit;

OEMUIPSPARAM is defined as following:

```
typedef struct_OEMUIPSPARAM {
    DWORD     cbSize;
    POEMUIOBJ poemuiobj;
    HANDLE    hPrinter;
    PWSTR     pPrinterName;
    HANDLE    hModule;
    HANDLE    hOEMHeap;
    PDEVMODE  pPublicDM;
    PVOID     pOEMDM;
    PVOID     pOEMUserData;
    DWORD     dwFlags;
} OEMUIPSPARAM, *POEMUIPSPARAM;
```

The meaning of each field is the same as in OEMCUIPPARAM structure except for dwFlags:

For DocumentPropertySheets call, dwFlags is the DOCUMENTPROPERTYHEADER.fMode value passed into the driver's DrvDocumentPropertySheets entry point.

For DevicePropertySheets call, dwFlags is the DEVICEPROPERTYHEADER.Flags value passed into the driver's DrvDevicePropertySheets entry point. (Please refer to Windows NT DDK documentation and winddiui.h for more information about these driver entry points.)

It should be noted that an OEM DLL should not access pPublicDM and pOEMDM fields in DevicePropertySheets call.

An OEM plugin can also optionally implement the following functions. These functions have almost the same prototype as their equivalent DDI entry points exported by the driver. OEM plugins that do not want to handle any of the following functions should not implement them from their DLLs.

The DevQueryPrintEx function allows the spooler to manage mismatched jobs. The driver first checks if the job is printable or not based on the input devmode information and the printer settings in the registry. If it is not printable, it returns to the spooler with an appropriate error message. If it believes that the job is printable, it then calls OEM plugins' DevQueryPrintEx functions. A job is printable only if the driver and all OEM plugins believe that it is printable. If multiple OEM plugins are present, the driver calls them in order until one of them reports that the job is unprintable or all of them agree that it is printable.

```
HRESULT
DevQueryPrintEx(
    IN POEMUIOBJ    poemuiobj,
    IN PDEVQUERYPRINT_INFO pDQPInfo,
    IN PDEVMODE     pPublicDM,
    IN PVOID        pOEMDM
    );
``` poemuiobj: Reference pointer to driver's data structure; used to call DrvGetDriverSetting.

pDQPInfo: Same as what the spooler passed to the driver's DevQueryPrintEx entry point.

pPublicDM: Points to public devmode structure.

pOEMDM: Points to OEM plugin's private devmode, if any.

Return Value

S_OK if the function succeeds, E_FAIL if it fails, or E_NOTIMPL if it's not implemented.

This function reports the capabilities of the device. When the driver is called through its DeviceCapabilities entry point, it validates the input devmode information, processes the request, and stores information in the output buffer if applicable. The driver then calls each OEM plugin's DeviceCapabilities function. DeviceCapabilities gets the same information as what the driver got from DeviceCapabilities with a couple of exceptions: 1) OEM plugin gets pointers to both public devmode and to its private devmode. 2) OEM plugin gets an additional parameter which is the return value from its previous plugin. The first plugin get the return value from the driver itself.

To ensure harmonious cooperation between the driver and possibly multiple OEM plugins, OEM plugins must follow the following guidelines in their DeviceCapabilities implementations. If an OEM plugin does not support the device capabilities in question, it should simply return the input result value and leave everything else untouched. If an OEM plugin wants to completely handle a particular device capability, it should overwrite any existing information in the output buffer and return an appropriate result value. If any errors occur in the process, it should return GDI_ERROR as the result value. If an OEM plugin wants to modify the output information for a device capability that's already handled by the driver or another plugin, it should update the output buffer and return an appropriate result value.

Note that if the input result value is GDI_ERROR, there is no way for an OEM plugin to determine whether earlier components had an error or they simply didn't support the particular device capability.

```
HRESULT
DeviceCapabilities(
   IN POEMUIOBJ    poemuiobj,
   IN   HANDLE   hPrinter,
   IN   PWSTR    pDeviceName,
   IN WORD    wCapability,
   OUT PVOID    pOutput,
   IN PDEVMODE    pPublicDM,
   IN PVOID    pOEMDM,
   IN DWORD    dwOld
      IN   DWORD    dwResult
   );
``` poemuiobj: Reference pointer to driver's data structure; used to call DrvGetDriverSetting.

hPrinter:

pDeviceName:

wCapability:

pOutput: These parameters are identical to what spooler passed to the driver's DeviceCapabilities entry point.

pPublicDM: Points to public devmode structure.

pOEMDM: Points to OEM plugin's private devmode.

dwOld: Return value from the previous plugin. In the case of the first OEM plugin, this is the return value from the driver itself.

dwResult: Return value for DeviceCapabilities.

Return Value

S_OK if the function succeeds, E_FAIL if it fails, or E_NOTIMPL if it's not implemented.

This API gives the driver a chance during the upgrade process to update its device settings stored in the registry from one version to the next. This function is needed only if any new registry information needs to be added or old information needs to be validated or updated. The driver UI module always processes its own upgrade first and then calls OEM plugins' UpgradePrinter functions.

```
HRESULT
UpgradePrinter(
   DWORD dwLevel,
   PBYTE pDriverUpgradeInfo
   );
``` dwLevel:

pDriverUpgradeInfo: Same as what's passed into the driver's DrvUpgradePrinter entry point. Currently, dwLevel is always 1 and pDriverUpgradeInfo is a pointer to an DRIVER_UPGRADE_INFO_1 structure.

Return Value

S_OK if the function succeeds, E_FAIL if it fails, or E_NOTIMPL if it's not implemented.

This API is called when certain events occur that might require action by the printer driver. For example, the driver is notified when a local printer is installed or when the spooler has detected changes in the cache from a printer server. The driver always processes the events first and then calls OEM plugins' PrinterEvent functions for further processing.

```
HRESULT
PrinterEvent(
   PWSTR   pPrinterName,
   INT   iDriverEvent,
   DWORD   dwFlags,
   LPARAM   lParam
   );
``` pPrinterName:

iDriverEvent:

dwFlags:

lParam: Same as what spooler passed to the driver's DrvPrinterEvent entry point.

Return Value

S_OK if the function succeeds, E_FAIL if it fails, or E_NOTIMPL if it's not implemented.

This API is used to get information about the default color profile for a given devmode, to be used with ICM.

```
HRESULT
QueryColorProfile(
   HANDLE   hPrinter,
   PDEVMODEW    pdevmode,
   ULONG    ulReserved,
   VOID   *pvProfileData,
   ULONG   *pcbProfileData,
   FLONG   *pflProfileData
   );
``` hPrinter: Handle to printer driver module.

pdevmode: Pointer to DEVMODE.

ulReserved: Reserved.

pvProfileData: Pointer to store color profile data. If this is NULL, the OEM plugin should set the necessary size in cbProfileData.

pcbProfileData: Pointer to size of pvProfileData buffer in byte and store size of color profile data written to pvProfileData on return.

pflProfileData: Pointer to store color profile data type.

QCP_PROFILEMEMORY—The pvProfileData points to the color profile data itself.

QCP_PROFILEDISK—The pvProfileData points to the color profile name in Unicode.

Return Value

S_OK if the function succeeds, E_FAIL if it fails, or E_NOTIMPL if it's not implemented.

The FontInstallerDlgProc function is the call back function handling the UI shown by the font installer.

```
HRESULT
FontInstallerDlgProc(
   HWND    hWnd,
   UINT    usMsg,
     WORD    wParam,
     LONG    lParam
   );
```

The parameters above are similar to ones defined for a UI dialog procedure defined in the SDK. When it is called with the WM_INIT message, or the WM_USER+WM_FI_NAME message, IPram points to an OEMFONTINSTAPRAM structure.

Return Value

S_OK if the function succeeds, E_FAIL if it fails, or E_NOTIMPL if it's not implemented.

The UpdateExternalFonts function is called by the driver UI module to update the set of cartridge fonts in the font file.

```
HRESULT UpdateExternalFonts (
    HANDLE hPrinter,
    HANDLE hHeap,
    PWSTR pwstrCartridges
    );
```

PwstrCartridges specifies the list of cartridges currently installed on the printer, and the font installer should make sure only cartridge fonts belonging to these cartridges are in the font file. To add fonts belonging to cartridges not in the font file, the font installer uses the font file specified by the "ExtFontCartFile" name in the registry.

Return Value

S_OK if the function succeeds, E_FAIL if it fails, or E_NOTIMPL if it's not implemented.

Preferably, the driver rendering module interacts with the OEM rendering module DLLs. The OEM DLLs may request direct access to DDI calls, or rely on callbacks from the driver for special processing at predefined points during the driver's output generation. It is important to note that the OEM rendering module DLLs must not have any global variables. The OEM rendering module DLL are required to support the following function in addition to GetInfo described above:

PublishDriverInterface

GetImplementedMethod

When multiple OEM plugins are present, the same function from each OEM DLL is called in turn except for UNIDRV-only callback functions which allow at most one OEM DLL to hook out for each function. The order in which they are called is determined through the mechanism described above.

The driver calls this function during DrvEnablePDEV time to determine which functions the OEM DLL provides and which DDI functions OEM DLL wants to hook out.

```
HRESULT
EnableDriver(
    DWORD   dwOemIntfVersion,
    DWORD   cbSize,
    PDRVENABLEDATA  pded
    );
``` dwOemIntfVersion: specifies the OEM interface version number used by the driver.

cbSize: size of the buffer pointed to by pded, in bytes.

pded: pointer to a DRVENABLEDATA structure used by OEM DLL to return output data to the driver. pded→iDriverVersion should be the same as DriverVersion parameter. pded→c specifies the number of DDI entry points the OEM DLL has hooked out. pded→pdrvfn points to a function table containing the address of hooked DDI entry points.

Return Value

S_OK if the function succeeds, E_FAIL if it fails, or E_NOTIMPL if it's not implemented.

Following DDI entry points can be hooked out by the OEM:

INDEX_DrvRealizeBrush
INDEX_DrvDitherColor
INDEX_DrvCopyBits
INDEX_DrvBitBlt
INDEX_DrvStretchBlt
INDEX_DrvStretchBltROP
INDEX_DrvPlgBlt
INDEX_DrvAlphaBlend
INDEX_DrvGradientFill
INDEX_DrvTransparentBlt
INDEX_DrvTextOut
INDEX_DrvStrokePath
INDEX_DrvFillPath
INDEX_DrvStrokeAndFillPath
INDEX_DrvPaint
INDEX_DrvLineTo
INDEX_DrvStartPage
INDEX_DrvSendPage
INDEX_DrvEscape
INDEX_DrvStartDoc
INDEX_DrvEndDoc
INDEX_DrvStartBanding
INDEX_DrvNextBand
INDEX_DrvQueryFont
INDEX_DrvQueryFontTree
INDEX_DrvQueryFontData
INDEX_DrvQueryAdvanceWidths
INDEX_DrvFontManagement
INDEX_DrvGetGlyphMode If multiple OEM rendering module DLLs are present, the driver calls them in order. Any DDI function can only be hooked out by at most one OEM DLL. So if subsequent OEM DLLs try to hook out the same function, they will be ignored. Most of the interfaces between the system driver and the OEM DLL have a PDEVOBJ parameter. In some cases, this parameter is directly passed to the OEM DLL by the driver. In the case of DDI entry points hooked out by the OEM DLL, the OEM DLL can obtain this PDEVOBJ parameter from the SURFOBJ pointer as follows:

pdevobj=(PDEVOBJ) pso→dhpdev;

DEVOBJ structure is defined as:

```
typedef PVOID PDEVOEM;
typedef struct_DEVOBJ {
    DWORD   dwSize;
    PDEVOEM pdevOEM;
    HANDLE  hEngine;
    HANDLE  hPrinter;
    HANDLE  hOEM;
    PDEVMODE pPublicDM;
    PVOID   pOEMDM;
    PDRVPROCS pDrvProcs;
} DEVOBJ, *PDEVOBJ;
``` dwSize: size of DEVOBJ structure. As the customization interface evolves, this structure may grow.

pdevOEM: pointer to OEM DLL's device data structure. This value is returned to the driver by the OEM DLL during OEMEnablePDEV call. It can be used by the OEM DLL whichever way it sees fit (e.g. a pointer to some piece of memory).

hEngine: handle used by GDI to identify the current printer device. This parameter is passed into the driver by GDI during DrvEnablePDEV.

hPrinter: spooler handle to the current printer. It is passed into the driver during DrvEnablePDEV.

hOEM: instance handle to the OEM plugin DLL. It is obtained when the driver loads the OEM DLL.

pPublicDM: pointer to public devmode associated with the current device. pOEMDM: pointer to OEM DLL's private devmode, if any.

pDrvProcs: Pointer to a table of helper functions provided by the system driver.

Details provided later in this section.

Before the driver returns its PDEV to GDI, it calls the OEM DLL's EnablePDEV to allow it to construct its own PDEV. At this time, the driver also passes a function table which contains its own implementation of DDI entry points. This allows the OEM DLL to pre or post process the parameters and use the driver function to achieve the functionality. The return value from EnablePDEV is passed back to the OEM DLL on subsequent calls as DEVOBJ.pdevOEM parameter.

```
HRESULT
EnablePDEV(
    PDEVOBJ         pdevobj,
    PWSTR           pPrinterName,
    ULONG           cPatterns,
    HSURF           *phsurfPatterns,
    ULONG           cjGdiInfo,
    GDIINFO         *pGdiInfo,
    ULONG           cjDevInfo,
    DEVINFO         *pDevInfo,
    DRVENABLEDATA   *pded
    PDEVOEM         *pDevOem
);
``` pdevobj: pointer to a DEVOBJ structure. pdevobj→pdevOEM is undefined.

pPrinterName: name of the current printer.

Cpatterns:

phsurfPatterns:

cjGdiInfo:

pGdiInfo:

cjDevInfo:

pDevInfo: These parameters are identical to what is passed into DrvEnablePDEV.

pded: points to a function table which contains the system driver's implementation of DDI entry points.

pDevOem: OEM PDEV.

Return Value

S_OK if the function succeeds, E_FAIL if it fails, or E_NOTIMPL if it is not implemented.

```
HRESULT
DisablePDEV(
    PDEVOBJ pdevobj
);
```

If EnablePDEV is implemented, then during DrvDisablePDEV, the driver will call the OEM DLL's DisablePDEV function to allow the OEM to free any memory associated with its PDEV. The OEM DLL should free resources allocated for the PDEV.

```
HRESULT
ResetPDEV(
    PDEVOBJ pdevobjOld,
    PDEVOBJ pdevobjNew
);
```

ResetPDEV transfers the state of the driver from the old PDEVOBJ to the new PDEVOBJ when an application calls ResetDC.

```
HRESULT
DisableDriver(
    VOID
);
```

If EnableDriver is implemented, the driver will call DisableDriver to notify the OEM DLL that it is no longer required and is ready to be unloaded. The OEM DLL should free all resources, and get prepared to be unloaded.

If the OEM UI DLL adds private data to the DEVMODE structure, it must provide a rendering module version of the DevMode function described herein. The driver uses this at print time to validate, convert and generate default DEVMODEs as necessary. This function should be identical to the one provided by the OEM UI DLL, as described herein. This code can be implemented in a library and statically linked to the OEM UI modules and rendering modules.

The GetInfo function should be provided by the OEM rendering module DLL, and should be identical to the one provided by the OEM UI DLL as described above. This can also be implemented as part of a library as mentioned above for DevMode.

The PublishDriverInterface function provides a method for the driver to publish its helper function interface. The driver calls the OEM plugin's PublishDriverInterface function with the IPrintOemDriverUni interface which the OEM plugin can then use to access the driver's helper functions such as DrvWriteSpoolBuf.

```
HRESULT
PublishDriverInterface(
            IUnknown * pIUnknown
);
```

The GetImplementedMethod function allows the driver to get information about the implemented methods of the interface. The OEM plugin must define all of the member functions of a given interface, but not all of the functions need to be implemented. This function is called by Unidrv5 to determine which of the members of the interface are implemented by the OEM plugin.

```
HRESULT
GetImplementedMethod(
            PSTR pMethodName
);
```

Return Value

S_OK if the function succeeds, E_FAIL if it fails, or E_NOTIMPL if it is not implemented.

In a preferred embodiment, the Unidriver is a bitmap surface driver. This means that GDI manages the surface completely. Vector graphics and raster are rendered together in the same band and sent to the printer. The driver does not distinguish between a pie chart and bitmap sent from a Windows application. High-level printer graphics languages like, PCL5 and PCL-XL, have the capability to distinguish between vectors and raster. PCL5c will even color treat the objects differently based on the type of object it is drawing. For the current Unidriver, vectors and raster are color treated as raster, so the output may not be color corrected in the manner intended by the user. Preferably, the Unidriver allows the creation of a device managed surface. GDI cannot manage a device surface since it has no knowledge of the physical device. This means a device-managed driver will be required to draw its own graphics through the OEM mechanism. It is not possible for a device-managed driver to call any Eng calls that perform drawing onto the surface. However, a device-managed surface does not render graphics into bands and has more control over when objects are sent to the printer.

The OEM must create a custom-rendering module described in oemcust.doc. In addition to OEMGetInfo and OEMDevmode, the OEM must also export OEMDriverDMS.

The OEMDriverDMS function is called during DrvEnableSurface to determine the type of surface to create—Bitmap or Device.

BOOL APIENTRY
OEMDriverDMS (
IN PDEVOBJ pDevObj,
OUT PVOID pBuffer,
IN DWORD cbSize,
OUT PDWORD pcbNeeded
);

A DMS driver cannot call GDI provide Eng drawing calls to render onto the device managed surface. It can however create a temporary bitmap surface and pass that as drawing surface to Eng calls. All DDI rendering calls must be hooked.

These are:
DrvRealizeBrush
DrvDitherColor
DrvCopyBits
DrvBitBlt
DrvStretchBlt
DrvStretchBltROP
DrvPlgBlt
DrvTransparentBlt
DrvAlphaBlend
DrvGradientFill
DrvTextOut
DrvStrokePath
DrvFillPath
DrvStrokeAndFillPath
DrvPaint
DrvLineTo DrvEnableSurface is not hookable. The Unidriver creates the type of surface based on the information derived from OEMDriverDMS. This can be changed on a job by job basis. The UI has to be customized in order for the OEM to get this capability. If the OEM does not want it to be modified on a job by job basis but permanently for all jobs, the OEM does not have to create a custom UI—they just have to always return the proper parameters in OEMDriverDMS in the render DLL. If the OEM DLL does not return an answer for OEMDriverDMS or returns an error, then a Bitmap surface is created by default.

The DrvTextOut call is sent to OEM minidriver. OEM will have to handle text clipping, text rotation, underline, and strikethrough. The OEM should also sent commands for text brush. Unidriver provides a helper function, DrvUniTextOut, to do the actual textout. This helper call expects the same parameters as DrvTextOut. After sending commands for text brush, rotation and clipping, OEM calls the Unidriver helper function DrvUniTextOut to do the actual text. In a preferred embodiment, rotation is not supported and glyph based clipping is done by DrvUniTextOut. An alternative embodiment allows the OEM driver to do the clipping.

OEMs must export a new function that will draw the text as bitmap. The function OEMTextOutAsBitmap utilizes the same parameters as DrvTextOut. DrvUniTextOut may call OEMTextOutAsBitmap if the text cannot be downloaded. This can happen when downloading fails or text is rotated. An alternative embodiment gives the OEM the opportunity to rotate the text. If the OEM does not want to rotate the text, it can always call the OEMTextOutAsBitmap routine to rasterize the text.

After DrvUniTextOut is complete the OEM will have to draw underline and sytike throughs. Underline and strikethrough come into the function call as a series of rectangles in prclExtra. The OEM driver can creates rectangles based on the coordinates in prclExtra using vector commands.

```
DrvUniTextOut code looks like:
if(DownloadFont)
{
        // send the glyphs
}
else // font could not be downloaded
{
        if(DEVICE_MANAGED( ))
                    pfnOEMTextOutAsBitmap ( . . . );
        else
                    EngTextOut( . . . );
}
```

Unidrv5 supports OEM customization in following areas: GPD command callback; raster data processing callbacks; and font handling callbacks. The OEM can choose what callbacks to provide individually based on the specific needs of the printer. Support for OEM DLL modification of the print stream will be implemented through command callbacks as defined in the GPD. For any GPD command, the OEM can specify a unique callback identifier via *CallbackID entry inside any GPD *Command construct. This identifier, a positive integer, will be passed to the minidriver during callback as one of the parameters (see below). At print time, when Unidrv5 is ready to emit a command but finds out that it is a callback id instead, it will call the minidriver's implemented command callback routine with the command ID and a parameter list as specified by *Params entry in the same *Command construct.

```
HRESULT
CommandCallback(
            PDEVOBJ         pdevobj,
            DWORD           dwCmdCbID,
        DWORD               dwCount,
            PDWORD          pdwParams
            INT *           piResult
            (;
``` pdevobj: pointer to the DEVOBJ.

dwCmdCbID: the command callback ID as specified in the GPD file.

dwCount: the count of the number of parameters (each a DWORD value) in pdwParams list.

pdwParams: pointer to an array of DWORD parameter values in the same order as specified by the corresponding *Params entry in the GPD file.

piResult: 0 for most GPD commands except X/Y movement commands in which case, the return value is the difference (positive) between the requested cursor position vs. the actual cursor position that the command has imposed.

Return Value

S_OK if the function succeeds, E_FAIL if it fails, or E_NOTIMPL if it's not implemented.

If a command callback requires no parameter, then dwCount is set to 0 and pdwParams is NULL.

The ColorMode feature of GPD, as described in detail below, allows the GPD author to specify the format of the shadow bitmap (format in which GDI performs imaging operations), the format of the bitmap to be dumped to the printer and an OEM callback function (ImageProcessing) which may be used to perform the transformation from GDI to dump format. The OEM callback may perform halftoning (conversion to a dump format with smaller pixel depth than the GDI format) or image processing (like color adjustments, ink removal) or both. Depending on the configuration specified, the halftoning may actually be performed by GDI, by the OEM callback or by the printer itself. See the GPD spec for examples.

Multiple ColorMode options may be specified so the user may select the desired output color depth, halftone process etc. Different sets of halftone options are available for each ColorMode. The OEM callback (if used) may provide, via the custom UI extensions, additional controls to allow the user to adjust various properties of the printed image. If so desired, the OEM may allow ImageProcessing to perform the dumping of the raster bitmap to the printer by setting the keywords *DevNumOfPlanes and *DevBPP to zero in the ColorMode option.

The halftone options enumerated in the GPD fall into one of 3 categories: GDI supported, OEM supported, and device supported (requires invocation string to enable). A custom halftone pattern, although defined by the OEM in the GPD, is considered a GDI supported halftone because GDI does the actual work. For any given ColorMode option, only one of the three halftone categories is applicable. First, if *DrvBPP is 1 or 4 BPP and specifies the same color depth as *DevBPP/*DevNumOfPlanes, then only GDI supported halftone should be available. For this purpose, 4 bpp rendering depth is considered an exact match for any of 4 bpp, RGB, CMY, or CMYK output depth. Second, if *DrvBPP is 24 BPP and specifies the same color depth as *DevBPP/ *DevNumOfPlanes then device supported halftoning is assumed whether or not there is a *IPCallbackID entry in this ColorMode option. Finally, if *DrvBPP specifies higher color depth than *DevBPP/*DevNumOfPlanes, there must be a valid *IPCallbackID entry in this ColorMode option, and only OEM supported halftone should be available.

It is the responsibility of the GPD author to provide the correct UI constraints between the ColorMode options and the Halftone options so only desired combinations can be selected. For GDI halftoning, the GPD can enumerate as halftone options one or more GDI built-in patterns or OEM defined patterns. A built-in GDI halftoning option must be assigned one of the predefined symbol names. For OEM defined patterns (up to 256×256 in size), the option must contain the entry *HTPatternSize and also *rcHTPatternID if the pattern is stored in the resource file. An optional OEM callback to perform image processing may be specified in the ColorMode. Note that the GPD should not supply an invocation string for an OEM defined dither pattern since this is not a printer feature.

For halftoning performed by an OEM callback, the Halftoning option need only specify the name of the option to be displayed in the halftoning listbox. The control module will pass the index of this option as a parameter into the callback function ImageProcessing which should take the appropriate action based on the value of this index. For halftoning performed by the printer, an invocation string is required. An optional OEM callback to perform image processing may be specified in the ColorMode. Again the index of the halftone option selected will be passed down to the OEM callback (if any is used).

The ImageProcessing callback allows the OEM to access, manipulate and convert the format of the shadow bitmap after all GDI imaging is complete and before any dump processing is performed. It also allows the OEM to perform the dumping of the raster bitmap data directly to the printer. As mentioned in the discussion of ColorMode, the OEM may specify the format of both the shadow bitmap imaged to by GDI and the format of the bitmap to be dumped by the driver. As a result, the OEM may cause the halftoning to be performed by GDI at imaging time, in OEMImageProcessing, or by the printer. The following is the function prototype required for ImageProcessing:

```
HRESULT
ImageProcessing(
        PDEVOBJ                             pdevobj,
        BYTE                                pSrcBitmap,
        PBITMAPINFOHEADER   pBitmapInfoHeader,
        PBYTE                               pColorTable,
        DWORD                               dwCallbackID,
        PIPPARAMS                           pIPParams,
        PBYTE                               *ppbResult
        );
``` pdevobj: pointer to the DEVOBJ.

pSrcBitmap: pointer to the source shadow bitmap.

pBitmapInfoHeader: describes source bitmap, DIB format, topdown scan ordering.

In a preferred embodiment, 1, 4, 8, and 24 BPP formats are supported (planes=1) with no compressed formats supported. Both source and destination formats will be organized as DIBs with ulPrimaryOrder=PRIMARY_ORDER_CBA. For example, if the format is RGB(CMY), the ordering of the color planes in each pixel is: least significant m bits are B(Y), next m bits are G(M), and next m bits are R (C) where m is 8 for 24 BPP and 1 for 4 BPP. The black plane (if any), occupies the next m bits. If there are unused bits, these will be the most significant bits. The driver assumes the OEM callback creates pDestBitmap to the pixel depth specified in the GPD information so the callback should not change pBitmapInfo.

pColorTable: It is the source palette if the format is 8 bpp. It gives the OEM access to the source palette which can be used to halftone the data to customize the printer's palette by creating a new 8 bit colortable. If the OEM wishes to create a new 8 bpp palette the OEM module will be responsible for downloading the data.

dwCallbackID: the callback ID value specified in the ColorMode option (IPCallback) in the GPD file. This selects one particular image processing method if the ColorMode specifies multiple image processing callback ids.

pIPParams: Pointer to IPPARAMS structure containing current driver state information.

```
typedef struct {
        DWORD       dwSize;
        POINT       ptOffset;
        PSTR        pHalftoneOption;
        BOOL bBanding;
        BOOL        bBlankBand;
} IPPARAMS, *PIPPARAMS;
``` dwSize: size of this structure in bytes.

ptOffset: offset of the band relative to upper left corner of imageable area.

pHalftoneOption: string pointer to the name of the currently selected halftone option. The callback should know what each option corresponds to in the GPD file. It uses this to determine what type of halftoning to provide.

bBanding: flag specifying banding is active when TRUE.

bBlankBand: flag specifying that nothing was drawn in the input bitmap so it should be considered blank when TRUE. Since nothing needed to be drawn in the bitmap it wasn't erased so the bitmap data is invalid and should not be used.

ppbResult: caller supplied address of a pointer to the destination bitmap buffer if successful and NULL (0) if unsuccessful when the OEM function is not dumping the data itself. If the function will dump the data then it should return TRUE if successful or FALSE (0) if not. The destination bitmap may be in the same format as the source bitmap. It may point to the same memory as pSrcBitmap or point to a buffer allocated by the OEM. Currently, 1, 4, 8 and 24 BPP (planes=1), are valid formats that can be returned in the destination bitmap where ulPrimaryOrder must be PRIMARY_ORDER_CBA with topdown scan ordering. The bitmap data is then dumped to the device as specified in the GPD file with the exception that in 4 BPP, no black synthesis or RGB to CMY conversion will take place so the OEM callback is responsible for initializing all 4 planes. This will allow the OEM the option of implementing a more sophisticated black synthesis.

Return Value

S_OK if the function succeeds, E_FAIL if it fails, or E_NOTIMPL if it's not implemented.

This callback will be made immediately before the driver executes its own code to render the bitmap. The callback is expected to allocate any buffers it requires to perform the bitmap conversion or image processing. The callback may overwrite the source bitmap, or it may allocate its own output bitmap. This callback may also be used to dump the bitmap directly to the printer without any further assistance or intervention from the driver. The driver assumes OEMImageProcessing will perform the dump if *DevNumOfPlanes and *DevBPP are set to 0 in the ColorMode. If the OEM DLL is assuming the responsibility of dumping the raster bitmap, it should use the XMoveTo and YMoveTo unidrv5 provided functions to do all the required positioning. If the dll wishes to do its own positioning it will still need to update the current driver cursor position on exit by calling XMoveTo and YMoveTo with the MV_UPDATE flag set.

If the Compression callback is provided by the OEM DLL and the CmdEnableOEMComp command is defined in the GPD, the callback will be used to compress the next block of data. The relative size of the newly compressed data will be compared to any other enabled unidrv5 compression modes to determine the most efficient compression algorithm for this block of data. If it results in the smallest size, unidrv5 will send the CmdEnableOEMComp command followed by the data. The OEM function only compresses and returns the data and is not responsible for any output. Unidrv5 will provide a buffer in which to compress the data. The size of this buffer will be specified and may represent the size of best compression algorithm checked so far. In this way an early out algorithm can be used to stop compressing if it is not going to result in smaller output.

```
HRESULT
Compression (
    PDEVOBJ pdevobj,//Pointer to DEVOBJ
    PBYTE   pInBuf,  //Pointer to raster data to compress
    PBYTE   pOutBuf,  //Pointer to output buffer for compressed data
    DWORD   dwInLen,   //size of input data to compress
    DWORD   dwOutLen,  //size of output buffer in bytes
    INT*    piResult
);
``` piResult: Contains the number of compressed bytes created if successful otherwise—1 if unable to compress the data within the specified buffer.

Return Value

S_OK if the function succeeds, E_FAIL if it fails, or E_NOTIMPL if it's not implemented.

The Compression callback can be used to implement a special compression method that may or may not be more efficient than existing unidrv5 compression modes thus allowing the best method to be utilized. Since there is some overhead involved with compressing the data the OEM should only enable those compression methods most likely to yield the best results. To utilize this callback the device must be able to switch compression modes and support disabled compression on a per scan line basis.

If FilterGraphics callback is provided by the OEM DLL, it will be used in place of the driver's normal blockout/compression code for sending a block of raster data to the printer. The number of scanlines in a block is specified by *PinsPerPhysPass entry of the current Resolution option. For most inkjet printers and page printers, this number is 1.

```
HRESULT
FilterGraphics(
    PDBVOBJ pdevobj,
    PBYTE    pBuf,    // Pointer to buffer containing scanline raster
    data to be
                      // compressed/manipulated and sent out.
```

-continued

```
DWORD      dwLen    // length (in bytes) of the buffer
);
```

Return Value

S_OK if the function succeeds, E_FAIL if it fails, or E_NOTIMPL if it's not implemented.

The FilterGraphics callback can be used to implement a special compression method, or to perform bit manipulation on the data stream that is sent to the printer, or both. In either case, the driver's built-in compression code is not used. FilterGraphics is presented with a block of data and it is required to send all the data and using DrvWriteSpoolBuf. The driver will perform no further processing of the raster data after calling FilterGraphics. This callback is expected to allocate any buffers it requires, such as to perform the compression. The callback may overwrite the source buffer if the compressed results occupy fewer bytes than the original data. Otherwise it must allocate its own output buffer. Any memory allocated by FilterGraphics may be freed at DisablePDEV time.

Since some compression methods under certain situations may produce more data than the original, it is recommended the OEM callback not to overwrite the input data buffer. If the compressed results are worse, it may wish to disable compression for this block and emit the original data uncompressed. The OEM is responsible for inserting any compression invocation command in front of the compressed data if needed If HalftonePattern callback is provided by the OEM DLL and the GPD provided HTCallbackID parameter is greater than 0, the callback will be used to generate a custom OEM halftone pattern for GDI halftoning when the OEM wishes to keep the pattern proprietary. This is accomplished by either encrypting it in the resource dll or generating it in the OEM dll. If the rcHTPatternID is zero it is assumed there is no resource and that this callback will generate a pattern on the fly. If a valid ID does exist, unidrv5 will retrieve the resource and if this callback exists, let it unencrypt or otherwise modify the pattern. If this callback does not exist and halftone resource is valid it is assumed the resource is not encrypted and will be used directly.

```
HRESULT
HalftonePattern (
        PDEVOBJ    pdevobj,
        PBYTE      pHTPattern,
        DWORD      dwHTPatternX,
        DWORD      dwHTPatternY,
        DWORD      dwHTNumPatterns,
        DWORD      dwCallbackID,
        PBYTE      pResource,
        DWORD      dwResourceSize
);
``` pdevobj: pointer to the DEVOBJ.

pHTPattern: Pointer to location to store halftone pattern with a size of (((dwHTPatternX*dwHTPatternY)+3)/4)*4*dwHTNumPatterns bytes. Each individual pattern must be DWORD aligned.

dwHTPatternX: The X size of the custom halftone pattern as specified in the GPD.

dwHTPatternY: The Y size of the custom halftone pattern as specified in the GPD.

dwHTNumPatterns: The number of dither patterns defined which will be either 1 or 3 as specified in the GPD. When one, the same pattern is used for all color planes. Otherwise three different patterns are defined which allows a different halftone pattern for each color.

dwCallbackID: the callback ID value specified in the Halftone option (HTCallback) in the GPD file. This selects one particular halftone method if the Halftone option specifies multiple halftoning callback ids.

pResource: Pointer to the resource found for this halftone type. If NULL it implies the function will generate a halftone pattern internally.

dwResourceSize: Size of the resource if any. If pResource is NULL this will be zero.

Return Value

S_OK if the function succeeds, E_FAIL if it fails, or E_NOTIMPL if it's not implemented.

If the MemoryUsage callback is provided by the OEM DLL, it will be used to determine the amount of memory required by the ImageProcessing function. This information will be used to adjust the optimum size of the shadow bitmap for banding. For example, if GDI reports that the optimum memory to use for banding is 8MB this value will be reduced by the results of this function and a smaller band will result. If this function does not exist it will be assumed that the memory usage is negligible.

```
         HRESULT
MemoryUsage (
        PDEVOBJ                      pdevobj,
        POEMMEMORYUSAGE pMemoryUsage
        );
``` pdevobj: pointer to the DEVOBJ.

pMemoryUsage: Pointer to structure to be filled in by OEM function specifying memory requirements.

```
typedef struct {
        DWORD    dwFixedMemoryUsage;       // fixed memory
used by function in bytes
        DWORD    dwPercentMemoryUsage;    // variable memory
used as a percentage of shadow bitmap
        DWORD    dwMaxBandSize;           // [in]
parameter, specified current max band size
} OEMMEMORYUSAGE, *POEMMEMORYUSAGE;
```

Return Value

S_OK if the function succeeds, E_FAIL if it fails, or E_NOTIMPL if it's not implemented.

The fixed memory usage specifies the amount of memory used independent of the size of the shadow bitmap. The variable memory usage is specified as a percentage of the memory used by the shadow bitmap. For example if the shadow bitmap is 24 BPP and the OEMImageProcessing function is going to halftone it down to 4 BPP into a separate buffer then the dwPercentMemoryUsage should be set to about 17 since the buffer will be about 17% of the size of the shadow bitmap. The dwMaxBandSize parameter is an in parameter that specifies what the maximum band size will be if both MemoryUsage parameters are set to zero.

UNIDRV5 font module callback interface is a GDI-object-like interface. Callback functions have UNIFONTOBJ as a parameter, which is a font module callback interface base object. Basic information is stored in this object. Additionally UNIDRV5 provides a service function for minidrivers to let them get an extra information. Minidriver must not change UNIFONTOBJ members.

```
typedef BOOL (*PFNGETINFO)(PUNIFONTOBJ, DWORD, PVOID);
typedef struct_UNIFONTOBJ {
    ULONG       ulFontID;    // download id . . .
                             // Font Resource id incase of Device Fonts.
    DWORD       dwFlags;     // General Flags.
    IFIMETRICS  *pIFIMetrics; // Pointer to IFIMETRICS.
    PFNGETINFO  pfnGetInfo;  // Pointer to UNIFONTOBJ_GetInfo
    callback.
} UNIFONTOBJ, *PUNIFONTOBJ;
//
// UNIFONTOBJ.dwFlags
//
#define UFOFLAG_TTFONT          0x00000001
                             // only set if this is TrueType font.
#define UFOFLAG_TTDOWNLOAD_BITMAP  0x00000002
#define UFOFLAG_TTDOWNLOAD_TTOUTLINE 0x00000004
```

UNIFONTOBJ.dwFlags is set by UNIDRV5. A minidriver must not change this flag.

This function downloads the font header as an appropriate format to a printer to create download font. UNIDRV5 supports only PCL type bitmap/TT outline download. If a printer has bitmap/outline font download feature of which format is different from PCL format, minidriver can support its download format by providing the font download callbacks. If minidriver supports this function, it has to support DownloadCharGlyph callback function as well.

```
HRESULT
DownloadFontHeader(
    PDEVOBJ    pdevobj,
    PUNIFONTOBJ pUFObj,
    DWORD      *pdwResult);
Pdevobj               Pointer to the DEVOBJ
PUFObj                Pointer to the UNIFONTOBJ
PdwResult             Contains the amount of necessary mem-
                      ory to download the font header
```

Return Value

S_OK if the function succeeds, E_FAIL if it fails, or E_NOTIMPL if it's not implemented.

The DownloadCharGlyph function download the character glyph data. There are two glyph data formats that are supported: bitmap and TrueType outline.

```
HRESULT
DownloadCharGlyph(
    PDEVOBJ    pdevobj,
    PUNIFONTOBI pUFObj,
    HGLYPR     hGlyph,
    PDWORD     pdwWidth,
    DWORD      *pdwResult);
Pdevobj               Pointer to the DEVOBJ.
PUFObj                Pointer to the UNIFONTOBJ
HGlyph                Glyph handle to download.
PdwWidth              Pointer to the DWORD width buffer.
                      Minidirer has to set the width of
                      downloaded glyph data.
PdwResult             Necessary amount of memory to
                      download this character glyph in the
                      printer. If returning 0, UNIDRV5
                      assumes that this function failed
```

Return Value

S_OK if the function succeeds, E_FAIL if it fails, or E_NOTIMPL if it's not implemented.

The OutputCharStr callback is provided for a character code manipulation. Minidriver can convert a character code to an appropriate one for the printer. If minidriver needs to get the width data of a character, minidriver can get the width by UNIFONTOBJ_GetInfo callback or access UFM data directly to get width table.

```
HRESULT
OutputCharStr(
    PDEVOBJ    pdevobj,
    PUNIFONTOBJ pUFObj,
    DWORD      dwType,
    DWORD      dwCount,
    PVOID      pGlyph);
#define TYPE_UNICODE            1
#define TYPE_TRANSDATA          2
#define TYPE_GLYPHHANDLE        3
#define TYPE_GLYPHID            4
Pdevobj               Pointer to the DEVOBJ
PUFObj                Pointer to the UNIFONTOBJ
DwType                Type of pglyph string. One of following is
                      specified by UNIDRV5.
                          TYPE_GLYPHHANDLE
                          TYPE_GLYPHID
DwCount               Number of the glyph store in pGlyph
PGlyph                Pointer to glyph string to
                      HGLYPH* (TYPE_GLYPHHANDLE)
                      Glyph handle that GDI passes.
                      DWORD* (TYPE_GLYPHID). Glyph ID
                      that UNIDRV5 creates from Glyph Handle.
                      In case of TrueType font, string type is
                      HGLYPH*. For Device font, string type
                      is DWORD*.
```

Return Value

S_OK if the function succeeds, E_FAIL if it fails, or E_NOTIMPL if it's not implemented.

Before downloading a TrueType font, UNIDRV5 calls this function to determine which format is supported or if TrueType can be downloaded for this font given the current situation.

```
HRESULT
TTDownloadMethod(
    PDEVOBJ    pdevobj,
    PUNIFONTOBJ pFontObj,
    DWORD      *pdwResult);
#define TTDOWNLOAD_DONTCARE     0
#define TTDOWNLOAD_GRAPHICS     1
#define TTDOWNLOAD_BITMAP       2
#define TTDOWNLOAD_TTOUTLINE    3
Pdevobj               Pointer to the DEVOBJ.
PfontObj              Pointer to the FONTOBJ.
``` pdwResult:
TTDOWNLOAD_DONTCARE Minidriver does not care how this font is handled.
TTDOWNLOAD_GRAPHICS Minidriver prefers printing this TT font as graphics.
TTDOWNLOAD_BITMAP Minidriver prefers download this TT font as bitmap soft font.
TTDOWNLOAD_TTOUTLINE Minidriver prefers downloading this TT fonta as TT outline soft font. This printer must have TT rasterizer support. UNIDRV5 will provide pointer to the memory mapped TT file, through callback. The minidriver has to parser the TT file by itself.

Return Value

S_OK if the function succeeds, E_FAIL if it fails, or E_NOTIMPL if it's not implemented.

UNIDRV5 supports only PCL scalable font select command format. If OEM printer supports a different command format from PCL for scalable font select command, minidriver has to support this callback function. The select command in font metrics data is passed in FInv parameter and the minidriver can customize the command string before sending it via DrvWriteSpoolBuf.

```
HRESULT
SendFontCmd(
    PDEVOBJ     pdevobj,
    PUNIFONTOBJ pUFObj,
    PFINVOCATION pFInv);
typedef struct_FINVOCATION {
    DWORD dwCount;      // Size of command
    PBYTE pubCommand;   // Pointer to font selection command
} FINVOCATION, *PFINVOCATION;
```

Pdevobj Pointer to the PDEVOBJ.
PUFObj Pointer to the UNIFONTOBJ
PFInv Pointer to the FINVOCATION Return Value S_OK if the function succeeds, E_FAIL if it fails, or E_NOTIMPL if it is not implemented.

Example: UFM has the font selection command in it. Following is the example of font selection command.

"\x1B(9U\x1B(s4148t0b0s#FontHeight1P\x1B)6J\x1B(s4148t0b0s#FontWidth1P"

UNIDRV5 passes this selection command in pFInv.

pFInv→dwCount=57;

pFInv→pubCommand=

"\x1B(9U\x1B(s4148t0b0s#FontHeight1P\x1B)6J\x1B(s4148t0b0s#FontWidth1P"

In this callback function, a minidriver has to set correct value in #FontHeight and #FontWidth, using UNIFONTOBJ information. And it sends to the printer.

UNIFONTOBJ provides GDI-object-like callback interface for minidrivers. Minidriver can query a necessary information with this interface.

```
BOOL
UNIFONTOBJ_GetInfo(
    UNIFONTOBJ pUFObj,
    DWORD      dwInfoID,
    PVOID      pData);
PUFObj      Pointer to the UNIFONTOBJ
DwInfoID    Type of information to get
PData       Pointer to the data structure
```

Return value: Return TRUE if succeeds. Otherwise, FALSE.

This function supports following functionality to return data to the minidriver.

| DwInfoID | Functionality |
| --- | --- |
| UFO_GETINFO_FONTOBJ | Get FONTOBJ |
| UFO_GETINFO_GLYPHSTRING | Get glyph string |
| UFO_GETINFO_GLYPHDATA | Get glyph data |
| UFO_GETINFO_GLYPHWIDTH | Get glyph width data |
| UFO_GETINFO_MEMORY | Get remained memory |
| UFO_GETINFO_STDVARIABLE | Get GPD standard variable. |

Minidriver has to pass a pointer to GETINFO_FONTOBJ structure in pData and dwSize in GETINFO_FONTOBJ structure. UNIDRV5 sets a pointer to FONTOBJ in GETINFO_FONTOBJ.pFontObj. This function is available in any font callback function.

```
typedef struct_GETINFO_FONTOBJ {
    DWORD    dwSize;   // Size of the buffer.
    FONTOBJ *pFontobj; // Pointer to FONTOBJ
} GETINFO_FONTOBJ, *PGETINFO_FONTOBJ;
```

Minidriver has to pass a pointer to GETINFO_GLYPHSTRING structure in pData. A minidrver sets values in dwSize, dwTypeIn, dwTypeOut and pGlyphIn, and prepares a buffer for pGlyphOut. UNIDRV5 returns glyph data in pGlyphOut. This function is available for printer device fonts in any font callback function. But for TrueType font, only characters that is passed via DrvTextOut can be handled by UNIDRV5.

```
typedef struct_GETINFO_GLYPHSTRING {
    DWORD  dwSize;    // Size of the buffer.
    DWORD  dwTypeIn;  // Type of glyph,TYPE_GLYPHID or
                      TYPE_GLYPHHANDLE
    PVOID  pGlyphIn;  // Glyph string
    DWORD  dwTypeOut; // Type of glyph,TYPE_UNICODE
                      or TYPE_TRANSDATA
    PVOID  pGlyphOut; // Glyph string to be filled by UNIDRV5
} GETINFO_GLYPHSTRING, *PGETINFO_GLYPHSTRING;
```

Minidriver has to pass a pointer to GETINFO_GLYPHDATA structure in pData and set dwSize. Minidriver sets values in dwGlyphID and dwType. UNIDRV5 returns glyph data in pGlyphData. This function is available in any font callback function.

```
typedef struct_GETINFO_GLYHPHDATA {
    DWORD     dwSize;    // Size of the buffer.
    HGLYPH    hGlyph;    // Glyph handle
    GLYPHDATA *pGlyphData; // Pointer to GLYPHDATA
} GETINFO_GLYPHDATA, *PGETINFO_GLYPHDATA;
```

Minidriver has to pass a pointer to GETINFO_GLYPHWIDTH structure in pData. In GETINFO_GLYPHWIDTH structure minidriver has to set the type of glyph, UNICODE or Glyph Handle. And set a pointer to the strings.

```
typedef struct_GETINFO_GLYHPHWIDTH {
    DWORD dwSize; // Size of the buffer.
    DWORD dwType; // TYPE_GLYPHHANDLE or
                   TYPE_GLYPHID.
    DWORD dwCount; // Count of glyph.
    PVOID pvGlyph; // Glyph string of which width data is required.
```

```
    PLONG plWidth; // Width buffer to be filled by UNIDRV5.
} GETINFO_GLYPHWIDTH, *PGETINFO_GLYPHWIDTH;
```

Minidriver has to set the type of glyph and glyph width data.

Minidriver has to pass a pointer to GETINFO_MEMORY structure in pData.

```
typedef struct_GETINFO_MEMORY {
    DWORD dwSize;             // Size of the buffer.
    DWORD dwRemainingMemory;  // UNIDRV5 returns the remaining
       memory.
} GETINFO_MEMORY,*PGETINFOR_MEMORY;
```

Minidriver has to pass a pointer to GETINFO_FONTOBJ structure in pData. Minidriver can get standard variables from UNIDRV5 at any time in font callback.

```
typedef struct GETNFO_STDVAR {
    DWORD dwSize; // Size of the buffer.
    DWORD dwNumOfVariable;
    struct {
        DWORD dwStdVarID;
        LONG lStdVariable;
    } Stdvar[1];
} GETINFO_STDVER, *PGETINFO_STDVER;
``` define FNT_INFO_PRINTDIRINCCDEGREES 0//PrintDirInCCDegrees
define FNT_INFO_GRAYPERCENTAGE 1//GrayPercentage
define FNT_INFO_NEXTFONTID 2//NextfontID
define FNT_INFO_NEXTGLYPH 3//NextGlyph
define FNT_INFO_FONTHEIGHT 4//FontHeight
define FNT_INFO_FONTWIDTH 5//FontWidth
define FNT_INFO_FONTINTLEADING 6//FontIntLeading
define FNT_INFO_FONTBOLD 7//FontBold
define FNT_INFO_FONTITALIC 8//FontItalic
define FNT_INFO_FONTUNDERLINE 9//FontUnderline
define FNT_INFO_FONTSTRIKETHRU 10//FontStrikeThru
define FNT_INFO_CURRENTFONTID 11//Current
define FNT_INFO_TEXTYRES 12//TextYRes
define FNT_INFO_TEXTXRES 13//TextXRes
define FNT_INFO_MAX 14

The following callbacks are used for Device Managed Surface. The DriverDMS function is called during DrvEnableSurface to determine the type of surface to create—Bitmap or Device.

```
            HRESULT
            DriverDMS(
                PVOID pDevObj,
                PVOID pBuffer,
                DWORD cbSize,
                PDWORD pcbNeeded
            );
``` pDevObj: Driver's PDEV.
pBuffer: Pointer to output buffer which holds the return data. pBuffer is used to find out if the driver will be a bitmap surface driver or a device managed driver. If OEMGetInfo returns FALSE, the default mode will be a bitmap surface driver. If pBuffer is 0 a bitmap surface is created in DrvEnableSurface. If pBuffer is not 0, then a device managed surface is created. The pBuffer value is used as flHooks in the EngAssociateSurface call.
cbSize: Specifies the size of the buffer pointed by pBuffer.
pcbNeeded: Pointer to a DWORD. Returns the number of bytes written into the output buffer by the OEM plugin. If the output buffer is not large enough, OEM plugin should return FALSE and set the error code to ERROR_INSUFFICIENT_BUFFER. In that case, this variable returns the size of the expected output buffer.

Return Value

S_OK if the function succeeds, E_FAIL if it fails, or E_NOTIMPL if it is not implemented. The reason for the failure should be set via SetLastError.

For DMS support, OEMs must export this function that will draw the text as bitmap. The function TextOutAsBitmap will have the same parameters as DrvTextOut.

```
            TextOutAsBitmap(
                SURFOBJ    *pso,
                STROBJ     *pstro,
                FONTOBJ    *pfo,
                CLIPOBJ    *pco,
                RECTL      *prclExtra,
                RECTL      *prclOpaque,
                BRUSHOBJ   *pboFore,
                BRUSHOBJ   *pboOpaque,
                POINTL     *pptlOrg,
                MIX        mix
            );
```

Return Value
S_OK if the function succeeds, E_FAIL if it fails, or E_NOTIMPL if it is not implemented. The reason for the failure should be set via SetLastError.

The following call back is required for Text Only minidriver. The TTYGetInfo callback need not be implemented by other OEMs minidrivers. This callback function is used to get the information, like margin, from Text Only minidriver.

```
            HRESULT
            TTYGetInfo(
                PDEVOBJ    pdevobj,
                DWORD      dwInfoIndex,
                PVOID      pOutputBuf,
                DWORD      dwSize,
                DWORD      *pcbcNeeded);
``` pDevObj: Driver's PDEV.
dwInfoIndex: Information Index for which call is made.
Currently following indexes are supported
define OEMTTY_INFO_MARGINS 1
define OEMTTY_INFO_CODEPAGE 2 pOutputBuffer: Buffer where data will be copied.

dwSize: Specifies the size of the buffer pointed by pOutputBuffer.

pcbNeeded: Pointer to a DWORD. Returns the number of bytes written into the output buffer by the OEM plugin. If the output buffer is not large enough, OEM plugin should return FALSE and set the error code to ERROR_INSUFFICIENT_BUFFER. In that case, this variable returns the size of the expected output buffer.

Return Value

S_OK if the function succeeds, E_FAIL if it fails, or E_NOTIMPL if it is not implemented. The reason for the failure should be set via SetLastError.

The printer driver of the instant invention provides a helper function interface to the OEM DLL. These helper functions are obtained by the OEM DLL through querying the driver for its helper function interface.

```
HRESULT
DrvWriteSpoolBuf(
    PDEVOBJ pdevobj,
    PVOID pBuffer,
    DWORD   cbSize,
            DWORD   *pdwResult
);
``` pdevobj: points to DEVOBJ structure pBuffer: points to the buffer of data to be sent to the spooler.

cbSize: number of bytes in the buffer.

pdwResult: contains the number of bytes actually sent to the spooler.

Return Value

S_OK if the function succeeds, E_FAIL if it fails, or E_NOTIMPL if it is not implemented.

```
HRESULT
DrvXMoveTo(
    PDEVOBJ pdevobj,
    INT             x,
    DWORD           dwFlags,
    INT             *piResult
);
HRESULT
DrvYMoveTo(
    PDEVOBJ pdevobj,
    INT             y,
    DWORD           dwFlags,
    INT             *piResult
);
``` pdevobj: points to DEVOBJ structure.

x (y): the move value.

dwFlags: a combination of one or more of the following flags.

MV_UPDATE: update the driver's tracking of the cursor position but do not send any printer escapes to position the cursor. If this flag is not set, the driver will send printer escapes to move the cursor and update its internal cursor tracking. This flag is used when the cursor position is changed due to sending graphics data or text.

MV_RELATIVE: the given x (y) value is relative to the previous cursor position. If this flag is not set, then the given x (y) value is the absolute cursor position.

MV_GRAPHICS: the given x (y) value is in the graphics resolution unit (as defined by *DPI entry of the currently selected resolution). If this flag is not set, then the given x (y) value is in the master unit.

MV_PHYSICAL: the given x (y) value is relative to the printer's cursor origin. If this flag is not set, then the given x (y) value is relative to the printable origin. Note that this flag cannot be set if MV_RELATIVE is set.

piResult: Contains the difference (in the master unit) between the requested move amount and the actual move amount. It is always positive.

The DrvGetStandardVariable function is used by OEM to retrieve state variables known to Unidriver.

```
HRESULT
DrvGetStandardVariable(
    PDEVOBJ     pdevobj,
    DWORD       dwIndex,
    PVOID       pBuffer,
    DWORD       cbSize,
    PDWORD      pcbNeeded
);
``` pdevobj: points to DEVOBJ structure.

dwIndex: index of standard variable to retrieve.

pBuffer: Pointer to output buffer which holds the return data.

cbSize: Specifies the size of the buffer pointed by pBuffer.

pcbNeeded: Pointer to a DWORD. Returns the number of bytes written into the output buffer by the Unidriver. If the output buffer is not large enough, Unidriver will return E_FAIL and set the error code to ERROR_INSUFFICIENT_BUFFER. In that case, this variable returns the size of the expected output buffer. OEM should allocate a buffer of this new size and call this function again.

Return Value

S_OK if the function succeeds, E_FAIL if it fails, or E_NOTIMPL if it is not implemented.

The reason for the failure should be set via SetLastError.

DrvUniTextOut is provided as a helper call so that OEMs do not have to replicate the entire text functionality of Unidrive. This helper function expects the same parameters as DrvTextOut.

```
HRESULT
DrvUniTextOut(
    SURFOBJ     *pso,
                STROBJ      *pstro,
    FONTOBJ     *pfo,
    CLIPOBJ     *pCO,
    RECTL       *prclExtra,
    RECTL       *prclOpaque,
    BRUSHOBJ    *pboFore,
    BRUSHOBJ    *pboOpaque,
    POINTL      *pptlBrushOrg,
    MIX         mix
);
```

DrvGetGPDData is provided as a helper call so that OEMs mini drivers can access vendor specific binary data defined in GPD file.

```
HRESULT
DrvGetGPDData(
        PDEVOBJ     pdevobj,
        DWORD       dwType,
        PVOID       pInputData,
        PVOID       pBuffer,
        DWORD       cbSize,
        PDWORD      pcbNeeded
);
``` pdevobj: points to DEVOBJ structure.

dwType: Type of the GPD data. In NT 5.0 only the following type is recognized.

Other values are ignored.

define GPD_OEMCUSTOMDATA 1 pInputData: Reserved. Should be set to 0 pBuffer: Pointer to output buffer, which holds the return data.

cbSize: Specifies the size of the buffer pointed by pBuffer.

pcbNeeded: If the output buffer is not large enough, Unidriver will return E_FAIL and set the error code to ERROR_INSUFFICIENT_BUFFER. In that case, this variable returns the size of the expected output buffer. OEM should allocate a buffer of this new size and call this function again.

Return Value

S_OK if the function succeeds, E_FAIL if it fails, or E_NOTIMPL if it is not implemented.

The reason for the failure should be set via SetLastError.

To allow the above described OEM customization of the Unidrv5, a text based generic printer description (GPD) must be generated as the minidriver. A Generic Printer Description (GPD) file in accordance with the instant invention is a text-based file used to describe a printer for printing from Microsoft Windows NT using the Universal Printer Driver (Unidrv5) of the instant invention. Such a file utilizing GPD contains information about the printer features which Unidrv5 will use to present in the UI and allow the user to configure the printer. It also contains the printer commands and attributes which enable Unidrv5 to generate the correct printer-ready output data when the user prints from a Windows application. Creating a Windows NT printer driver utilizing the teachings of the instant invention can be as simple as creating a GPD file if there is no custom functionality beyond what Unidrv5 provides.

The following defines an exemplary embodiment of a GPD file format and its semantics. A feature of GPD is its built-in capability of evolving as new printers appear on the market. It is designed to be simple, extensible, easy to understand, maintain, and localize. As described above, the Unidrv5 of the instant invention is compatible with and will run on operating systems, such as Windows NT 5.0 and above, although adaptation of these teachings to other operating systems is possible. However, the development of new minidrivers directly in the new GPD format as described herein provides much more flexibility in describing printer-specific features, installable options, constraints, dependency and command ordering than is possible with the older GPC. In addition, the text-based nature of the GPD data files are much easier to maintain and track than binary data files created with GPC.

An exemplary embodiment of a file structure is described hereinbelow in accordance with the teachings of the instant invention. One skilled in the art will recognize, however, that other embodiments and particulars of a file structure are possible in accordance with the teachings of the instant invention. Therefore, this exemplary embodiment should be taken as illustrative only, and should not be used to limit the scope of the invention as defined by the appended claims.

A GPD file composed in accordance with the instant invention is basically a series of attribute definitions in the form of <name>:<value> pair. Such a <name>:<value> pair is called an entry. Entries must be separated from each other by a logical line break. Related entries can be grouped together, via grouping constructs, to represent an abstract object such as a PaperSize feature or a Letter size option. An entry is a basic element of a GPD file which defines a specific attribute. Some entries are mandatory, such as the printer model name, while others are optional either because the default value meets the needs or because they are applicable only to a particular type of printers. If an entry definition is repeated, the last definition is used unless otherwise specified. All entries are pre-defined, including the entry name and the value type. For clarity, all entry names start with a asterisk ('*'). As an example of this concept, the Canon BubbleJet BJC-600 printer model name is specified as:

*ModelName: "Canon BubbleJet BJC-600"

The name of this entry is *ModelName, and its value is a quoted string "Canon BubbleJet BJC-600". Another required entry is the definition of the master units, which are used to express measurements in a GPD file:

*MasterUnits: PAIR(360,360)

Here, the entry name is *MasterUnits and the value is a pair of integers (360,360), defining the master X and master Y units in dots-per-inch.

A white space is either a space character or a TAB character. A line break character is a CR (carriage return), LF (line feed), or both together, which typically terminates an entry. A white character is defined to be either a white space or a line break character. A comment starts with the character sequence "*%" and ends with a line break character, which typically terminates the entry. Comments are treated as whitespace, and can appear anywhere a white character can. The comment indicator "*%" must be preceded by a white character (except that no preceding white character is needed if the comment indicator is at the beginning of the file). For example,

*% both master X and master Y units are 360 dpi.

*MasterUnits: PAIR(360,360)

or, alternatively,

*MasterUnits: PAIR(360,360) *% both master X and master Y units are 360 dpi.

The plus character, '+', is used as the continuation character and it must appear as the first character (at column 0) in a line. A line break character followed immediately by a continuation character is called a continuation line break. An arbitrary white space is defined to be a white space, a continuation line break, a comment terminated by a continuation line break, or any combination of them. An arbitrary white space of any length can appear between any two tokens and it is ignored by the parser. Arbitrary white space does not terminate an entry—this is accomplished only by a logical line break. A token is a basic parsing entity in GPD.

In the above example, there are 8 tokens:

1. *MasterUnits
2. :
3. PAIR
4. (
5. 360
6. ,
7. 360
8. )

A line break character not followed by the continuation character is called a logical line break. A logical line break terminates an entry definition. Construct delimiters, the curly brace '{' and '}', may also terminate an entry. Construct delimiters also act as entry delimiters i.e. as a logical line break.

A Construct Keyword is one that introduces a construct. It is followed by an open curly brace, one or more statements or constructs and a closing curly brace. If a Construct Keyword is not recognized by the parser, the entire construct is ignored. A special keyword *IgnoreBlock allows blocks of statements to be 'commented out'. If *IgnoreBlock is followed by an open curly brace, all statements up to the matching closing curly brace are ignored. This may be useful when GPD files are being developed or debugged. All statements within the *IgnoreBlock must still adhere to the basic GPD syntax. The construct delimiters define a nesting level, that is to say, all entries bracketed by a pair of curly braces are considered to be at a non-zero nesting level. The level is determined by the number of pairs of curly braces by which the entries are bracketed. Entries which are not enclosed by any curly braces are at nesting level 0 or the root level. Entries defined within curly braces often have limited scope.

The following is a list and associated description of value types supported by this exemplary embodiment of GPD.

Quoted String: a quoted string is enclosed by a pair of double quotes. It may contain any byte values expressed in the form of ASCII characters or hexadecimals. Hexadecimals are enclosed by a pair of angle brackets ('<' and '>'). To use the left angle bracket or the double quote letter literally within a quoted string, the escape letter ('%') must precede it. The escape char '%' is not used when the right angle bracket ('>') appears literally within a string.

"%"" this is a quoted string containing one double quote character.

"%<" this is a quoted string containing one left angle bracket character.

">" this is a quoted string containing one right angle bracket character.

"abc<64 65 66>" is the same as "abc<646566>" is the same as

"abc<64><65><66>" is the same as "abcdef"

Within a normal quoted string an escape char '%' not immediately followed by a double quote or left angle bracket character is treated as a literal. However within a quoted string being used as part of a command invocation, the escape char '%' must be followed by another '%' to be treated as a single literal '%'—the escape char '%' therefore must appear in only 3 possible combinations: followed by a double quote, left angle bracket or another escape char . Example: "set print intensity to 100%."—the 'percent-period' combination is treated as a literal pair in a normal quoted string. However this combination is illegal if the quoted string is used in a command invocation, the percent character must be expressed using the double %%: "set print intensity to 100%%."

The only way to escape the escape character is to express it in hexadecimal form <25>. For example "<25>" is a quoted string containing one character, a literal '%', but "%"" is an incomplete quoted string containing the literal double quote character, but no closing double quote—resulting in a syntax error. Arbitrary white spaces are allowed inside a hexadecimal sequence and they are ignored. But logical line breaks cannot appear inside a hexadecimal sequence or a quoted string. For example, the selection command for Letter size on Canon BJC-600 is the byte sequence 1B 28 67 03 00 6E 01 72 and it can be described as:

*CmdSelect: "<1B>(g<03 00>n<01>r"

A string value can be comprised of one or more quoted string segments. Each quoted string segment may be separated from the next by zero, one or more characters of arbitrary white space. The string value is the concatenation of all the quoted substrings. For example:

*Name: "abc" *% embedded comment—note continuation character on next line+"def" "gh" "ijk"

is the same as

*Name: "abcdefghijk"

If a quoted string is too long to fit into one line, it can be broken up into multiple segments and each segment enclosed by a pair of double quotes. The continuation character can be used to concatenate multiple string segments and it must appear as the first character (at column 0) of a line.

In general, there are two ways to define a quoted string in a GPD file: define it directly in the GPD file or reference a Windows string resource ID defined in the resource DLL specified via *ResourceDLL entry. For strings that require localization, it may be preferable to define them in resource DLL since there are standard localization tools. When a string is defined in a Windows resource DLL, it must follow the rules of a Windows resource file.

Symbol: a symbol is a user-defined name that can be used to identify an entity such as a grouping construct or an option. A symbol must start with a letter (except '*') and is composed of letters, numbers, and the underscore letter '_' (case-sensitive). There are some pre-defined symbols for standard features and options, such as PaperSize, Letter, Legal, A4, InputBin, EnvFeed, etc.

Constants: a constant is a pre-defined value such as a section name: JOB_SETUP, DOC_SETUP, PAGE_SETUP, etc. Typically, the constant names are all in capital letters.

Integer: an integer is used to express a measurement. It can be either positive or negative. For example, HP LaserJet 4L limits the maximum number of copies to 99:

*MaxCopies: 99

A special value, '*', represents "any value" or "no limit" depending on the specific entry meaning. If applicable, all measurements are in the master X and Y units. Integers may also be expressed in hexadecimal format. In this case the hex digits must be immediately preceded by 0x, for example 0xffff. No + or − sign may be used in hexadecimal format.

PAIR: a PAIR is a pair of integers that are used to express measurements in the master units if applicable. For example, on HP LaserJet 4L, the cursor origin on Letter size paper in Portrait orientation is X=150 and Y=100 (in 600 dpi unit):

*CursorOrigin: PAIR(150,100)

RECT: a RECT is a group of four integers that are used to express measurements in the master units (if applicable).

Boolean: a Boolean value is either TRUE or FALSE.

Qualified Name: a qualified name is the concatenation of two symbols in the form of <FeatureName>.<OptionName>. For example, to identify the Letter size paper option, we can use PaperSize.Letter. The name on the left of the dot serves as a qualifier which narrows down the scope of the name on the right. A qualified name is viewed as one identifier, i.e. no white space is allowed before and after the concatenating letter '.'. Sometimes it is acceptable to specify just the <FeatureName> which is generally equivalent to enumerating all options in that feature.

LIST: a list is an enumeration of zero or more values. For example, Canon BJC-600 wants both enclosed and trailing blanks to be removed from the raster data:

*StripBlanks: LIST(ENCLOSED, TRAILING)

The values in the list must be of the same type which can be symbols, constants, integers, or qualified names. The ordering of these values can be significant depending on the specific entry meaning. For example, Canon BJC-600 wants to send out color plane data in increasing darkness:

*ColorPlaneOrder: LIST(YELLOW, MAGENTA, CYAN, BLACK)

Global entries are simple <name>:<value> pair entries whose meaning applies to the whole GPD file. Non Relocatable Global entries are used to describe attributes or values that are static, unchanging and independent of printer configuration. They always appear at the root level and typically at the beginning of a GPD file. In a preferred embodiment of the instant invention, the following keywords are declared to be Non Relocatable Global entries:

| Entry Name | Description | Comments |
| --- | --- | --- |
| *GPDSpecVersion | Quoted string in the form of "<MajorVerNumber>.<MinorVerNumber >", the GPD spec version. Example: "1.0". | Required. This must be the first entry in a GPD file, before any comments. In other words, the first 15 characters in any root GPD file must be *GpDSpecVersion. |
| *GPDFileVersion | User defined Quoted string. | Optional. If exists will be displayed in About Box. The suggested format is that used for *GPDSpecVersion. If omitted, the string is NULL. |
| *GPDFileName | Quoted string containing the name of the GPD file. No path information should be included. | Optional. |
| *MasterUnits | PAIR(<xUnit>,<yUnit>), the X and Y master units. The master units must be the common multiples that all resolution units | Required. All numbers in the GPD are expressed in master units, if applicable. It is suggested that the resolution units used |

-continued

| Entry Name | Description | Comments |
| --- | --- | --- |
| | and the X/Y movement units evenly factor into. For example, if the resolutions are 240x216 dpi and 120x144 dpi, the X-move unit is 1/60 inch, and the Y-move unit is 1/216 inch, then the smallest master units are PAIR(240,432). PAIR (720,432) is also fine since 240 factor evenly into 720. | in the font metrics data be identical to the master units in order to reduce round-off errors in calculation. |
| *CodePage | Integer, any of Microsoft Windows pre-defined code page id's. It specifies the code page in which *ModelName, *Name, *CartridgeName, *TTFontName, and *DevFontName entry values are expressed in. For example, Windows 3.1 US (ANSI) is 1252; Windows 3.1 Cyrillic is 1251; Japanese is 932. | Optional. If missing, assume the string is in UNICODE. Note that *CodePage applies only to strings as listed on the left. If used, it must be defined before any such string entries are defined. If it is re-defined, the new value applies to string entries after this point. Multi-byte characters must be expressed as <hex strings>. Two hex chars define one byte, the leftmost byte occupies the lowest address in the string, with subsequent bytes having successively higher addresses. Therefore strings expressed in multi-byte character sets may need to be revised if ported to processors with a different byte ordering. |
| *ModelName | Quoted string, the printer model name. | Required. It must match the name in the SETUP.INF file. |
| *ResourceDLL | Quoted string, the name of the associated Windows resource DLL. This dll contains all display names, icons, bitmaps, fonts and other resources referenced by the GPD file. The name shouldn't contain path information like backslash char '\'. It should just be the DLL name. | Optional. If missing, assume that the GPD file has no reference to resource strings, icons, bitmaps, fonts, etc . . . |
| *rcPrinterIconID | Integer, the Windows RC_ICON resource ID for the printer icon in the associated resource DLL. It is suggested that all RC_ICON ID's in a resource DLL be contiguous and start from 1. | Optional. If missing, the default printer icon is used in the user interface. |
| *PrinterType | Constant(PAGE, SERIAL or TTY), the printer's type. | Required. |
| *Include | Quoted string, the name of the GPD file to be embedded. If multiple instances exist, all referenced GPD files are inserted in the order specified. | Optional. If missing, no embedded GPD files. It cannot reference any value macros and must be terminated by a logical line break. |
| *HelpFile | Quoted string, the custom help file name (with the extension | Optional. If missing, use the default help file for Unidrv5. If present, it |

-continued

| Entry Name | Description | Comments |
| --- | --- | --- |
| | .HLP). | will be used to extend and/or overwrite the default help text. |
| *InstalledOptionName | Quoted string. When there is any installable feature or option specified in the GPD file via "Installable? entry (defined later), the parser will synthesize a feature for each one. Such kind of features always have two options which correspond to whether the feature/option is installed or not. This entry will be used as the display name for the option which corresponds to "installed" state. Note that this display name will be used by all such synthesized features. | Optional. If it is missing and there is installable feature or option specified via *Installable? entry, then *rcInstalledOptionNameID is required. |
| *rcInstalledOptionNameID | Integer, the Windows string resource id corresponding to the string represented by *InstalledOptionName. | Optional. If it is missing and there is installable feature or option specified via *Installable? entry, then *InstalledOptionName is required. |
| *NotInstalledOptionName | Quoted string. When there is any installable feature or option specified in the GPD file via *Installable? entry (defined later), the parser will synthesize a feature for each one. Such kind of features always have two options which correspond to whether the feature/option is installed or not. This entry will be used as the display name for the option which corresponds to "not installed" state. Note that this display name will be used by all such synthesized features. | Optional. If it is missing and there is installable feature or option specified via *Installable? entry, then *rcNotInstalledOptionNameID is required. |
| *rcNotInstalledOptionNameID | Integer, the Windows string resource id corresponding to the string represented by *NotInstalledOptionName. | Optional. If it is missing and there is installable feature or option specified via *Installable? entry, then *NotInstalledOptionName is required. |
| *MaxCopies | Integer, the maximum number of copies that the printer supports. | Optional. If missing, assume no support for multiple-copy printing. |
| *PrintRate | an integer, describing the printer's printing speed in monochrome mode. The unit for the value is defined in *PrintRateUnit. | This entry is optional. If missing, assume 0. |
| *PrintRateUnit | a constant: PPM (pages per minute), CPS (characters per second), LPM (lines per minute), IPM (inches per minute for plotters). The GPD file should specify the appropriate unit based on the printer type (ex. | This entry is required if *PrintRate is defined. |

-continued

| Entry Name | Description | Comments |
| --- | --- | --- |
| | use PPM for page printers). | |
| *PrintRatePPM | An integer, printing speed in Pages Per Minute. | Optional. If missing assume 0. |
| *FontCartSlots | Integer, the number of font cartridge slots on the printer. | Optional. If missing, assume 0. |

Relocatable Global entries are used to describe attributes or values that may be dependent on printer configuration. They may be placed at the root level to signify this value/attribute has no such dependency but may also appear within *Option or *case constructs if there is some dependency. For example the set of available device fonts may depend on whether the printer is in portrait or landscape orientation. Therefore the keyword describing the list of available device fonts is defined by this spec to be a Relocatable Global keyword. The specifics of using Relocatable Global keywords to express such dependencies will be introduced later. To summarize, the classification of keywords into Relocatable and non-Relocatable entries is predetermined by the parser. It is not user definable. However the user may choose to treat Relocatable Globals the same as non-Relocatables if the attribute represented by that keyword is in fact independent of printer configuration. The following keywords are Relocatable Globals:

| Entry Name | Description | Comments |
| --- | --- | --- |
| *OEMCustomData | Quoted string, the contents of the string will be presented to an OEM plug in module that calls DrvGetGPDData( ). The parser and driver does nothing more with this data. | Optional. Required if OEM calls DrvGetGPDData( ). This entry may occur within a switch/case construct. The contents of the quoted string may include binary data, ascii or both. The contents is entirely determined by the GPD writer. |

Grouping constructs are used to define logical entities. The function of a Construct is similar the function of a structure in the C language. A construct allows a more detailed description of a printing attribute than is possible with a single *Keyword: Value pair. A construct begins with a construct keyword and it is associated value. Examples of construct keywords are *Feature, *Option, and *Command. The value is a symbolname that is used to uniquely identify this instance of the construct. For example the *Command: CmdStartPage construct is distinct from the *Command: CmdSleepTimeOut construct. If a construct with the same *Keyword and symbolname occurs more than once in the same GPD, the parser understands this to be a redefinition or elaboration of the original instance. Some constructs allow user-defined instances (symbolnames). For example the user is free to define as many *Feature constructs as he desires, labeling each instance using a symbolname of his choosing in addition to using any of the predefined Feature symbolnames. Some *Options are also user-definable in this manner, while some only allow the use the predefined symbolnames. For example user-defined Papersizes are allowed, but the only options allowed for the PageProtect and Collate features are "ON" and "OFF". The construct keyword and symbol name are followed by one or more entries surrounded by curly braces. For ease of readability, it is customary to indent all the entries bracketed by the curly braces. These entries form the body of the construct. An exemplary set of keywords and sub-constructs which are allowed within the body of each tpe of construct are described below. Some keywords are mandatory while others may be optional. The inclusion of other keywords will result in a parsing error.

Two of the most common constructs in this exemplary embodiment are *Feature and *Option. The *Feature construct defines a printer feature and provides Unidrv5's UI component the necessary information to present to the end-user a control that allows the end-user to select one or more options for that feature. Various features offer the user the opportunity to select a papersize, an input paperbin, to turn collation, stapling on/off etc. Each *Feature construct contains one or more *Option constructs that at a minimum enumerates the optionname the UI should display and the command that should be sent to the printer to invoke or select this particular option. Some features require additional information to be supplied to the driver to describe each of the options, for example the driver needs to know the imageable area of each supported papersize in order for the app to compose its pages properly and to avoid clipping or truncation of the output. All optional and required keywords allowed for each construct are enumerated herein. As an example, the following is a fragment of the *Feature construct describing the paper sizes supported by Canon BJC-600 printer showing the *Option constructs nested within the body of the *Feature construct. Note some required keyword entries have been omitted for the sake of simplicity.

```
*Feature: PaperSize
{
    *DefaultOption: Letter  *% the default paper size is Letter.
    *Option: Letter         *% define Letter option.
    {
        *Name: "Letter 8½ × 11 inch"
    }
    *Option: A4             *% define A4 option.
    {
        *Name: "A4 210 × 297 mm"
    }
    *% define more paper sizes . . .
    . . .
}
```

Although it may appear arbitrary, *Option constructs must be nested within *Feature constructs. *Feature constructs must always appear at the root level. Every *Feature construct should contain at least one *Option construct. If the *DefaultOption entry is missing, the first option listed is used as the default. If desired, the Default Option may be specified within *switch/*case constructs to express its dependence on the current option selection of other features, though if this is done, care must be taken when specifying the *ConflictPriority so an inconsistency or circular dependency does not arise.

The order of features and options within a feature relative to one another has some effect on the driver. For example, the UI code displays features and options in the order in which they appear in the GPD file. This is not a hard and fast rule, and one should consult specific UI documentation for specifics. Also in the absence of a *DefaultOption keyword, the first option becomes the default. The current implementation of the parser considers Features to be ordered based on their appearance in either a *switch or *Feature keyword.

The exception to this rule is the InputBin feature, which is always the first feature. Options are ordered based on their appearance in either a *case or *Option keyword. The exception to this rule is the synthesized "Automatically Select" InputBin slot which has the meaning that the FormToTray assignment table will be used to assign the input slot based on the selected paper size.

If the GPD writer wishes to define the order of the features and options relative to each other, he may 'declare' them ahead of any use in the GPD file using empty *Feature/ *Option constructs, for example:

```
*Feature: EconoMode{ *Option: Off{} *Option: On{} }
*Feature: Orientation{ *Option: PORTRAIT{} *Option:
LANDSCAPE_CC90{} }
*Feature: PaperSize{ *Option: LETTER{} *Option:
LEGAL{} *Option: EXECUTIVE{}
    *Option: A4{} *Option: ENV10{} *Option: ENV_DL{}
    *Option: ENV_MONARCH{} }
```

There are two types of UI features: custom features and standard features. Custom features are used to describe special printer features that Unidrv5 can fully implement knowing only the name of the *Feature and *Option for display in the UI and the selection command (and its order dependency) for invoking the feature. This allows new printer features to be supported without any modification to Unidrv5. For example, on the HP LaserJet 4L, there are several custom features such as EconoMode:

```
*Feature: EconoMode
{
    *Name: "EconoMode"
    *DefaultOption: Off
    *Option: Off
    {
        *Name: "Off"
        *Command: CmdSelect
        {
            *Order: DOC_SETUP.5  *% define the sequencing order
            for this command.
            *Cmd: "@PJL SET ECONOMODE=OFF<0A>"
        }
    }
    *Option: On
    {
        *Name: "On"
        *Command: CmdSelect
        {
            *Order: DOC_SETUP.5  *% define the sequencing order
            for this command.
            *Cmd: "@PJL SET ECONOMODE=ON<0A>"
        }
    }
}
```

Standard features are used to describe common printer features which Unidrv5 supports using special case code. For example Unidrv5 needs to be aware of the printer's current Landscape orientation setting since it will have to perform the landscape rotation if the printer does not have rotation capabilities built in. Standard features can have additional feature-specific entries that Unidrv5 understands and uses in printing. For example, PaperSize is a standard feature and its options contain the *PrintableArea entry which Unidrv5 uses to determine where pixels and text can be placed. The following is an exemplary list of standard features and options provided for by the instant invention.

| Standard Features | Description | Standard Options | Comments |
|---|---|---|---|
| Orientation | The list of logical orientations. | PORTRAIT, LANDSCAPE_CC90, LANDSCAPE_CC270. No custom options. | Optional. If missing, the printer supports only Portrait logical orientation. Standard orientation options use the id's defined in Windows SDK/DDK. |
| PaperSize | The list of paper sizes supported on the printer. These paper sizes will be enumerated to the apps and used in formatting documents. | CUSTOMSIZE, LETTER, LETTERSMALL TABLOID, LEDGER, LEGAL, STATEMENT, EXECUTIVE, A3, A4, etc. All Windows pre-defined paper sizes have associated standard names. Custom options are allowed. | Required. At least one option must be enumerated. Standard paper size options use the dimensions and id's as defined in Windows SDK/DDK. Custom option names cannot exceed the string length limit CCHFORMNAME defined in wingdi.h in the Windows SDK/DDK. |
| Resolution | The list of printing resolutions. | All options are considered custom. | Required. At least one option must be enumerated. |
| MediaType | The list of media types supported. | STANDARD, TRANSPARENCY, GLOSSY. Custom options are allowed. | Optional. If missing, the printer's default media type is always used. Standard media options use the id's defined in Windows SDK/DDK. |
| InputBin | The list of input bins supported. | UPPER, LOWER, MIDDLE, MANUAL, ENVFEED, ENVMANUAL, AUTO, TRACTOR, SMALLFMT, LARGEFMT, LARGECAPACITY, CASSETTE. Custom options are allowed. | Required. Standard input bin options use the id's defined in Windows SDK/DDK. |
| OutputBin | Enumeration of output bins supported. | All options are considered custom. | Optional. If missing, assume the printer does not support multiple or user selectable output bins. |
| Duplex | Two-sided printing. | NONE, VERTICAL, HORIZONTAL. No custom options. | Optional. If missing, assume the printer does not support two-sided printing. Standard duplex options use the id's defined in Windows SDK/DDK. |
| Collate | Collate printed pages or not. | ON, OFF. No custom options. | Optional. If missing, assume the printer does not support collation. |
| Memory | The list of printer memory configurations. | All options are considered custom. | Optional. If missing, Unidrv5 will not attempt to track memory usage. *FeatureType = PRINTER_PROPERTY by default |
| ColorMode | The list of color printing modes. | All options are considered custom. | Optional. If missing, it implies that the printer is monochrome and the driver will render images in 1 bpp/1 plane format. |
| Halftone | The list of halftoning options | Custom options are allowed. | Optional. If missing, only the standard halftone methods will be displayed for the user to choose. The default?? |
| Stapling | List of stapling options | All options are custom. | Optional. However using this feature keyword will cause Directory Services to assume your printer supports stapling. |
| PageProtect | The list of page protection options (used on page printers to prevent print overrun errors). | ON, OFF. No custom options. | Optional. This feature is enabled only if the current printer memory is greater. than the page protection memory needed for the current paper size. "FeatureType = PRINTER_PROPERTY by default |

If any *Feature or *Option construct is multiply defined, the contents (body) of the separate construct definitions are merged (Union) into a single construct. If this single construct now contains 2 or more statements containing the same keyword, the latter occurrence overwrites all previous occurrences. As an example:

```
*Feature: PaperSize
{
    *rcNameID: 2101
    *DefaultOption: Letter    *% the default paper size is Letter.
    *Option: Letter           *% define Letter option.
    {
        *Name: "Letter 8½ × 11 inch"
        *PrintableOrigin: PAIR(300,300)
    }
}
*Feature: PaperSize
{
    *% rcNameID not redefined.
    *DefaultOption: A4        *% redefine the default papersize.
    *Option: Letter           *% redefine Letter option.
    {
        *Name: "Letter" *% redefine name
            *% *PrintableOrigin statement is not
            *% repeated hence original definition remains
            *% in effect.
```

```
                                    -continued
    *PrintableArea: PAIR(9600, 12648) *% define more
        *% attributes not present in the original construct.
}
*Option: A4                    *% define A4 option for the first time.
{
    *Name: "A4 210 × 297 mm"
}
*% define more paper sizes . . .
. . .
}
```

Entries within a *Feature or *Option construct define that logical entity, such as the name, icon representation, and other inherent attributes. The tables below list these entries and where they can appear. Some of these entries are related to printing, but they show up in these constructs because they are inherent attributes of a particular standard feature, or because the designer just felt like it. For example, *PrintableArea is used in printing, but its values are always specific to a particular paper size. All generic entries, except *Command:CmdSelect{ } construct, are related to the user interface display.

| Entry Name | Description | Location | Comments |
|---|---|---|---|
| *FeatureType | Constant(DOC_PROPERTY, JOB_PROPERTY, PRINTER_PROPERTY), the association type of a feature. | Any custom *Feature construct | Required for custom features. The setting for a DOC_PROPERTY feature is typically saved with a document, while the setting for a PRINTER_PROPERTY feature is save in the user's registry on per printer instance basis. JOBPROPERTY features are set per job and hence not saved anywhere. Note that in NT5.0, JOB_PROPERTY features are treated in the same way as DOC_PROPERTY features. Predefined features default to DOC_PROPERTY except for Memory and PageProtection which default to PRINTER_PROPERTY. |
| *DefaultOption | Symbol, the symbolname of the default option for the feature. | Any *Feature or *case (dependency) construct | Optional. If missing, the first option is used as the default. |
| *Name | Quoted string, the display name for a feature or option. | Same as above. | Optional. If *Name is missing, then *rcNameID must be present. |
| *rcNameID | Integer, the Windows string resource ID for a feature or option name. | Same as above. | Optional. If missing, *Name must be present. If localization is important, use *rcNameID instead of *Name. Zero is not a valid value for any string resource ID. |
| *ConflictPriority | an integer, describing the priority of a feature when resolving conflicts. 1 is the highest. | *Feature construct only no dependency | optional. Parser always assigns Synthesized features the highest priority, PRINTER_PROPERTY features next, and DOC and JOB_PROPERTY the lowest priority. The ConflictPriority value supplied by the user only orders the member features within these 3 groups. If there are features in a group without a user specified Conflict priority, the parser will assign these features a |

-continued

| Entry Name | Description | Location | Comments |
| --- | --- | --- | --- |
| *ConcealFromUI? | Boolean, if TRUE, this Feature will not be displayed in the UI. This may be desired if a printer supports only one option for a feature (ie only 300 dpi) and the GPD writer determines it serves no purpose to display a feature a user cannot change. The writer may also create features that are indirectly controlled by other features and macros and are not directly accessible through the UI. | *Feature construct only no dependency | priority lower than any explicitly specified within that group. Optional. If missing, assume FALSE. |
| *UpdateQuality Macro? | Boolean, if QualityMacros have a dependency on this Feature, (that is they are enclosed within a switch construct controlled by this Feature) this value should be set to TRUE. UI will not be updated properly otherwise. | *Feature construct only no dependency | Optional. If missing, assume FALSE. |
| *Installable? | Boolean, whether this feature or option is installable. When this entry is TRUE, the GPD parser will synthesize a feature which has two options: Installed, and Not_Installed. The default is always Not_Installed. When the *Installable keyword appears within a *Feature construct, this feature is referred to as the host feature. When the Not Installed option of the synthesized feature is selected, all options of the host feature except the first are disabled via *Constraints. When the Installed option is selected, all options of the host feature are enabled including the first. When the *Installable keyword appears within an *Option construct, this Option is referred to as the host option. When the Not Installed option of the synthesized feature is selected, the host option is disabled via *Constraints. When the Installed option is selected, the host option is enabled. The display name for the synthesized feature must be defined via *InstallableFeatureName or *rcInstallableFeatureNameID. The display names for the two options must be defined via *InstalledOptionName/ *NotInstalledOptionName or *rcInstalledOptionName/ *rcNotInstalledOptionNameID. The parser will also synthesize the constraints needed to implement the behavior described. | Any *Feature or *Option construct | Optional. If missing, assume FALSE, i.e. the feature or option is always installed. Note that another way of specifying installable features or options is to define them and their associated constraints explicitly. One advantage of explicitly defining the Installable features is the user may directly specify its priority and customize the constraints. |
| *InstallableFeatureName | Quoted string, the display name for the UI control which allows the user to specify the install status of the host feature or option. | Same as above. | Optional. If it is missing and *Installable? is TRUE, then *rcInstallableNameFeatureID must be present. |
| *rcInstallableFea- tureNameID | Integer, the Windows string resource ID for string corresponding to *InstallableName. | Same as above. | Optional. If it is missing and *Installable? is TRUE, then *InstallableFeatureName must be present. |
| *HelpIndex | Integer, the custom help index corresponding to this feature/option. The index is | Same as above. | Optional. If missing, no custom help text for this feature/option. If it is specified, then *HelpFile |

-continued

| Entry Name | Description | Location | Comments |
|---|---|---|---|
| | referring to the file specified in *HelpFile entry. | | entry must be present too. Note: 0 and (DWORD)(−1) are not valid values for *HelpIndex. |
| *rcIconID | Integer, the Windows RC_ICON resource ID for a feature or option in the associated resource DLL. | Any *Option or *case (dependency) construct | Optional. If missing, no icon image is displayed. |
| *OptionID | Integer, the ID value that will be reported in the devmode for this feature when this option is selected. | Same as above. | Optional. Can only be used for user-defined options (where the ID's are above 256 and by default are assigned by the parser). Can only be used for these features: Halftone, PageSize, InputSlot and Mediatype. The value supplied must not conflict with any other ID value for this feature whether defined via OptionID or supplied by the parser. To avoid problems, use values >512. User assigned OptionIDs are also allowed for any Resolution option. However they must be negative and smaller (more negative) than RES_ID_IGNORE, currently defined as −200. If OptionID is defined, the ID is stored in the Devmode and the driver will attempt to find an option with the same OptionID value instead of the same DPI. |
| *rcPromptMsgID | Integer, the Windows string resource ID for the prompt message to be displayed if the option is selected. | Same as above. | Optional. If missing, assume no prompting is needed, which is the most common case. This entry is used mostly for prompting to insert paper when Manual Feed is selected. |
| *PromptTime | Constant(UISETUP, PRTSTARTDOC), when to display the prompt message, either at the driver UI when the user selects the option or at printing when the job is started. | Any *Option construct. | Required if the *rcPromptMsgID entry is present. If there are multiple prompt messages at PRTSTARTDOC, they are merged into one for display. The only user option is to hit the OK button in the message dialog. |
| *DisabledFeatures | LIST(FeaKeyword1, FeaKeyword2, . . .) a list of one or more Feature Keywords specifying Features which are disabled if the current option is selected. The keyword may be nested within switch/case constructs to express more complex conditions. Unidrv5 may use this information for example to simulate Duplexing, if the printer's duplexing option is not installed, and to publish the printer's current capabilities in the Directory Services. | Any *Option construct. | Optional: If missing, assume all Features enumerated in the GPD file are available unconditionally. Note also that any Feature that appears within a *DisabledFeatures cannot make use of the *Installable? Keyword. One must explicitly define the installed feature in the GPD file. For example if Duplexing is disabled if the "Optional Duplexing Unit" is not installed and consequently Duplex is desired to appear as a DisabledFeatures, one must define an "Optional Duplexing Unit" feature with two options "Installed", "Not Installed". The *DisabledFeatures: Duplexing entry will appear within the *Option: NotInstalled construct. When one manually defines the installable features be sure to include all necessary *Constraints entries. |
| *Command: CmdSelect{} | Construct | Any *Option construct. | Optional. CmdSelect is a standard *Command construct used to describe how to select a feature setting. |

Individual features may have additional entries defined for their *Feature and *Option constructs. A PaperSize option defines dimension related attributes of the printing media, such as the physical paper dimensions, the printable area (origin and size), the cursor origin (0,0), etc. All these values are defined relative to the PORTRAIT orientation. For example, the standard paper size LETTER has 8.5" width (X-axis) and 11" length (Y-axis). If an attribute, such as the cursor origin, changes depending on the orientation (such as on most page printers which can rotate the coordinate system to fit the logical orientation), the *switch/*case constructs should be used to express the orientation dependency though the values must still be defined relative to the PORTRAIT orientation. Additionally for Standard (pre-defined) papersizes, the GPD writer may choose to have the operating system assign the papersize option a standard display name instead of specifying one via *Name or *rcNameID. To default to using the system assigned name, omit the *Name entry and set *rcNameID: 0x7fffffff (the largest positive 32 bit signed value). Obviously the resource file does not need to actually contain such a resource ID. To emphasize the special meaning of this value, the GPD writer could define a Valuemacro:

```
*Macros: myMacros
{
    RCID_DMPAPER_SYSTEM_NAME: 0x7fffffff
}
then a reference to this value would be
*rcNameID: =RCID_DMPAPER_SYSTEM_NAME
```

The following are entries that can appear inside *Option constructs of the PaperSize feature.

| Entry Name | Description | Location | Comments |
|---|---|---|---|
| *PrintableArea | PAIR(width, height), the printable width and height (in master units) relative to the PORTRAIT orientation no matter where this entry appears. | Any PaperSize *Option construct or *switch/*case construct. For printers which can rotate its coordinate system to fit the logical orientation, this value might be dependent on the orientation setting. | Required for all PaperSize options except CUSTOMSIZE. |
| *PrintableOrigin | PAIR(x, y), the offset (in master units) of the upper left corner of the printable area in PORTRAIT orientation relative to the upper left corner of the physical page in PORTRAIT orientation no matter where this entry appears. | Same as above | Required for all PaperSize options except CUSTOMSIZE. |
| *CursorOrigin | PAIR(<x>, <y>), the offset of the cursor (0,0) relative to the upper left corner of the physical page (in master units) in PORTRAIT orientation no matter where this entry appears. | Same as above. For printers which can rotate its coordinate system to fit the logical orientation, this value is always dependent on the orientation setting. | Optional. If missing, assume the cursor origin is the same as the printable origin in any orientation. Required for CUSTOMSIZE. The current driver assumes the cursor origin wrt the printer itself is unaffected by changing the papersize. |
| *MinSize | PAIR(minX, minY), the minimum X and Y dimensions for the CUSTOMSIZE option (in master units). The X and Y dimensions must be relative to the PORTRAIT orientation. | CUSTOMSIZE option. | Required for CUSTOMSIZE option. |
| *MaxSize | PAIR(maxX, maxY), the maximum X and Y dimensions for the CUSTOMSIZE option (in master units). The X and Y dimensions must be relative to the PORTRAIT orientation. | Same as above | Required for CUSTOMSIZE option. |
| *TopMargin | Integer, the top margin (in master Y unit) for any custom size in PORTRAIT orientation. | CUSTOMSIZE option only. | Optional. If missing, assume 0. |
| *BottomMargin | Integer, the bottom margin (in master Y unit) for any custom size in PORTRAIT orientation. | CUSTOMSIZE option only. | Optional. If missing, assume 0. |
| *MaxPrintableWidth | Integer, the maximum printable width on a printer. It applies to all custom sizes supported by the printer. | CUSTOMSIZE option only. | Required for CUSTOMSIZE option. |
| *MinLeftMargin | Integer, the minimum left margin on a printer. It applies | CUSTOMSIZE option only. | Optional. If missing, assume 0. |

-continued

| Entry Name | Description | Location | Comments |
|---|---|---|---|
| | to all custom paper sizes supported by the printer. | | |
| *CenterPrintable? | Boolean, whether the printable width is centered, i.e. whether the left and right margins should be equal. It applies to all custom paper sizes supported by the printers. | CUSTOMSIZE option only. | Optional. If missing, assume FALSE, i.e. the left margin is as defined in *MinLeftMargin and the rest of the unprintable width is on the right. Note that this entry is applicable only to CUSTOMSIZE option. |
| *PageDimensions | PAIR(<x>, <y>), the physical dimensions of a non-standard paper size (in master units). The X and Y dimensions must be relative to the PORTRAIT orientation. | Any custom options of PaperSize | Required for non-standard options of PaperSize. |
| *RotateSize? | Boolean, whether to rotate the physical dimensions of a standard paper size in order to suit the paper feed method. This is typically used by printers which feed standard envelopes length-wise since the standard envelope sizes have smaller width than height. For example, if this is TRUE for Env#10 (4.125" × 9.5"), then its physical size is 9.5" (width) by 4.125" (height) in PORTRAIT orientation. | Any standard PaperSize options (excluding CUSTOMSIZE) | Optional. If missing, assume FALSE. Note that if this entry is TRUE, than the X/Y physical dimensions should be exchanged regardless of the orientation. Note that id this is TRUE, the values in *PrintableArea and *PrintableOrigin apply to the dimensions after the rotation. |
| *PageProtectMem | Integer, the printer memory required (in KB) for enabling page protection. | Any PaperSize options, or *case construct | Required if there is PageProtect feature. |

The following are additional entries that can appear inside option constructs of OutputBin feature.

| Entry Name | Description | Location | Comments |
|---|---|---|---|
| *OutputOrderReversed? | BOOLEAN, when a multi-page document prints to this bin, are the pages sorted last page to first? | Any OutputBin options, or *case construct. This is a relocatable global and may appear at the root level. The root level definition (if present) must precede any redefinition within *Option or *case constructs. | Optional. If missing, assume FALSE. |

The following are Resolution Option Entries:

| Entry Name | Description | Location | Comments |
|---|---|---|---|
| *DPI | PAIR(<xdpi>,<ydpi>), the X and Y units of the graphics resolution. | Any Resolution options. | Required. |
| *SpotDiameter | Integer, the spot diameter value for this resolution. | Any Resolution options, or *case construct. | Required. |
| *TextDPI | PAIR(<xdpi>, <ydpi>), the X and Y units of the text resolution. Device fonts and vector graphics are printed in the text resolution. | Any Resolution options. | Required. Note that *DPI values must be a power of 2 factor of *TextDPI values. For example, if *TextDPI is (300,300), then *DPI: (75,75) is valid, but *DPI: (100,100) is not since 300/100=3 which is not a power of 2. |
| *PinsPerPhysPass | Integer, the number of scanlines printed when the printhead moves across the page. It must be 1 if | Any Resolution options, or *switch/*case construct. | Optional. If missing, assume 1. |

-continued

| Entry Name | Description | Location | Comments |
|---|---|---|---|
| | *OutputDataFormat (defined in Section 5.2.2) is H_BYTE, or multiples of 8 if *OutputDataFormat is V_BYTE. | | |
| *PinsPerLogPass | Integer, the number of scanlines printed in one logical pass. On some serial printers, scanlines are interlaced to increase the printing resolution. | Same as above. | Optional. If missing, assume 1. By definition, *PinsPerLogPass must be in multiples of *PinsPerPhysPass value. |
| *RedDeviceGamma | Integer, red gamma to be applied to correct for device color. This is only valid when ICM is disabled. | Same as above | Optional. If missing, assume -1 to use internal default. Specify value as gamma value * 1000 with a valid range of 0 to 65535. |
| *GreenDeviceGamma | Integer, green gamma to be applied to correct for device color. This is only valid when ICM is disabled. | Same as above | Optional. If missing, assume -1 to use internal default. Specify value as gamma value * 1000 with a valid range of 0 to 65535. |
| *BlueDeviceGamma | Integer, blue gamma to be applied to correct for device color. This is only valid when ICM is disabled. | Same as above | Optional. If missing, assume -1 to use internal default. Specify value as gamma value * 1000 with a valid range of 0 to 65535. |
| *RequireUniDir? | Boolean, whether this resolution requires uni-directional printing be turned on before sending raster data. | Same as above | Optional. If missing, assume FALSE. This is used only by some dot-matrix printers. |
| *MinStripBlankPixels | Integer, the minimum threshold for stripping blank pixels in the middle of scanlines. That is, it applies to stripping enclosing blanks only. The measurement is in bytes. If stripping leading and trailing blanks are requested, the minimum threshold is always 0. | Same as above | Optional. If missing, assume 0. Note that this value is used only if *StripBlanks (defined later) lists ENCLOSED. |

The following are additional entries that can appear in any ColorMode option.

| Entry Name | Description | Comments |
|---|---|---|
| *Color? | Boolean, whether this mode produces color (vs. monochrome) output. | Optional. If missing, assume TRUE if *DrvBPP > 1. For gray-scaling on the printer, this option should be set to FALSE even though *DevBPP is greater than 1. |
| *DevNumOfPlanes | Integer, the number of color planes in color data sent to the printer. | Optional. If missing, assume 1 plane. For color devices, if this entry is 1, we call it "pixel mode". |
| *DevBPP | Integer, the number of bits per pixel in color data sent to the printer. | Optional. If missing, assume 1 bit per pixel. For color devices, if this entry is 1, we call it "planar mode". |
| *RasterMode | Constant(DIRECT, INDEXED), which describes how the raster data will be interpreted by the printer in this color mode. | Optional. If missing, assume INDEXED, i.e. the color data sent to the printer is dependent upon the printer's palette. |
| *ColorPlaneOrder | LIST(YELLOW, MAGENTA, CYAN, BLACK, RED, GREEN, BLUE), the order of sending color plane raster data. A color value may be repeated in the list. | Required if *DevNumOfPlanes is greater than 1. |
| *PaletteSize | Integer, the number of entries in the palette defined by CmdSelect of this ColorMode option. | Optional. If missing, assume 2. |
| *PaletteProgrammable? | Boolean, whether the color palette is programmable. | Optional. If missing, assume FALSE. IF TRUE, Driver will download the correct palette, for INDEXED RasterMode. |
| *DrvBPP | Integer, the number of bits per pixel for the driver's bitmap rendering buffer. The legal values are: 1, 4, 8, 16, 24, 32. The bit- | Optional. If missing, assume 1 bit per pixel. Note that the driver's rendering format is always 1 plane. |

-continued

| Entry Name | Description | Comments |
|---|---|---|
| *IPCallbackID | map format is the Windows DIB. Integer (positive), the callback id for calling OEMImageProcessing after rendering is done and before sending data to the printer. | Optional. If missing, assume that there is no additional OEM image processing on the banding bitmap buffer. |

Note that the Unidrv5 of the instant invention has built-in support for following color data formats (*DevNumOfPlanes/*DevBPP):

1 plane/1 bpp (B/W)

3 planes/1 bpp (either RGB or CMY)

4 planes/1 bpp (CMYK)

1 plane/8 bpp 1 plane/24 bpp

If other color data formats are specified, the callback function OEMImageProcessing must be provided.

The driver's bitmap rendering format can be "deeper" than the printer's color data format, which implies that the driver or the OEM-supplied DLL would need to halftone the image down to the format appropriate for the printer. For example, if one would want the driver to render in 24 bpp format but send YMCK data to the printer, one of the ColorMode option should be like:

```
*Feature: ColorMode
{
    . . .
    *Option: 24toYMCK
    {
        *Name: "Photographic Quality"
        *DrvBPP: 24
        *DevNumOfPlanes: 4
        *DevBPP: 1
        . . .
    }
    . . .
}
```

There are two ways to describe possible memory configurations on a printer with the instant invention. First, one could enumerate each and every possible configuration using the standard *Option construct. Each option represents a possible configuration and the driver will display them as a drop-down combobox. Within a Memory option construct, the following entry must be used to describe the memory configuration:

*MemoryConfigKB: PAIR(<InstalledMemoryKB>, <AvailableMemoryKB>)

Note that amount of available memory must be smaller than the amount of installed memory. Second, one could use the shorthand representation and rely on the GPD parser to synthesize memory options. This is useful for high-end printers which can have many possible memory configurations. The shorthand is defined as follows:

| Entry Name | Description | Comments |
|---|---|---|
| *MemConfigKB | PAIR(<installedKB>, <availableKB>), a memory configuration expressed in KB unit. The GPD parser will synthesize a name in the form "<installedKB> KB" for UI display. For example, for PAIR(512, 370), the parser creates the name "512KB". | If there are multiple *MemConfigKB entries, each represents a possible memory configuration and they are presented to the user in the order listed in the GPD file. Note: if the synthesized name is not appropriate due to localization issues, then the options should be explicitly enumerated using *MemoryConfigKB. |
| *MemConfigMB | PAIR(<installedMB>, <availableMB>), a memory configuration expressed in MB unit. The GPD parser will synthesize a name in the form "<installedMB> MB" for UI display. For example, for PAIR(16, 15), the parser creates the name "16MB". | Same as above. *MemConfigKB and *MemConfigMB can be used together in any order desired. |

The shorthand and longhand methods of specifying the memory configuration may be freely mixed within the Memory feature construct. The synthesized name is also the keyname of the option and may be referenced by the *DefaultOption keyword. The list of synthesized memory options are displayed in the UI along with the long hand options in the order they appear in the GPD file.

Halftoning is used to reduce the data depth. There are four types of Halftone options. First is the system-provided standard halftone options. They are identified by the standard option names in the GPD file. Second, there are the OEM-provided halftone patterns. These custom options need additional entries to describe the size and content of the pattern (see the table below). If these patterns are stored in the resource dll they can be either encrypted or unencrypted. If the patterns are not in the resource dll or they are encrypted, there must be a callback function to generate the halftone pattern. All OEM provided halftone patterns must have a size that is a multiple of dwords (evenly divisible by 4). If the custom pattern has three different patterns each individual pattern must be a multiple of dwords. Multiple pattern resources are assumed to be stored with the red pattern first, then green and finally blue. Third, are the OEM-provided callbacks for halftone. There can be multiple callback halftone methods and Unidrv5 will pass the symbolname of the selected halftone option when making the callback OEMImageProcessing. The callback halftoning is applied on the banding bitmap buffer after all rendering is done and before sending data to the printer. And finally, there is Halftoning on the printer. This is the only type of options that has *Command:CmdSelect{ } construct for selecting a particular halftone method on the printing.

The following are the standard halftone option names to utilize when the system provided halftone options are desired:

HT_PATSIZE_2×2, HT_PATSIZE_2×2_M

HT_PATSIZE_4×4, HT_PATSIZE_4×4_M

HT_PATSIZE_6×6, HT_PATSIZE_6×6_M

HT_PATSIZE_8×8, HT_PATSIZE_8×8_M

HT_PATSIZE_10×10, HT_PATSIZE_10×10_M

HT_PATSIZE_12×12, HT_PATSIZE_12×12_M

HT_PATSIZE_14×14, HT_PATSIZE_14×14_M
HT_PATSIZE_16×16, HT_PATSIZE_16×16_M
HT_PATSIZE_SUPERCELL, HT_PATSIZE_SUPERCELL_M
HT_PATSIZE_AUTO

The HT_PATSIZE_AUTO mode is recommended as the default and will be assumed if no halftone option exists. It allows the driver to select the optimum GDI standard halftone method based on the device resolution and color mode. The result will be that the user will be able to switch between color and monochrome or select different resolutions without having to know the optimum halftone method for that configuration. It is currently anticipated that HT_PATSIZE_SUPERCELL_M will be used for color while monochrome will utilize on of the standard HT_PATSIZE_6×6_M to HT_PATSIZE_16×16_M patterns based on the current resolution.

The following are additional entries for a Halftone option:

| Entry Name | Description | Location | Comments |
|---|---|---|---|
| *rcHTPatternID | Integer, the Windows RC_HTPATTERN resource id for the halftone pattern data in the associated resource DLL. Preferably all RC_HTPATTERN ID's in a resource DLL be contiguous and start from 1. | OEM-defined pattern Halftone options | Required for OEM-defined halftone patterns stored in the resource DLL. If missing default to zero. If zero there must be a HTCallbackID and callback function to generate the halftone pattern. |
| *HTpatternSize | PAIR(xSize, ySize), the X and Y size, in pixels, of the halftone pattern. Currently, xSize and ySize must equal. | Same as above | Required for OEM-defined halftone patterns. |
| *HTNumPatterns | Integer specifying the number of patterns to use for color halftoning which are in the associated resource DLL or generated by the OEM callback. | Same as above | Optional. If missing, assume 1 pattern for all color planes. Currently, 1 or 3 are the only valid entries. |
| *HTCallbackID | Integer (positive), the callback id for calling OEMHalftonePattern to generate or decode a custom halftone pattern. If the callback function OEMHalftonePattern generates more than one possible pattern, each pattern must be assigned a unique HTCallbackID. | Same as above | Optional. If missing, assume there is no OEM callback necessary to generate this patterns. |

Halftone options are closely tied to ColorMode options. The following are three typical scenarios:

1. *DrvBPP is 4 and *DevNumOfPlanes is 4 (YMCK): in this case, halftoning is done during the rendering process and hence only the pattern halftoning options should be available. If the OEM wants special image processing on the final bitmap buffer, *IPCallbackID entry should be defined in the GPD file and OEMImageProcessing function should be exported in the render-mode OEM DLL.

2. *DrvBPP is 24 and *DevNumOfPlanes is 4 (YMCK): in this case, halftoning is done after rendering is completed and OEM must export the function OEMImageProcessing. *IPCallbackID entry must be defined in the GPD file. Only halftoning options performed in OEMImageProcessing should be made available to the user.

3. *DrvBPP is 24 and *DevBPP is 24: in this case, the printer is halftoning. All software halftoning options should be disabled. If the OEM wants special image processing performed on the final bitmap buffer, *IPCallbackID entry should be defined and the OEMImageProcessing function should be exported.

Dependencies between halftone options and color modes can be expressed via *Constraints.

Some printers have fonts resident on the device which speed up printing. A separate tool, IFI Font Editor, is provided for editing the font metrics and other related information. Each font is represented by one .IFI file and all .IFI files of a printer can be added to the resource DLL (*ResourceDLL) using the resource type RC_FONT. A GPD file can reference these fonts via RC_FONT resource ID's. A special keyword, *DeviceFonts, is defined for this purpose:

*DeviceFonts: LIST(fontID1, fontID2, . . . )

For example,

*% assume that RC_FONT_xxx id's are value macros defined by the GPD file creator.

*DeviceFonts: LIST(=RC_FONT_COURIER10, =RC_FONT_ARIALR, =RC FONT_ARIALI, +=RC_FONT_ARIALB, =RC_FONT_ARIALBI, =RC_FONT_TIMESNRR, =RC FONT_TIMESNRI, +=RC_FONT_TIMESNRB, =RC_FONT_TIMESNRBI)

Note that the continuation character, '+', is used to concatenate multiple lines. If there are multiple *DeviceFonts entries, the individual lists will be merged together by the GPD parser. This is different from the default behavior where the last occurance of a *Keyword entry overwrites and redefines the value associated with the *Keyword. *DeviceFonts are assumed to be available in all printer configurations. If a certain sets of fonts are available only in a particular orientation (such as Portrait vs. Landscape), *switch/*case constructs can be used to express such dependency. If there is no fonts resident on the printer, there is no need to define *DeviceFonts entry in the GPD file.

For backward compatibility with GPC, GPD also supports default font cartridges. Each font cartridge is represented by one *FontCartridge construct.

```
*FontCartridge: Z1A
{
        <entries that describe the font cartridge>
}
```

The following entries can appear inside a *FontCartridge construct:

| Entry Name | Description | Comments |
|---|---|---|
| *rcCartridgeNameID | Integer, the Windows string resource id for the font cartridge name. | Required, unless *CartridgeName entry is specified. |
| *CartridgeName | Quoted string, the font cartridge name. | Required if *rcCartridgeNameID is not specified. |
| *Fonts | LIST(integers), the list of RC_FONT resource id's for cartridge fonts which are available in both Portrait and Landscape modes. Preferably all RC_FONT ID's in a resource DLL are contiguous and start from 1. | Required unless *PortraitFonts and/or *LandscapeFonts are specified. |
| *PortraitFonts | LIST(integers), the list of RC_FONT resource id's for the Portrait mode fonts in this cartridge. | Optional. If missing, assume none. If *Fonts is specified, then the list of Portrait fonts is the union of both entries. |
| *LandscapeFonts | LIST(integers), the list of RC_FONT resource id's for the Landscape mode fonts in this cartridge. | Optional. If missing, assume none. If *Fonts is specified, then the list of Landscape fonts is the union of both entries. |

Font substitution is a method of achieving balance between document portability and printing performance. Unidrv5 supports font substitution, i.e. substitute device fonts for TrueType fonts that need to be downloaded. This feature is invoked if the GPD file contains a default font substitution table which is comprised of one or more *TTFS constructs:

```
*TTFS: <unique name>
{
    *TTFontName: "<TT font name>"
    *DevFontName: "<Substituted device font name>"
}
```

Each *TTFS construct defines one substitution preference. They are concatenated together for displaying in the UI. If two or more *TTFS constructs have the same symbolname, the last one overwrites the previous ones. The font name strings are specified either in UNICODE or in the code page specified by *CodePage.

Each TrueType font can be mapped to at most one device font. In addition, the substitution happens only if other attributes match, such as the character set, weight, italic, orientation. Typically, font substitution speeds up printing by reducing the amount of data sent to the printer (no font downloading) and reducing the usage of printer memory. Note that device TrueType fonts should be viewed as different fonts than the system TrueType fonts. For example, HP LaserJet 4 printer has Arial font on the printer, but it is different than the Arial font on the Windows systems both in terms of the font metrics and the set of glyphs contained in the font. However, for the same glyph index, the outline data is the same. So for better performance, its GPD file can define a default substitution table:

```
*TTFS: Arial
{
    *TTFontName: "Arial"
    *DevFontName: "Arial"
}
*TTFS: TNR
{
    *TTFontName: "Times New Roman"
    *DevFontName: "Times New Roman"
}
*TTFS: CourierNew
{
    *TTFontName: "Courier New"
    *DevFontName: "Courier New"
}
*TTFS: Wingdings
{
    *TTFontName: "Wingdings"
    *DevFontName: "Wingdings"
}
```

The user can modify the font substitution table through the driver UI. The GPD file can specify if TrueType font substitution should be used by default or not via the following entry:

*TTFSEnabled?: <Boolean>

If this value is FALSE, Unidrv5 will display the font substitution table but will not perform font substitution unless the user changes the setting manually. If there is no *TTFS entry at all in a GPD file, Unidrv5 will not invoke the font substitution functionality regardless of whether the *TTFSEnabled entry exists or not. If there are at least one *TTFS entry but no *TTFSEnabled entry, Unidrv5 assumes FALSE for the *TTFSEnabled value. Note that *TTFS entry cannot have any dependency on printer configurations, though *TTFSEnabled entry can. Note also that the keywords *rcTTFontNameID and *rcDevFontNameID can be used in place of *TTFontName, *DevFontName if it is desired to reference a string stored in a resource file instead of a string defined directly in the GPD file.

GPD feature and option selections are normally independent of each other. That is, whether option A is installed or selected has no impact on whether option B can be installed or selected. However, there are printers where 2 or more feature selections conflict or constrain each other. One common case is that if the envelope feeder is selected, then regular paper sizes, such as Letter and A4, cannot be selected. This section defines ways to describe various types of constraints.

GPD defines *Constraints entry to express the mutually exclusive selection relationship between two options. For example, on an Epson Stylus color printer, the 720 dpi resolution cannot be selected if either Coated360 or Transparency media is selected:

```
*Feature: Resolution
{
    ...
    *Option: 720dpi
    {
        *DPI: PAIR(720,720)
        *Constraints: MediaType.Coated360
        *Constraints: MediaType.Transparency
```

-continued

```
        }
    }
```

Another way to look at it is that if 720 dpi resolution is selected, then neither Coated360 media nor Transparency media can be selected. Within the same *Feature or *Option construct, the relationship between multiple *Constraints entries is the logical OR.

The *Constraints definitions are reciprocal. That is, if A is constrained by B, then B is automatically constrained by A. In the above example, if 720 dpi resolution is selected, then the user cannot select either Coated360 paper or Transparency. On the other hand, if the current resolution is 360 dpi and the user has selected Coated360 or Transparency media, then the user can no longer select 720 dpi resolution. The location where the constraints are specified is up to the GPD creator. It is okay to define the constraints in both Resolution and MediaType constructs, but it is redundant.

When an option is associated with multiple constraints, GPD allows using the LIST value type to consolidate them. For example, the above constraints can be described in one entry:

*Constraints: LIST(MediaType.Coated360, MediaType.Transparency)

Here is the ENBF definition of *Constraints entry:

<ConstraintEntry>::=*Constraints: <ConstraintValue>

<ConstraintValue>::=<QualifiedName>|LIST(<QualifiedName>{, <QualifiedName>})

<QualifiedName>::=<FeatureName>.<OptionName>

Note that *Constraints definitions are not transitive, that is, if A is constrained by B, and B is constrained by C, then A is not automatically constrained by C. Obviously, *Constraints definitions must appear inside an *Option construct because the construct itself implies the one party of this mutually exclusive selection relationship.

Sometimes, the selection constraints involve more than two options. For example, on an Epson Stylus color printer, the CMYK color mode cannot be used with the plain paper in 720 dpi, but it can be used with Coated720 paper in 720 dpi or used with plain paper in 180 dpi. In addition, the plain paper and 720 dpi resolution are compatible if the B/W mode is selected. To describe such multiple-option constraints, GPD defines *InvalidCombination entry:

<InvalidCombinationEntry>::=*InvalidCombination: LIST(<QualifiedName>{,<QualifiedName>})

This entry must appear at the root level since it is symmetric with respect to each of the enumerated QualifiedNames. So the above example can be described as:

*InvalidCombination: LIST(Resolution.720 dpi, MediaType.Plain, ColorMode.CMYK)

For the expression

*InvalidCombination: LIST(option1, option2, option3, option4, ... )

the logical meaning, in terms of option selection, is

!(option1 && option2 && option3 && option4 && ... )

More than one *InvalidCombination entry may appear in the GPD file. Each *InvalidCombination entry defines a separate constraint. Each *InvalidCombination entry is independent of another and they may or may not have common options. *Constraints are a special case of *InvalidCombination involving only two options where one QualifiedName is implied from the location of the *Constraints entry within a particular *Feature/* Option construct. The above *Constraints example for 720 dpi resolution can also be described as:

*InvalidCombination: LIST(Resolution.720 dpi, MediaType.Coated360)

*InvalidCombination: LIST(Resolution.720 dpi, MediaType.Transparency)

Because they are more symmetric, *InvalidCombination entries tend to be more efficient to evaluate than *Constraints.

Most printers have two types of options: baseline and installable. The most common installable options are additional input bins and the duplexing unit. Occasionally, the option installations are mutually exclusive. For example, if the optional envelope feeder is installed, then the duplexing unit cannot be installed, and vice versa. Both *Constraints and *InvalidCombination deal with impossible combinations of explicitly specified option selections. Features synthesized by the *Installable keyword are not affected by *Constraints and *InvalidCombination since they have no QualifiedName. So GPD defines an entry, *InvalidInstallableCombination, to express constraints involving 2 or more Synthesized Features.

<InvalidInstComb>::=*InvalidInstallableCombination: LIST(<QualifiedName>{,<QualifiedName>})

Note that each qualified name in the list must be an installable option or feature, i.e. the corresponding *Option or *Feature construct must contain the following entry:

*Installable?: TRUE

The *InvalidInstallableCombination keyword means the Synthesized Features hosted by the Installable Features or Options enumerated in the QualifiedNames cannot all be set to the "Installed" option. If the QualifiedName refers to an installable Feature, there is obviously no option qualifier so in this case:

<QualifiedName>::=<FeatureName>

An installable feature means that all options of the feature are installable except the first option. Just like *InvalidCombination, each *InvalidInstallableCombination entry is independent of another. The exclusive installation relationship is symmetric among the synthesized features implied in the list. Note: the *InvalidInstallableCombination keyword can only be used if the *Installable? Keyword is present in the GPD file.

There is the implicit constraint that if an option is not installed, then it cannot be selected. It is also possible to have constraints between one option being installed and a different option being selected, such as if A is not installed, then B cannot be selected; or if A is installed, then B cannot be selected. For example, if LargeFmt tray is not installed, then Tabloid paper cannot be selected. GPD treats these types of installation-constraints-on-selection as attributes of an installable option or feature. It defines following new entries:

```
<NotInstalledConstraintsEntry>::=*NotInstalledConstraints: <Con-
    straintValue>

<InstalledConstraintsEntry>::=*InstalledConstraints: <Con-
    straintValue>
``` where <ConstraintValue> is the same as defined in Section 2.6.1 for a *Constraints entry. As their names imply, these entries must appear inside an installable option or feature construct (i.e. the *Option or *Feature construct which contains the *Installable: TRUE entry). Just like *Constraints, the relationship between multiple *NotInstalledConstraints entries and multiple items in the list is the logical OR. The implied member of this constraint relationship is the synthesized Feature created for each *Installable option or feature. For *NotInstalledConstraints, the implied member is <SynthesizedFeature.NotInstalled>, for *InstalledConstraints, the implied member is <SynthesizedFeature.Installed>. These keywords are unnecessary if there are no synthesized Features present since the *Constraints keyword can then explicitly refer to all the features.

The following table summarizes various types of constraints:

|  | then B cannot be installed | then B cannot be selected |
| --- | --- | --- |
| If A is not installed, | N/A | *NotInstalledConstraints |
| If A is installed but not selected, | *InvalidInstallableCombination | *InstalledConstraints |
| If A is selected, | this is equivalent to the case where "if B is installed, then A cannot be selected", i.e., using *InstalledConstraints inside B's construct. | *Constraints, or *InvalidCombination |

GPD defines the *switch and *case constructs for expressing dependencies between entry values and specific printer configurations. The *switch and *case constructs are similar to the switch and case statements in C programming language. It should be noted that although the documentation refers only to the lowercase version, the Parser will also accept *Switch and *Case. The *switch construct names the dependent feature and the *case construct names the specific option of that feature. For example, on HP LaserJet 4L printer, the *PrintableArea, *PrintableOrigin and *CursorOrigin attributes, which are members of the PaperSize option construct, also depend on the logical orientation:

```
*% All numbers are expressed in 600dpi unit.
*Feature: Orientation
{
    *DefaultOption: Portrait
    *Option: Portrait
    {
        *Name: "Portrait"
        *rcIconID: =RC_ICON_PORTRAIT
    }
    *Option: Landscape_CC90
    {
        *Name: "Landscape"
        *rcIconID: =RC_ICON_LANDSCAPE
    }
}
*Feature: PaperSize
{
    *DefaultOption: Letter
```

-continued

```
    *Option: Letter
    {
        *Name: "Letter 8½ x 11 inch"
        *switch: Orientation
        {
            *case: Portrait
            {
                *PrintableArea: PAIR(4800, 6324)
                *PrintableOrigin: PAIR(150, 150)
                *CursorOrigin: PAIR(150,100)
            }
            *case: Landscape_CC90
            {
                *PrintableArea: PAIR(4860, 6360)
                *PrintableOrigin: PAIR(120, 120)
                *CursorOrigin: PAIR(100,6480)
            }
        }
    }
    ...
}
```

Entries that can appear inside *switch and *case constructs are called relocateable entries. They include all global entries unless explicitly specified otherwise. Examples include: *DeviceFonts, *TTFSEnabled. They also include most entries within a *Feature construct or within a *case construct. The designation is based on whether it is applicable or not, and it is enforced by the GPD parser. For example, *Constraints entry is not relocateable. Additionally, *FontCartridge, *Command constructs are relocateable. The *switch and *case constructs nested inside an *Option construct defines the additional dependency on top of the implicit dependency. Each *switch construct specifies one dependent feature. The only legal entry within a *switch construct is *case construct type. It is not required to have one *case construct for every option of the dependent feature. The overwriting rule may be used when applicable. Within a *case construct, there can be nested *switch constructs for expressing multiple dependencies.

Just like C language, GPD defines a special *case option, called *default, for expressing all other valid options not explicitly mentioned. An option is valid if it is not constrained by the current installations and selections. That means the set of valid options may change depending on the specific printer configuration. If a *default case is not present, either all possible options have been explicitly enumerated or the value has been initialized before the *switch/*case constructs.

Global entries can take advantage of the implicit dependency imposed by the *Feature and *Option structures. But when a global entry is used within an *Option construct, its name must be prefixed by the reserved word EXTERN_GLOBAL: to distinguish it from native members of that construct.

For example:

```
*Option: UPPERBIN
{
    Name: "Upper OutputBin"
        EXTERN_GLOBAL: *OutputOrderReversed?: TRUE
}
```

Note that *DefaultOption entry can also appear inside a *switch/*case construct, but there cannot be any loop in the dependency chain. For example, if the default option of Feature A depends on Feature B, then the default option of Feature B cannot depend on Feature A. There can be multiple features on the dependency chain, but the default option of the last one on the chain cannot depend on any other feature.

When specifying the dependency of an attribute, it must be done consistently. When there are multiple levels of dependency, the same feature can appear only once at only one level. That is if an attribute is defined to be dependent on Feature A at the first level, it cannot have a dependency on Feature A at any other level. For example say the attribute represented by the *DeviceFonts keyword had dependencies on Orientation and Resolution. The following would be an inconsistent (nonsensical) way of expressing this dependency.

```
*switch: Orientation
{
    *case: PORTRAIT
    {
        *switch: Resolution
        {
            *case: 300dpi
            {
                *switch: Orientation *% Orientation appears at 2
                              *% nesting levels - inconsistent and
                              meaningless!
                {
                    *case: LANDSCAPE_CC90
                    {
                        *DeviceFonts: 1
                    }
                }
            }
            *case: 600dpi
            {
                *DeviceFonts: 2
            }
        }
        *case: LANDSCAPE_CC90
        {
            *DeviceFonts: 3
        }
    }
}
```

If any attribute is defined multiple times within the GPD file, all of the definitions must express dependencies on the same Features at each nesting level. For example, if an attribute is initially defined to have a dependency on Orientation at the first level and Resolution at the second level, a subsequent definition of that attribute cannot specify a dependency on Papersize at the first level and Orientation at the second level. However, more dependency levels can be added in subsequent definitions of that attribute as long as the existing levels remain consistent with the previous definitions. One may think of each attribute being represented by a multi-level tree. The initial definition may define the trunk and lower branches, subsequent definitions may add more lower branches or define smaller branches off the existing branches, but may not redefine the branching structure that has already been defined. One may however redefine the value of the attribute (the leaves of the tree). Note there is no requirement that the tree be symmetric. If an attribute has further dependencies on resolution for landscape orientations but none for portrait, there is no need to add more *switch/*case constructs into the portrait branch simply because the landscape branch needs them.

A GPD writer may want to implement an ease-of-use UI feature which in its current implementation presents 3 radio buttons that allow the user to control the quality of the printed output without having to specify all of the options which affect the output quality. The three buttons allow the user to select a "draft quality" when speed of output is more important than quality, a "Better quality", and a "Best quality". The quality macro keywords allow the GPD writer to associate one or more Feature settings with each of these UI buttons. When the user presses one of the quality buttons, each of the Features associated with this button are set to the option specified in the GPD without further user intervention. The quality macro keywords are:

```
*DraftQualitySettings: LIST(qualifiedname1, qualifiedname2, . . .
)

*BetterQualitySettings: LIST(qualifiedname1, qualifiedname2, . . .
)

*BestQualitySettings: LIST(qualifiedname1, qualifiedname2, . . . )

*DefaultQuality: one of the following: {"DRAFTQUALITY",
    "BETTERQUALITY", "BESTQUALITY"}
```

As defined previously a Qualifiedname is defined to be of the form

```
<QualifiedName>::=<FeatureName>.<OptionName
``` for example RET.OFF or PaperSize.LEGAL or Resolution.300 dpi.

Each of these keywords is a relocatable global and may be placed within switch/case constructs. Currently, the UI allows a different set of quality macros to be used for each combination of MediaType and ColorMode. To make each macro setting dependent on MediaType and colormode use switch/case constructs, for example:

```
*Switch: ColorMode
{
    *case: 24bit
    {
        *switch: MediaType
        {
            *case: CLAYCOATED
            {
                *DraftQualitySettings: LIST(qualifiedname1,
                    qualifiedname2, . . . )
                *BetterQualitySettings: LIST(qualifiedname1,
                    qualifiedname2, . . . )
                *BestQualitySettings: LIST(qualifiedname1,
                    qualifiedname2, . . . )
                *DefaultQuality: BESTQUALITY
            }
            *case: GLOSSY
            {
                *DraftQualitySettings: LIST(qualifiedname1,
                    qualifiedname2, . . . )
                *BetterQualitySettings: LIST(qualifiedname1,
                    qualifiedname2, . . . )
                *BestQualitySettings: LIST(qualifiedname1,
                    qualifiedname2, . . . )
                *DefaultQuality: BETTERQUALITY
            }
            *default:
            {
                *DraftQualitySettings: LIST(qualifiedname1,
                    qualifiedname2, . . . )
                *BetterQualitySettings: LIST(qualifiedname1,
                    qualifiedname2, . . . )
                *BestQualitySettings: LIST(qualifiedname1,
                    qualifiedname2, . . . )
                *DefaultQuality: DRAFTQUALITY
```

```
            }
          }
        }
    *default:
    {
        *DraftQualitySettings: LIST(qualifiedname1, qualifiedname2,
         ...)
        *BetterQualitySettings: LIST(qualifiedname1, qualifiedname2,
         ...)
        *BestQualitySettings: LIST(qualifiedname1, qualifiedname2,
         ...)
        *DefaultQuality: DRAFTQUALITY
    }
}
```

Note: to prevent inconsistent (bizzare) UI behavior, the quality macros should be defined so the execution of that macro will not have the side effect of changing either the MediaType or the Color Appearance settings. It is acceptable to have a macro change the color mode option—for example If Color Appearance=Color, the Best Quality macro may set ColorMode=24 bpp, the BetterQuality macro may set ColorMode=8 bpp and the DraftQuality macro may set ColorMode=4 bpp, but it would not make sense to set ColorMode=1 bpp (Mono). The feature settings defined for a quality macro should obviously be compatible with each other and not violate a *Constraints or *InvalidCombination statement. If quality macros are used, all three macros and the DefaultQuality keyword should be defined. If the GPD writer does not want to implement one of the macros, for one or more combinations of MediaType or ColorMode, he should explicitly define that unused macro by an empty list: LIST( ). Simply omitting one of the QualityMacro entries may lead to unanticipated behavior, (the parser's idea of the default value for the undefined macro may not agree with the GPD writee's idea of the default value). The GPD writer should also ensure all 4 keywords are defined for all combinations of ColorMode and MediaType to prevent UI inconsistencies. Use the *default: keyword within a *switch construct as shown above to ensure a definition always exists.

*Command is a grouping construct used to describe printer commands such as ejecting the page or selecting a font. The following are the legal entries within a *Command construct. Note that none of them can appear directly inside *case constructs.

| Entry Name | Description | Location | Comments |
| --- | --- | --- | --- |
| *Cmd | Quoted string, the command string for this command | Any *Command construct | Required, unless *CallbackID entry is defined. |
| *CallbackID | Integer (positive), the unique callback id for this command. | Same as above. | Required, unless *Cmd entry is defined. |
| *Params | LIST(<StandardVariableNames>). The standard variable names are defined above. This allows callback commands to access certain cached values such as the current resolution. | Same as above. | Optional. This entry can be used only with *CallbackID together. *Cmd entry references the standard variables directly in its command string. |
| *NoPageEject? | Identifies a subset of DOC_SETUP commands which have the property that when all of the commands in the subset are emitted in the specified order, the state of the printer will change as directed. This subset of commands when emitted does not have side-effects, they do not change/reset any other configuration of the printer that is not explicitly specified in the subset of commands. (they form a sub-group). Also these commands have the property that when the entire subset is emitted between the first and second pages when printing in Duplex mode, no page ejection occurs. | Command constructs with an *Order section = DOC_SETUP Currently used only if the printer supports Duplexing. | Optional. Default is FALSE |
| *Order | <section>.<number>, the ordering information of this command. | Same as above. | Required for printer configuration commands and option selection commands. |

A printer command in GPD can be used to configure the printer, change the printer state during printing such as moving the cursor, and select printer options such as Portrait orientation or Letter paper size. For the first two types, each command has a unique symbolname and all symbolnames are pre-defined. These *Command constructs must appear at the root level or inside *case constructs. But for selecting printer options, the *Command construct must have the symbolname CmdSelect and the construct must appear inside the corresponding *Option construct.

For simple commands that require only the command string, GPD provides a special shorthand syntax:

*Command:<CommandName>:<CommandString>

For example,

>   *Command: CmdXMoveAbsolute: "escape for moving cursor horizontally to an absolute position"

is equivalent to:

---

```
*Command: CmdXMoveAbsolute
{
  *Cmd: "escape for moving cursor horizontally to an absolute position"
}
```

---

To configure and control a printer properly, the commands must be sent in the correct order. The ordering information has two parts: the job section name and the sequence number within a section.

>   <OrderEntry>*Order: <section>.<number>

GPD identifies six sections in a job stream. JOB_SETUP section is sent before anything is sent to the printer. It is sent only once per job right after the driver calls OpenJob. Note that printer settings that are controlled by commands in this section cannot be changed by ResetDC (a.k.a. within a job). DOC_SETUP section is sent at the beginning of the first page and the page following a ResetDC which can change printer settings within a job. Note that commands to be sent in the DOC_SETUP section must not cause the printer to reset and lose information such as the downloaded soft fonts and patterns. PAGE_SETUP section is sent at the beginning of every page before any drawing is done. PAGE_FINISH section is sent at the end of every page after all drawings are done. It is paired with PAGE_SETUP. DOC_FINISH section is sent when Unidrv5 gets the EndDoc call. It is paired with DOC_SETUP. JOB_FINISH section is sent right before calling EndJob. It is paired with JOB_SETUP.

Within a section, the commands are sent out in the increasing order of the sequence numbers. The numbers do not have to be consecutive, but they must be unique within a section. For example, on Canon BJC-600, the feature selection commands should be emitted in the order of InputBin, PaperSize, Resolution:

---

```
*Feature: InputBin
{
    *DefaultOption: Auto
    *Option: Auto
    {
        *Name: "Auto Tray"
        *Command: CmdSelect
        {
            *Order: DOC_SETUP.50
            *Cmd: "<1B>(1<010014>"
        }
    }
    ...
}
*Feature: PaperSize
{
    *DefaultOption: Letter
    *Option: Letter
    {
        *Name: "Letter size"
        *Command: CmdSelect
        {
            *Order: DOC_SETUP60
            *Cmd: "<1B>(g<0300>n<01>r"
        }
    }
    ...
}
*Feature: Resolution
{
    *DefaultOption: 360dpi
    *Option: 360dpi
    {
        *Name: "360 dpi x 360dpi"
        *Command: CmdSelect
        {
            *Order: DOC_SETUP.70
            *Cmd: "<1B>(d<020001>"
        }
    }
    ...
}
```

---

Typically, the printer option selection commands are sent out intermixed with other printer configuration commands such as setting the copy count. A normal job stream would look like:

```
<JOB_SETUP commands>
<DOC_SETUP commands>
<PAGE_SETUP commands>
... page 1 data ...
<PAGE_FINISH commands>
<PAGE_SETUP commands>
... page 2 data ...
<PAGE_FINISH commands>
...
... more pages ...
...
<DOC_FINISH commands>
<JOB_FINISH commands>
```

If ResetDC happens, say at the beginning of page 2, then the job stream would look like:

```
<JOB_SETUP commands>
<DOC_SETUP commands>
<PAGE_SETUP commands>
... page 1 data ...
<PAGE_FINISH commands>
<DOC_FINISH commands>
<DOC_SETUP commands>
<PAGE_SETUP commands>
... page2 data ...
<PAGE_FINISH commands>
...
...
<DOC_FINISH commands>
<JOB_FINISH commands>
```

The implications are that each section is self-contained in the sense that the above data stream structures will always configure the printer properly. A section can be null. When ResetDC happens, all commands in both DOC_FINSIH and DOC_SETUP sections are sent in the order specified. ResetDC can affect only the options that are changed by commands in DOC_SETUP section. In other words, if a ResetDC call changes the orientation but the orientation command is in JOB_SETUP section, then this ResetDC call has no effect. Essentially, the GPD file determines what can be changed by ResetDC.

One special category of commands that always require the ordering information is the printer configuration commands. They work together with the printer option selection commands to configure the printer. All of them are optional.

| Configuration Command | Description |
| --- | --- |
| CmdStartJob | Initialize a job stream. |
| CmdStartDoc | Initialize a document. |
| CmdStartPage | Initialize a page for printing. This initialization command should also set the printer's cursor position to (0, 0) in cursor coordinates. |
| CmdEndPage | Finish a page after sending down all drawing objects |
| CmdEndDoc | Finish a document |
| CmdEndJob | Complete a job stream |
| CmdCopies | Set the count for multiple-copy printing |
| CmdSleepTimeOut | Set the number of minutes in idle mode before the printer goes into sleep mode (i.e. power-save mode). |

Take Canon BJC-600 for an example:

```
*Command: CmdStartDoc
{
    *Order: DOC_SETUP.10
    *Cmd: "<1B>[K<0200000F1B>(a<0100011B>(c<030011>"
}
```

A GPD command string is a byte sequence which, when sent to the printer, performs a specific pre-defined function, such as selecting a paper size or positioning the print head. There is no restriction on the length of a command. It is basically a quoted string but with special provisions for specifying parameters. For example, an absolute-X-move command needs a parameter for specifying the target X position. A parameter must be specified outside of the pair of double quotes and is treated by the parser as a placeholder for one string segment (whose content will be determined when the command is actually emitted). I.e. all the string segments and parameter constructs are concatenated to form the InvocationString. At run-time, Unidrv5 evaluates the expressions defined in the parameter construct and emits the result in the specified format in place of the parameter construct.

The escape letter '%' introduces a parameter segment. The letters immediately following '%' specify the format of the parameter value. The following table lists the standard formats supported:

[digits]d: Parameter as signed ASCII decimal number.
[digits]D: Parameter as signed ASCII decimal number. + sign is printed if parameter is greater than 0.
C: Parameter as byte.
C: Parameter+'0' as byte.
f: Parameter as unsigned ASCII decimal number with the decimal point inserted before the second digit from right. For example, if the give value is 1225, the output should be "12.25".
l: Parameter as word, LSB first
M: Parameter as word, MSB first.
Q: Qume hexadecimal ASCII number. (common on Toshiba/Qume devices)
G: 2*abs(Parameter)+is_negative(Parameter) as based 64 number, least significant digit to most significant digit. The most significant digit (0–63) is represented by the bytes 191–254. All other digits are represented by the bytes 63–126. "is_negative(Parameter)" is 1 if Parameter is negative, 0 otherwise.
N: Canon integer encoding. Outputs most significant byte to least significant byte encoding as follows. The least 4 significant bits are encoded as 001sbbbb, where s represents the sign of the integer (0 is negative, 1 is positive), and b represents a significant bit of the integer. The next most significant 6 bits are encoded as 01bbbbbb. So the integer 254 (11111110) would be represented as (01001111 00111110).
V: NEC VFU (Vertical Format Unit) encoding. The parameter specified by this format is divided by a ⅙ inch and VFU data will be sent to a printer same number of times as the quotient.

If a parameter value has limits (minimum and maximum), they can be expressed inside a pair of square brackets immediately following the format letters.

The parameter value is enclosed by a pair of curly brackets immediately following the limit specification (if any). There is a set of pre-defined values that GPD commands can reference at any time, such as the current resolution (xdpi, ydpi), the current paper width and height, etc. These values are expressed in the master units if applicable. A GPD command can use a restricted arithmetic expression (+, −, /, *, mod, max repeat, min, max) to express how to manipulate these values. All calculations are done in unsigned integers and intermediate results cannot overflow a DWORD (32-bit). Normally, if the result of evaluating the parameter expression is a value which exceeds the specified max limit, the command will be emitted once with the max specified value. The operator "max_repeat" modifies this behavior, causing the entire command invocation to be emitted repeatedly using the max allowed value until the accumulated value is equal to the evaluated value. Obviously, this is applicable only to single-parameter commands. Parenthesis can be used to impose precedence. Otherwise, it follows the C convention on the precedence of arithmetic operators. A parameter segment can cross line boundaries using the standard line continuation character '+'. Continuation linebreaks may only be inserted where whitespace is permitted. No whitespaces are permitted between the digits comprising an integer, the characters of a variable name, or other token like "max_repeat".

The EBNF definition for a GPD command string is as follows (to avoid confusion, reserved letters are underlined and in bold, and reserved words are in bold).

```
<SelectionCmd> ::= (<Segment> {<Segment>})
<Segment> ::=
    <QuotedStringSegment> | <Parameter> | =<ValueMacroName>
<QuotedStringSegment> ::=
    "{<readable ASCII character> | <hexSegment>}"
<hexSegment> ::= < {<hexadecimals> | <WhiteSpaces>}≥
<hexadecimals> ::= {<HexDigit> <HexDigit>}
<HexDigit> ::=
    0 | 1 | 2 | 3 | 4 | 5 | 6 | 7 | 8 | 9 | A | B | C | D | E | F
<Parameter> ::= <Format>[<Limits>]<Value>
<Format> ::=
    %([<integer>]d | [<integer>]D | c | C | l | m | q | g | n | v)
<Limits> ::= [<Min>,<Max>]
<Min> ::= <integer> | *
<Max> ::= <integer> | *
<Value> ::= {<Expression> | max_repeat(<Expression>)}
<Expression>::=
        min(<Expression>,<Expression>) |
        max(<Expression>,<Expression>) |
        (<Expression> <AddOperator> <Expression>) |
        (<Expression> <MulOperator> <Expression>) |
        <integer> | <StdValues>
```

-continued

```
<AddOperator> ::= + | −
<MulOperator> ::= * | / | MOD
```

Parenthesis are optional around expressions involving <Add or MulOperator>, if omitted the <MulOperators> will be evaluated before <AddOperators> left to right. Note that <Min> and <Max> are expressed in the unit that the actual parameter value is expressed in. When max_repeat is used, the command can have only one parameter. <StdValues> options are listed in the following table. They are of DWORD type unless specifically noted otherwise.

| Standard Variable Name | Description | Scope |
| --- | --- | --- |
| NumOfDataBytes | number of data bytes | When the driver is sending CmdSendBlockData or CmdSendXXXData where XXX is any of the 7 non-white primary color. If there is compression, this is the number of compressed data bytes. |
| RasterDataWidthInBytes | the width of scanlines in bytes | When the driver is sending CmdSendBlockData or CmdSendXXXData where XXX is any of the 7 non-white primary color, or CmdSetSrcBmpWidth. Compression has no impact. |
| RasterDataHeightInPixels | the height of the raster data block in pixels. | When the driver is sending CmdSendBlockData or CmdSendXXXData where XXX is any of the 7 non-white primary color, or CmdSetSrcBmpHeight. |
| NumOfCopies | number of copies requested by the user. | When DrvEnablePDev and/or SETCOPYCOUNT escape is called. |
| PrintDirInCCDegrees | the requested rotation degrees (counter-clockwise). | When the driver is sending CmdSetSimpleRotation or CmdSetAnyRotation command. |
| DestX | the destination X cursor position (in master X unit) Relative to the cursor origin X. | When the driver is sending CmdXMoveAbsolute or CmdYMoveAbsolute command. |
| DestY | the destination Y cursor position (in master Y unit) Relative to the cursor origin Y. | Same as above. |
| DestXRel | the destination X cursor position relative to the current X cursor position (in master X unit). | When the driver is sending CmdXMoveRelLeft or CmdXMoveRelRight command. |
| DestYRel | the desired Y cursor position relative to the current Y cursor position (in master Y unit). | When the driver is sending CmdYMoveRelUp or CmdYMoveRelDown command. |
| LinefeedSpacing | the amount of vertical spacing a linefeed command (CmdLF) should generate (in master Y unit). | When the driver is sending CmdSetLineSpacing command. |
| RectXSize | the width of the rectangle in master X unit. | When the driver is sending CmdSetRectWidth command. |
| RectYSize | the height of the rectangle in master Y unit. | When the driver is sending CmdSetRectHeight command. |
| GrayPercentage | the gray level (in percentage) of the rectangle. | When the driver is sending CmdRectGrayFill command. |
| NextFontID | the unique number for the soft font to be downloaded next. | When the driver is sending CmdSetFontID command. |
| NextGlyph | the double-byte glyph code to be down loaded next. | When the driver is sending CmdSetCharCode command. |
| PhysPaperLength | the length of the physical paper in master Y unit (in portrait orientation). | When DrvEnablePDev is called. |
| PhysPaperWidth | the width of the physical paper in master X unit (in portrait orientation). | Same as above. |
| FontHeight | the height of the current device font in the master Y unit. | When a font has been specified for a text output call. |
| FontWidth | the width of the current device fixed-pitch font in the master X unit. | Same as above. |
| FontIntLeading | the internal leading of the current device font in the master Y unit. | Same as above. |
| FontBold | 1 means the current device font is bold and 0 means otherwise. | Same as above. |
| FontItalic | 1 means the current device font is italic and 0 means otherwise. | Same as above. |
| FontUnderline | 1 means the current font style is underlined and 0 means otherwise. | Same as above. |

| Standard Variable Name | Description | Scope |
| --- | --- | --- |
| FontStrikeThru | 1 means the current device font style is strike-through and 0 means otherwise | Same as above. |
| CurrentFontID | the downloading id of the current font | when a font has been specified for a text output call and the font is a downloaded font. |
| TextYRes | the current text Y resolution. | When the user has initiated a print job. |
| TextXRes | the current text X resolution | Same as above. |
| GraphicsYRes | the current graphics Y resolution. | Same as above. (not implemented in Beta 1) |
| GraphicsXRes | the current graphics X resolution. | Same as above. (not implemented in Beta 1) |
| CursorOriginX | The X printing offset (in the current orientation) in MasterUnits. The printing offset is defined to be the Imageable Origin - the Cursor Origin. | When DrvEnablePDev is called. |
| CursorOriginY | The Y printing offset. | When DrvEnablePDev is called. |
| Rop3 | the current rop3 code | When the current DDI call supplies the rop3 code. |
| RedValue | Red Value of the color for the palette index being defined. | The scope of this variable is during defining Palette using command CmdDefinePaletteEntry. |
| GreenValue | Green Value of the Color. | Same as above. |
| BlueValue | Blue value of the color. | Same a above |
| PaletteIndexToProgram | The palette entry being programmed. | Same as above. |
| CurrentPaletteIndex | The index of the current palette entry to be selected | When the driver is sending CmdSelectPaletteEntry and any other command which sets the foreground brush color. |
| PatternBrushType | The type of pattern brush to be downloaded. Predefined types:<br>2 - Shading pattern<br>3 - Cross-hatch pattern<br>4 - User defined pattern | When the driver is sending down a pattern brush. |
| PatternBrushID | The ID of the downloaded pattern brush. | When the driver selects a downloaded pattern brush as the current brush. |
| PatternBrushSize | The size in bytes of the pattern brush to be downloaded. | When the driver is sending down a pattern brush. |

GPD has two types of macros: block macros and value macros. As their names imply, block macros are used to represent a sequence of GPD entries and constructs while value macros are used to represent all or parts of a value.

A block macro definition looks like a grouping construct:

```
*BlockMacro: <BlockMacroName>
{
    <a sequence of entries and constructs>
}
```

A block macro can be referenced by the special *InsertBlock entry:

```
*InsertBlock: <BlockMacroNameRef>
```

Where <BlockMacroNameRef> is the <BlockMacroName> preceeded by the 'equals' character, without intervening whitespace. During GPD parsing, the above entry will be replaced, in place, by the body of the block macro definition without the curly brackets. For example, on HP LaserJet 5, all envelope paper sizes can not be used with the input bin Tray2 and Tray3, or in Duplex modes. A block macro can be defined to describe these common constraints and then use it in every envelope size option definition:

```
*BlockMacro: PaperConstraints
{
    *Constraints: InputBin.Tray2
    *Constraints: InputBin.Tray3
    *Constraints: Duplex
}
*Feature: PaperSize
{
    . . .
    *Option: Env10
    {
        *InsertBlock: =PaperConstraints
        . . .
    }
    *Option: EnvMonarch
    {
        *InsertBlock: =PaperConstraints
        . . .
    }
    *Option: EnvB5
    {
        *InsertBlock: =PaperConstraints
        . . .
    }
    . . .
}
```

When the above Env10 option definition is parsed, it is first expanded into:

```
*Option: Env10
{
    *Constraints: InputBin.Tray2
    *Constraints: InputBin.Tray3
    *Constraints: Duplex
    . . .
}
```

Arbitrary white spaces are not allowed between the equals sign and the Macroname. If the definition of a block macro contains curly brackets, the brackets must appear in pairs and in the correct order of nesting. Block macro definitions may contain other Block macro or Value macro definitions (macros may be nested to arbitrary depth) and may reference other BlockMacros or ValueMacros.

A value macro definition is a simple <macroName>:<value> pair inside the special *Macros construct:

```
*Macros: <GroupName>
{
    ValueMacro1: <value>
    ValueMacro2: <value>
    . . .
}
```

A *Macros construct can contain any number of value macro definitions, and there can be multiple Macros constructs in a GPD file. The <GroupName> is optional and purely for better readability. The ValueMacro name is a <symbol type> and as such may not start with nor contain the '*' character. Only ValueMacro definitions may appear within the *Macros construct.

The value portion of a value macro definition may consist of a combination of arbitrary character sequences <value fragments> and ValueMacro References. After all ValueMacro references (if any) are resolved, every value macro definition must itself represent a valid value type—for example an Integer, Quoted_String, Symbol, LIST etc. There are a few additional restrictions on the arbitrary character sequences. First, a <value fragment> may never contain the equals character since this introduces a ValueMacro reference. Second, if the Double Quote character appears within a <value fragment>, the entire sub string it introduces must also be present including the closing Double Quote. Finally, if the Percent character appears within a <value fragment> outside of a literal substring, the entire command parameter construct it introduces must also be present including the closing Curly Brace.

As with BlockMacro references, ValueMacro references are formed by prepending the equals character to the ValueMacro name. When the ValueMacro reference is resolved, this token is replaced by the fully resolved macro definition.

Here's an example featuring the HP LaserJet 4L printer:

```
*Macros: HP4L
{
    LetterCmdPrefix: "<1B>&l2a8c1E<1B>*p0x0Y"
    A4CmdPrefix: "<1B>&l26a8c1E<1B>*p0x0Y"
    Env10CmdPrefix: "<1B>&l81a8c1E<1B>*p0x0Y"
```

-continued

```
    Helvetica_ID: 23
    Courier_ID: 24
    . . .
}
*BlockMacro: PSOrder { *Order: DOC_SETUP.11 }
*DeviceFonts: LIST(=Helvetica_ID, =Courier_ID, . . .)
*Feature: PaperSize
{
    *Name: "Paper Size"
    *DefaultOption: Letter
    *Option: Letter
    {
        *Name: "Letter 85 x 11 inch"
        *PageProtectMem: 1028
        *switch: Orientation
        {   *case:Portrait
            {
                *Command: CmdSelect
                {
                    *InsertBlock: =PSOrder
                    *Cmd: =LetterCmdPrefix "<1B>*c0t5760x7680Y"
                }
                *PrintableArea: PAIR(4800, 6324)
                *PrintableOrigin: PAIR(150, 150)
                *CursorOrigin: PAIR(150, 100)
            }
            *case:Landscape_CC90
            {
                *Command: CmdSelect
                {
                    *InsertBlock: =PSOrder
                    *Cmd: =LetterCmdPrefix "<1B>*c0t7632x5880Y"
                }
                *PrintableArea: PAIR(4860, 6360)
                *PrintableOrigin: PAIR(120, 120)
*CursorOrigin: PAIR(100, 6480)          }
            }
        }
    }
}
```

The macros are provided for reducing text repetition in GPD files. For simplicity, no parameters are permitted for these macros. All macro references are resolved in a single pass using straightforward text substitution. Therefore, a macro must be defined before it can be referenced and a macro can not reference itself. All nested macro references are resolved at the time of parsing the macro definitions. If a macro is defined more than once, one definition lasts until it is overwritten by the next definition or its scope expires. A BlockMacro is considered defined when the closing curly brace of the *BlockMacro construct is parsed. At that time all macros defined within the BlockMacro are lost. The scope of a Macro definition is limited to the nesting level it was defined in. Macros defined within a nesting level can only be referenced within that nesting level (or levels contained within that nesting level). A macro defined at the Root level can be referenced throughout the GPD file. For example, if we have,

```
*Macros: DefaultMargins
{
    HWMargins: RECT(0,0,40,0)      *% definition #1
}
*Feature: PaperSize
{
    *DefaultOption: Letter
    *Option: Letter
    {
        *Name: "Letter 8½ x 11 inch"
        *Margins: =HWMargins
    }
```

```
-continued

*Option: A4
{
    *Macros: DefaultMargins *% definition #2 for the same
    value macro
    {
        HWMargins: RECT(0,0,50,0)
    }
    *Name: "A4 210 x 297 mm"
    *Margins: =HWMargins
} *% this closing bracket un-defines the second definition.
*Option: Legal
{
    *Name: "Legal 8½ x 14 inch"
    *Margins: =HWMargins
}
...
}
```

The first definition (#1) is referenced by Letter and Legal options, and the second definition (#2) is used only by A4 option.

GPD defines a set of attributes and commands for describing how to compose the printer-ready output data. Attributes provide information about specific properties, such as where the cursor X is after sending a carriage return, or whether the printer can rotate raster graphics when printing in landscape orientation. Commands describe the specific printer escapes for a particular task, such as doing absolute X move, or sending a block of raster data to the printer. All commands are expressed via *Command construct or its short-hand representation if there is no command callback. There is no ordering information in any printing commands and Unidrv5 sends the appropriate commands when needed. It may cache certain settings (such as the current compression mode) to avoid repeatedly sending the same command.

For clarity, all command names start with Cmd prefix. All printing attributes appear at the root level unless there is dependency on printer configurations, in which case they are inside either the *case constructs or the appropriate *Option constructs (where their names must be preceded by EXTERN_GLOBAL: prefix).

GPD loosely divides all printing attributes and commands into four categories. First there is General Printing, which includes entries that affect all types of printing, such as cursor movements. Next is Raster Printing, which includes entries that are specific to raster graphics printing. Third is Text Printing, which includes entries that are specific to downloading fonts and device font printing.

The following defines the printing attributes and commands by category.

General Printing: Printer Capabilities

| Entry Name | Description | Comment |
|---|---|---|
| *RotateCoordinate? | Boolean, which describes whether the printer can rotate the coordinate system to fit the logical orientation, i.e. whether it has command to set the logical orientation. Note that if the printer has both LANDSCAPE_90 and LANDSCAPE_270 orientations, then the value of this entry applies to both landscape orientations. It cannot appear inside *switch/*case constructs. | Optional. If missing, assume FALSE, i.e. the printer cannot rotate the coordinate system to fit the logical orientation, such as all dot-matrix printers. |
| *RotateRaster? | Boolean, which describes whether the printer can automatically rotate the raster data to fit the logical orientation. If *RotateCoordinate? entry is FALSE, this entry must be FALSE too. Note that if the printer has both LANDSCAPE_90 and LANDSCAPE_270 orientations, then the value of this entry applies to both landscape orientations. | Optional. If missing, assume FALSE, such as for all dot-matrix printers. |
| *TextCaps | LIST(TC_OP_CHARACTER, TC_OP_STROKE, TC_CP_STROKE, TC_CR_90, , TC_CR_SF_X_YINDEP, TC_SA_DOUBLE, TC_SA_INTEGER, TC_SA_CONTIN, TC_EA_DOUBLE, TC_IA_ABLE, TC_UA_ABLE, TC_SO_ABLE, TC_RA_ABLE, TC_VA_ABLE), list of the printer's text capabilities. These constants map directly to the capability flags defined by Windows. | Optional. If missing, assume empty list. Only 90-degree rotation is supported for device fonts. |
| *RotateFont? | Boolean, which describes whether the printer can automatically rotate fonts to fit the logical orientation. If *RotateCoordinate? entry is FALSE, this entry must be FALSE too. Note that if the printer has both LANDSCAPE_90 and LANDSCAPE_270 orientations, then the value of this entry applies to both landscape orientations. It cannot appear inside *switch/*case constructs. | Optional. If missing, assume FALSE, such as for all dot-matrix printers. |
| *ReselectFont | LIST(AFTER_GRXDATA, AFTER_XMOVE, AFTER_FF) this keyword allows you to specify which operations require the driver to reselect the current font. AFTER_GRXDATA means the driver must reselect the font after graphic data is emitted using any of the CmdSendxxxData commands. AFTER_XMOVE means the | Optional: if missing assume fonts do not need to be reselected. |

-continued

| Entry Name | Description | Comment |
|---|---|---|
| *MemoryUsage | font must be reselected after X movement commmands. AFTER_FF means the font must be reselected after CmdFF (formfeed). LIST(FONT, RASTER, VECTOR), which lists what types of items consume printer memory defined in the Memory feature. If a listed type is not applicable, it is ignored. For example, if LIST(FONT, RASTER, VECTOR) is specified and the printer does not support vector graphics, then it is equivalent to LIST(FONT, RASTER). | Required if Memory feature is defined. |

General Printing: Cursor Control

| Entry Name | Description | Comment |
|---|---|---|
| *CursorXAfterCR | Constant (AT_PRINTABLE_X_ORIGIN, or AT_CURSOR_X_ORIGIN), the cursor X position after sending a carriage return. | Optional. If missing, assume AT_CURSOR_X_ORIGIN, i.e., CmdCR will move the cursor X to the physical 0 position. |
| *BadCursorMoveInGrxMode | LIST(X_PORTRAIT, X_LANDSCAPE, Y_PORTRAIT, Y_LANDSCAPE), the list of illegal cursor movements in raster graphics mode. For example, X_PORTRAIT means X movement is not allowed in raster mode at Portrait orientation. | Optional. If missing, assume empty list, i.e no restriction. |
| *YMoveAttributes | LIST(FAVOR_LF, SEND_CR_FIRST), the list of special attributes pertaining to Y-move commands. | Optional. If missing, assume empty list. |
| *UseSpaceForXMove? | Boolean, can space characters be used to perform X movements? If FALSE, only NULL characters are used. | Optional. If missing, assume TRUE. If TRUE the driver will use SPACES for coarse moves and NULLs for fine moves. |
| *MaxLineSpacing | Integer, the maximum line spacing value (in master Y unit). | Optional. If missing, assume Infinite, i.e. there is no limit. |
| *EjectPageWithFF? | Boolean, whether the printer uses FormFeed to eject a page. | Optional. If missing, assume FALSE. |
| *XMoveThreshold | Integer (positive), the threshold (in X master unit) above which CmdXMoveAbsolute is used instead ofCmdXMoveRelLeft or CmdXMoveRelRight. This is applicable only if both absolute and relative X-move commands are specified. | Optional. If missing, assume 0 threshold, i.e. CmdXMoveAbsolute is always used. The special value, *, can be used to specify preference for relative X-move commands. |
| *YMoveThreshold | Same as above except substituting "Y" for "X". | Same as above except substituting "Y" for "X". |
| *XMoveUnit | Integer (positive). The unit is expressed in dots per inch. For example, if the printer's X-move unit is 1/60", then this entry should be 60. Note that the X movement unit must factor evenly into the master X unit. | Required if there is any X-move commands (either absolute or relative). |
| *YMoveUnit | Same as above except substituting "Y" for "X". | Same as above except substituting "Y" for "X". |
| CmdXMoveAbsolute | Quoted string, the command to move to an absolute X position. | Optional. This command can have only one parameter which specifies the movement amount. |
| CmdXMoveRelLeft | Quoted string, the command to move left relative to the current cursor X position. | Same as above. |
| CmdXMoveRelRight | Quoted string, the command to move right relative to the current cursor X position. | Same as above. |
| CmdYMoveAbsolute | Quoted string, the command to move to an absolute Y position. | Same as above. |

-continued

| Entry Name | Description | Comment |
|---|---|---|
| CmdYMoveRelUp | Quoted string, the command to move up relative to the current cursor Y position. | Same as above. |
| CmdYMoveRelDown | Quoted string, the command to move down relative to the current cursor Y position. | Same as above. |
| CmdSetLineSpacing | Quoted string, the command to set the distance of a line spacing command. | Optional. |
| CmdCR | Quoted string, the command to return the cursor X to the leftmost position (carriage-return). | Required. |
| CmdLF | Quoted string, the command to move the cursor Y to the next line (line-feed). The amount of movement is determined by the current line spacing value. | Required. |
| CmdFF | Quoted string, the command for ejecting a page (form-feed). | Required. |
| CmdSetSimpleRotation | Quoted string, the command to set the rotation angle in multiples of 90 degrees (counter-clockwise). | Optional. This command can be superseded by CmdSetAnyRotation if the printer supports arbitrary-degree rotation. |
| CmdSetAnyRotation | Quoted string, the command to set the rotation angle in counter-clockwise direction | optional. If missing, assume the printer does not support arbitrary angle rotation |
| CmdUniDirectionOn | Quoted string, the command to enable uni-directional printing. | Optional. If missing, always use the default printing mode. |
| CmdUniDirectionOff | Quoted string, the command to disable uni-directional printing. | |
| CmdPushCursor | Quoted string, the command to push the current cursor position onto the stack for later retrieval. | Optional. |
| CmdPopCursor | Quoted string, the command to pop the last cursor position on the stack and restore it as the current cursor position. | Optional. |
| CmdBackSpace | Quoted string, the command to backspace a single character width. The printer must be able to move the cursor back the width of the last printed character with this command. | Optional. This is used only for printing over-strike characters. |

General Printing: Color

| Entry Name | Description | Comment |
|---|---|---|
| *EnableGDIColorMapping? | Boolean, shall GDI perform gamut mapping from display to printer colorspace? The printer colorspace is defined by the COLORINFO structure and some GPD keywords. | Optional. If missing, assume FALSE. This keyword sets the HT_FLAG_DO_DEVCLR_XFORM flag in GDIINFO. |
| *ChangeColorModeOnPage? | Boolean, whether a color printer can change the color mode (such as monochrome vs. CMYK, or CMY vs. 24bpp) on a page without other side effects such as page ejection. | Optional. If missing, assume FALSE, i.e. the driver cannot change the color printing mode within a page. This is used to optimize printing speed. |
| *ChangeColorModeOnDoc? | Boolean, whether a color printer can change the color mode from one page to another page within one document without other side effects. | Optional. If missing, assume TRUE. |
| *MagentaInCyanDye | Integer (0–1000), ink impurity adjustment to specify magenta contamination in cyan dye. | Optional. If missing, assume −1 to utilize internal defaults. Specify value as 100 * percent contamination (i.e. 8.4% as 840). |
| *YellowInCyanDye | Integer (0–1000), ink impurity adjustment to specify yellow contamination in cyan dye. | Same as above. |
| *CyanInMagentaDye | Integer (0–1000), ink impurity adjustment to specify cyan contamination in magenta dye. | Same as above. |

| Entry Name | Description | Comment |
|---|---|---|
| *YellowInMagentaDye | Integer (0–1000), ink impurity adjustment to specify yellow contamination in magenta dye. | Same as above. |
| *CyanInYellowDye | Integer (0–1000), ink impurity adjustment to specify cyan contamination in yellow dye. | Same as above. |
| *MagentaInYellowDye | Integer (0–1000), ink impurity adjustment to specify magenta contamination in yellow dye. | Same as above. |
| CmdSelectBlackColor | Quoted string, command to select black color for the foreground. The foreground color is used to print text and vector graphics (if available). | Optional. This set of 8 primary color selection commands are used by planar color printers (such as dot-matrix printers) and palette color printers which does not support programmable color palettes (such as early ink jet printers). |
| CmdSelectRedColor | Quoted string, command to select red color for the foreground. | Same as above. |
| CmdSelectGreenColor | Quoted string, command to select green color for the foreground. | Same as above. |
| CmdSelectYellowColor | Quoted string, command to select yellow color for the foreground. | Same as above. |
| CmdSelectBlueColor | Quoted string, command to select blue color for the foreground. | Same as above. |
| CmdSelectMagentaColor | Quoted string, command to select magenta color for the foreground. | Same as above. |
| CmdSelectCyanColor | Quoted string, command to select cyan color for the foreground. | Same as above. |
| CmdSelectWhiteColor | Quoted string, command to select white color for the foreground. | Same as above. |
| CmdBeginPaletteDef | Quoted string, the command to initialize color palette definition. | Optional. For palette printing modes, if this entry is missing, it means there is no required initialization. This set of palette commands are used by color printers which supports programmable palettes that can be used for both the foreground (i.e. text and vector graphics) and raster printing. |
| CmdEndPaletteDef | Quoted string, the command to finish color palette definition. | Optional. For palette printing modes, if it is missing, it means there is nothing to be done. |
| CmdDefinePaletteEntry | Quoted string, the command to define a color palette entry. | Optional, but required for palette printing modes. |
| CmdSelectPaletteEntry | Quoted string, the command to select a color palette entry as the current color. | Optional, but required for palette printing modes. |
| CmdSelectBlackBrush | Quoted string, the command to select a solid black brush as the current brush. | Required. |
| CmdSelectWhiteBrush | Quoted string, the command to select a solid white brush as the current brush. | Optional. For devices that supports white solid brush. |
| CmdDownloadPattern | Quoted string, the command to download a pattern brush to the device. | Optional. If defined, CmdSelectPattern must also be defined. |
| CmdSelectPattern | Quoted string, the command to select a downloaded pattern brush as the current brush. | Optional. If defined, CmdDownloadPattern must also be defined. |

General Printing: Overlay

Some printers support overlays (a.k.a. watermarks) which should be treated like fonts in the sense that it is a type of resources that can be downloaded once to the printer and then referenced many times. Only one overlay pattern can be selected at the beginning of each page. Here are the attributes and commands associated with printing overlays:

| Entry Name | Description | Comment |
|---|---|---|
| *MinOverlayID | integer, minimum id for downloading an overlay pattern. | Optional. If missing, assume 1. |
| *MaxOverlayID | integer, maximum id for downloading an overlay pattern. | Optional. If missing, assume no limit. |

| Entry Name | Description | Comment |
|---|---|---|
| CmdOverlayRegStart | quoted string, command for starting the overlay registration. Typically, it sets the overlay id. The overlay pattern data are downloaded next. | Optional. If missing, assume no support for overlays. |
| CmdOverlayRegEnd | quoted string, command for ending the overlay registration. This is sent right after the overlay pattern data. | Optional. If missing, assume no support for overlays. |
| CmdEnableOverlay | quoted string, command for selecting a downloaded overlay pattern (typically via id). This command should be sent at the beginning of a page. | Optional. If missing, assume no support for overlays. |
| CmdDisableOverlay | quoted string, command for disabling the use of any overlay. This command should be sent at the beginning of a page. | Optional. If missing, assume no support for overlays. |

Just like font installers, there should be an overlay manager which provides the user interface to create, locate and install overlay pattern files. The driver would copy the content of this file after sending the command CmdSetOverlayID.

Raster Printing: Data Compression

Unidrv5 assumes that the printer's raster data compression mode can be turned on or off independently of other raster commands, such as CmdSendBlockData. The current compression method is part of the printer's global state information. It is also assumed that once a compression method is selected, it remains in effective until another method is selected or the compression is disabled.

Unidrv5 supports a set of standard raster data compression algorithms. They preferably include TIFF4.0 and Delta-Row Compression (DRC) as defined in HP/PCL reference manual as well as Far East run length encoding (FERLE). These methods as well as OEM supplied compression can be intermixed on a per scanline basis. The GPD allows OEM's to define custom compression algorithms via the OEMCompression callback. At most one custom compression method can be specified per printer configuration. When a custom method is used, Unidrv5 would utilize the OEMCompression callback to compress the raster data and then compare it against the compressed size of any other active compression mode and use the most efficient method.

When CmdEnableOEMComp is specified, Unidrv5 expects the OEM DLL to provide the following callback function:

DWORD OEMCompression(
PBYTE pInBuf, //pointer to the input buffer containing the original raster data
PBYTE pOutBuf, //pointer to the output buffer for the compressed data
DWORD dwInLen, //the length of the input data to compress
DWORD dwOutLen, //the size of the output buffer (in bytes)
)

The return value is the length of the compressed data in bytes. This function should return zero if the output buffer is not big enough to hold the compressed data. Typically, Unidrv5 would start with an output buffer the same size as the input buffer. If the return value is greater than the input buffer size, Unidrv5 would issue the command CmdDisableCompression and send the uncompressed data. When there are multiple compression methods specified (treating no-compression as a special compression method), the most compressed method is used on per scanline/block basis.

On some FE printers, the compression selection is mingled with sending data. In that case, only one compres-

| Entry Name | Description | Comments |
|---|---|---|
| CmdEnableTIFF4 | Quoted string, command to select TIFF4.0 raster data compression. | Optional. If missing, Unidrv5 will not attempt TIFF4.0 compression. |
| CmdEnableDRC | Quoted string, command to select delta-row raster data compression. | Optional. If missing, Unidrv5 will not attempt DRC. If both TIFF4 and DRC commands are listed, Unidrv5 will choose the optimal compression on per scanline basis. |
| CmdEnableFE_RLE | Quoted string, command to select FE-RLE raster data compression. | Optional. If missing, Unidrv5 will not use FE-RLE compression. |
| CmdEnableOEMComp | Quoted string, command to select an OEM defined raster data compression algorithm. | Optional. Note that it does not make sense for this command to co-exist with the standard TIFF4 or DRC command for any printer configuration. |
| CmdDisableCompression | Quoted string, command to disable any raster data compression, including both standard and custom methods. | Optional. | sion method can be used. The compression selection should be hardcoded in CmdSendBlockData or other similar data emission commands. The corresponding compression selection command should be an empty quoted string. There should be no *CmdDisableCompression entry because there is no way to turn off compression.

Raster Printing: Raster Data Emission

| Entry Name | Description | Comments |
|---|---|---|
| *OutputDataFormat | Constant(H_BYTE or V_BYTE), the output data direction, i.e. whether the bits in a data byte are mapped to horizontal pixels or vertical pixels. | Optional. If missing, assume H_BYTE. For example, all page printers use H_BYTE format. |
| *OptimizeLeftBound? | Boolean, whether to remove blanks at the left bound of a band. | Optional. If missing, assume no optimization. |
| *StripBlanks | LIST(LEADING, ENCLOSED, TRAILING), the ways to strip blanks in a raster data block. | Optional. If missing, assume empty list, i.e. no blank stripping. Note that if any compression (such as TIFF4) is specified, it's usually more efficient not to request stripping enclosed blanks. |
| *RasterSendAllData? | Boolean, whether the driver should send all color plane raster data regardless of blank scanlines or blanks within a scanline. | Optional. If missing, Unidrv5 assumes FALSE. |
| *MirrorRasterByte? | Boolean, whether the driver mirrors a raster image per 8 bits. | Optional. If missing, Unidrv5 assumes FALSE. |
| *CursorXAfterSendBlockData | Constant (AT_GRXDATA_END, AT_GRXDATA_ORIGIN, or AT_CURSOR_X_ORIGIN), the cursor X position after sending a block of raster graphics data. | Optional. If missing, assume AT_GRXDATA_END, i.e. the cursor X moves to the pixel after the last pixel of the graphics block. |
| *CursorYAfterSendBlockData | Constant (NO_MOVE, AUTO_INCREMENT), the cursor Y position after sending a block of raster data. | optional. If missing, assume NO_MOVE, i.e. the cursor Y stays at the original position. |
| *UseExpColorSelectCmd? | Boolean, whether color selection commands are separate from the commands to send color raster data. | Optional. If missing, assume FALSE. For all dot-matrix printers, this field is TRUE. |
| *MoveToX0BeforeSetColor? | Boolean, whether moving to the physical X=0 before sending the explicit color selection command. | Optional. If missing, assume FALSE. This field makes sense only if*UseExpColorSelectCmd? is TRUE. |
| CmdBeginRaster | Quoted string, the command to initialize raster data transfer. | optional. If missing, it implies that no initialization is needed. |
| CmdEndRaster | Quoted string, the command to finish raster data transfer. It is used in pairs with *CmdBeginRaster | optional. If missing, it means there is nothing to be done when raster data transfer is completed. |
| CmdSetDestBmpWidth | Quoted string, command to set the destination bitmap width. | Applicable only to printers which can scale raster graphics. |
| CmdSetDestBmpHeight | Quoted string, command to set the destination bitmap height. | Same as above. |
| CmdSetSrcBmpWidth | Quoted string, command to set the source bitmap width | Same as above. |
| CmdSetSrcBmpHeight | Quoted string, command to set the source bitmap height. | Same as above. |
| CmdSendBlockData | Quoted string, the command to send one block of data to the printer. One block of data fills one physical pass of the print head. For V_BYTE type printers, one block has *PinsPerPhysPass number of scanlines. For H_BYTE type printers, one block has *PinsPerLogPass number of scanlines. | Required unless the printer type is TTY (text only). |
| CmdEndBlockData | Quoted string, the command to end sending one block of data to the printer. This command is sent after the raster data. This is used on some dot-matrix printers. | Optional. If missing, assume NULL. |
| *SendMultipleRows? | Boolean, whether CmdSendBlockData can send multiple blocks in one shot. This is used only by H_BYTE type printers. | Optional. If missing, assume FALSE. |
| CmdSendRedData | Quoted string, the command to send red plane data. | Required if planar color printing is used. |
| CmdSendGreenData | Quoted string, the command to send green plane data. | Same as above. |
| CmdSendBlueData | Quoted string, the command to send blue plane data. | Same as above. |

-continued

| Entry Name | Description | Comments |
| --- | --- | --- |
| CmdSendCyanData | Quoted string, the command to send cyan plane data. | Same as above. |
| CmdSendMagentaData | Quoted string, the command to send magenta plane data. | Same as above. |
| CmdSendYellowData | Quoted string, the command to send yellow plane data. | Same as above. |
| CmdSendBlackData | Quoted string, the command to send black plane data. | Same as above. |

Text Printing: Device Fonts

| Entry Name | Description | Comments |
| --- | --- | --- |
| *DefaultFont | Integer, the Windows RC_FONT resource id of the default font. | Required, if the printer supports any device fonts. |
| *MaxFontUsePerPage | Integer, the limit on the number of fonts (resident or downloaded) that the printer can use on a page. | Optional. If missing, assume no limit. |
| *DefaultCTT | Integer, the Windows RC_CTT resource id of the default character translation table. This entry is provided only for backward compatibility with GPC. | Optional. If missing, assume 0, i.e. no translation. |
| *LookaAheadRegion | Integer, the number of pixels (in master Y unit) that the driver needs to look ahead when determining whether it should emit text. This is applicable only to serial printers, inkjet printers in particular. | Optional. If missing, assume 0. |
| *TextYOffset | Integer, the Y distance (in master Y unit) by which to reposition printer-resident fonts in order to align correctly with baselines of bitmap fonts. This is used on some dot-matrix printers. | Optional. If missing, assume 0. |
| *CharPosition | Constant (UPPERLEFT, BASELINE), where the print head should be positioned before printing a character. | Optional. If missing, assume UPPERLEFT, i.e. Unidrv5 would position the print head at the upper left corner of the character bounding box before printing it. |

Text Printing: Font Downloading

| Entry Name | Description | Comments |
| --- | --- | --- |
| *MinFontID | <integer>, the minimum id for soft fonts. | Optional. If missing, assume 1. |
| *MaxFontID | <integer>, the maximum id for soft fonts. | Optional. If missing, assume 65535. |
| *MaxNumDownFonts | Integer, the maximum number of downloaded soft fonts that can be stored on the printer at any time. | Optional. If missing, assume no limit. |
| *DLSymbolSet | Constant(PC_8, ROMAN_8), the symbol set to be used when downloading TrueType fonts. | Optional. If missing, assume the glyph id range is contiguous as specified by *MinGlyphID and *MaxGlyphID. |
| *MinGlyphID | <integer>, the minimum id for downloaded font glyphs. | Optional. If missing, assume 32 if *DLSymbolSet is missing. Ignored if DLSymbolSet is defined. |
| *MaxGlyphID | <integer>, the maximum id for downloaded font glyphs. | Optional. If missing, assume 255 if *DLSymbolSet is missing. Ignored if DLSymbolSet is defined. |
| CmdSetFontID | Quoted string, the command to set the current font id. | Optional. If missing, assume that there is no font downloading support on the printer. |
| CmdDeselectFontID | Quoted string, the command to deselect a font id, i.e. make that font inactive. | Optional, If missing assume that the current font need not be deselected when selecting a new font. |

-continued

| Entry Name | Description | Comments |
|---|---|---|
| CmdSelectFontID | Quoted string, the command to select a font id, i.e. make that font active. | Optional. If missing, assume that there is no font downloading support on the printer. |
| CmdSetCharCode | Quoted string, the command to set the current character code whose data will be sent immediately after. | Same as above CmdSetFontID, CmdSelectFontID and CmdSetCharCode are bounded as a group, i.e. they must all exist or none at all. |
| CmdSelectFontHeight | Quoted string, the command to select font height. | Optional, If missing assume that printer does not support scaleable, downloadable True Type outline fonts. This command is needed for HPPCL_OUTLINE format. |
| CmdSelectFontWidth | Quoted string, the command to select font Width. | Optional, If missing assume that width of downloaded font is scaled proportionally to the font height. |
| *FontFormat | Constant (HPPCL, HPPCL_RES, HPPCL_OUTLINE, OEM_CALLBACK), the font downloading format. | Required if the printer supports font downloading. If OEM_CALLBACK is specified, the corresponding callback functions must be provided in the OEM extension dll. |
| CmdDeleteFont | Quoted string, the command to delete a temporary soft font by id. | Optional. If this entry is specified, Unidrv5 assumes that when a font is deleted, its memory can be reclaimed immediately. Otherwise, this entry should not be defined. |

Font Printing: Font Simulation

| Entry Name | Description | Comments |
|---|---|---|
| CmdSetFontSim | Quoted string, the command to set italic/bold/underline/strike-through simulation in one shot. | Optional. If present, Unidrv5 assumes that the printer cannot remember any attribute state information and must be set each time a font is used. |
| CmdClearAllFontAttribs | Quoted string, one command that will set all Bold, Italic and Underline attributes OFF. | If the printer supports Bold, Italic or Underlining, but does not support the commands to turn individual attributes off, this command may be defined in place of the individual commands CmdBoldOff, CmdItalicOff, CmdUnderlineOff. |
| CmdBoldOn | Quoted string, the command to set bold attribute ON. | Optional. If present, Unidrv5 assumes that the printer can set bold attribute independently and that once it is set, it remains effective until the opposite command (i.e. CmdBoldOff) is sent to change the state. |
| CmdBoldOff | Quoted string, the command to set bold attribute OFF. | Optional, but it must be paired with CmdBoldOn command. |
| CmdItalicOn | Quoted string, the command to set italic attribute ON. | Similar to CmdBoldOn. |
| CmdItalicOff | Quoted string, the command to set italic attribute OFF. | Similar to CmdBoldOff. |
| CmdUnderlineOn | Quoted string, the command to set underline attribute ON. | Similar to CmdBoldOn. |
| CmdUnderlineOff | Quoted string, the command to set underline attribute OFF. | Similar to CmdBoldOff. |
| CmdStrikeThruOn | Quoted string, the command to set strike-through attribute ON. | Similar to CmdBoldOn. |
| CmdStrikeThruOff | Quoted string, the command to set strike-through attribute OFF. | Similar to CmdBoldOff. |
| CmdWhiteTextOn | Quoted string, the command to enable white text printing. | Optional. This is for backward compatibility with GPC 3.0. |
| CmdWhiteTextOff | Quoted string, the command to disable white text printing. | Optional, but it must be paired with CmdWhiteTextOff. |
| CmdSelectSingleByteMode | Quoted string, the command to select single-byte printing mode. This is used on FE printers. | Optional. If missing, assume there is no mode switching for text printing. |
| CmdSelectDoubleByteMode | Quoted string, the command to select double-byte printing mode. This is used on FE printers. | Optional, but it must be paired with CmdSelectSingleByteMode. |

-continued

| Entry Name | Description | Comments |
|---|---|---|
| *DiffFontsPerByteMode? | Boolean, whether the single-byte mode and the double-byte mode maintain separate states regarding the current font and current font simulation attributes. | Optional. If missing, assume FALSE. |
| CmdVerticalPrintingOn | Quoted string, the command to enable vertical printing mode. This is used on FE printers. | Optional. If missing, assume that the vertical printing is not supported on the printer. |
| CmdVerticalPrintingOff | Quoted string, the command to disable vertical printing mode. This is used on FE printers | Optional, but it must be paired with CmdVerticalPrintingOff. |
| CmdBoldOff | Quoted string, the command to set bold attribute OFF. | Optional, but it must be paired with CmdBoldOn command. |
| CmdItalicOn | Quoted string, the command to set italic attribute ON. | Similar to CmdBoldOn. |
| CmdItalicOff | Quoted string, the command to set italic attribute OFF. | Similar to CmdBoldOff. |
| CmdUnderlineOn | Quoted string, the command to set underline attribute ON. | Similar to CmdBoldOn. |
| CmdUnderlineOff | Quoted string, the command to set underline attribute OFF. | Similar to CmdBoldOff. |
| CmdStrikeThruOn | Quoted string, the command to set strike-through attribute ON. | Similar to CmdBoldOn. |
| CmdStrikeThruOff | Quoted string, the command to set strike-through attribute OFF. | Similar to CmdBoldOff. |
| CmdWhiteTextOn | Quoted string, the command to enable white text printing. | Optional. This is for backward compatibility with GPC 3.0 |
| CmdWhiteTextOff | Quoted string, the command to disable white text printing. | Optional, but it must be paired with CmdWhiteTextOff. |
| CmdSelectSingleByteMode | Quoted string, the command to select single-byte printing mode. This is used on FE printers. | Optional. If missing, assume there is no mode switching for text printing. |
| CmdSelectDoubleByteMode | Quoted string, the command to select double-byte printing mode. This is used on FE printers. | Optional, but it must be paired with CmdSelectSingleByteMode. |
| *DiffFontsPerByteMode? | Boolean, whether the single-byte mode and the double-byte mode maintain separate states regarding the current font and current font simulation attributes. | Optional. If missing, assume FALSE. |
| CmdVerticalPrintingOn | Quoted string, the command to enable vertical printing mode. This is used on FE printers. | Optional. If missing, assume that the vertical printing is not supported on the printer. |
| CmdVerticalPrintingOff | Quoted string, the command to disable vertical printing mode. This is used on FE printers. | Optional, but it must be paired with CmdverticalPrintingOff. |

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure and implementation of the various components described above can be varied substantially without departing from the spirit of the invention, and exclusive use of all modifications that come within the scope of the appended claims is reserved.

What is claimed is:

1. A computer system for outputting data to an output device, comprising:

an application program for invoking a plurality of graphics device interface functions to control the sending of data to the output device;

a graphics device interface for invoking a plurality of device driver functions for controlling the outputting of data in response to the invocation of the plurality of graphics device interface functions;

a text based minidriver containing a text based characterization of the output device, the text based characterization containing an implementation of device specific device driver functions invoked by the graphic device interface, the text based minidriver including means for outputting the text based characterization; and a modular universal driver which incorporates the text based characterization passed by the text based minidriver, the modular universal driver implementing the device specific driver functions to control the outputting of data to the output device in accordance with the incorporated text based characterization.

2. The computer system of claim 1, wherein the modular universal driver provides a standard user interface for user selection and control of device specific driver functions, wherein the text based minidriver provides output device specific user interface information relating to device specific device driver functions, and wherein the universal driver incorporates the output device specific user interface information in the standard user interface provided thereby.

3. The computer system of claim 1, wherein the output device specific user interface information contains information for generating a separate user interface page, and wherein the universal driver adds the separate user interface page to the standard user interface provided thereby.

4. The computer system of claim 1, wherein the modular universal driver provides a standard user interface for user selection and control of device specific driver functions, and wherein the text based minidriver provides output device specific user interface information relating to device specific device driver functions, and wherein the universal driver replaces the standard user interface with a device specific user interface generated from the output device specific user interface information.

5. A computer system for outputting data to an output device, comprising:

an application program for invoking a plurality of graphics device interface functions to control the sending of data to the output device;

a graphics device interface for invoking a plurality of device driver functions for controlling the outputting of data in response to the invocation of the plurality of graphics device interface functions;

a text based minidriver containing a text based characterization of the output device, the text based characterization containing an implementation of device specific device driver functions invoked by the graphic device interface, the text based minidriver including means for outputting the text based characterization;

a modular universal driver which incorporates the text based characterization passed by the text based minidriver, the modular universal driver implementing the device specific driver functions to control the outputting of data to the output device in accordance with the incorporated text based characterization; and wherein the text based minidriver contains at least one installable device specific device driver function, and wherein the text based minidriver provides output device specific user interface information relating to installed device specific device driver functions, and wherein the universal driver utilizes the information relating to installed device specific device driver functions to display only installed device specific device driver functions on the user interface.

6. The computer system of claim 1, wherein the text based minidriver further includes at least one function rendering module for implementing certain device specific driver functions to control the outputting of data to the output device, and wherein the modular universal driver allows the function rendering module to control the outputting of data to the output device for the certain device specific driver functions.

7. The computer system of claim 1, wherein the text based minidriver further includes at least one function rendering module, and wherein the modular universal driver incorporates the function rendering module to modify the implementation of certain device specific driver functions to control the outputting of data to the output device.

8. The computer system of claim 1, wherein the text based minidriver further includes a function rendering module, and wherein the modular universal driver incorporates the function rendering module to replace the implementation of the device specific driver functions provided by the universal driver to control the outputting of data to the output device.

9. The computer system of claim 1, wherein the text based characterization includes dependencies between certain device specific device driver functions.

10. The computer system of claim 1, wherein the text based characterization includes constraints on certain device specific device driver functions.

11. A computer-readable medium having computer-executable modules comprising:

a minidriver rendering module containing a text based characterization of an output device, the text based characterization containing an implementation of device specific device driver functions invoked by a graphic device interface; and a unidriver rendering module for implementing the device specific driver functions to control the outputting of data to the output device in accordance with the text based characterization.

12. The computer-readable medium of claim 11, wherein the minidriver rendering module contains data for implementing certain device specific driver functions to control the outputting of data to the output device, and wherein the unidriver rendering module allows the minidriver rendering module to control the outputting of data to the output device for the certain device specific driver functions.

13. The computer-readable medium of claim 11, wherein the minidriver rendering module contains data for implementing certain device specific driver functions to control the outputting of data to the output device, and wherein the unidriver rendering module incorporates the data from the minidriver rendering module to modify the implementation of certain device specific driver functions to control the outputting of data to the output device.

14. The computer-readable medium of claim 11, wherein the minidriver rendering module contains data for implementing device specific driver functions to control the outputting of data to the output device, and wherein the unidriver rendering module incorporates the function rendering module to replace the implementation of the device specific driver functions provided by the unidriver rendering module to control the outputting of data to the output device.

15. The computer-readable medium of claim 11, further comprising:

a minidriver user interface module for providing output device specific user interface information relating to device specific device driver functions; and a unidriver user interface module for providing a standard user interface for user selection and control of device specific driver functions, the unidriver user interface module incorporating the output device specific user interface information in the standard user interface provided thereby.

16. The computer-readable medium of claim 15, wherein the output device specific user interface information contains information for generating a separate user interface page, and wherein the unidriver user interface module adds the separate user interface page to the standard user interface provided thereby.

17. The computer-readable medium of claim 11, further comprising:

a minidriver user interface module for providing output device specific user interface information relating to device specific device driver functions; and a unidriver user interface module for providing a standard user interface for user selection and control of device specific driver functions, the unidriver user interface module replacing the standard user interface with the output device specific user interface information provided by the minidriver user interface module.

18. A method of characterizing a printer device to allow its inclusion in a computer system having an application program which invokes graphic device interface functions to control the outputting of printable data, and an universal driver for implementing device specific functions based on characterization information for the particular printer device, the device specific functions controlling the outputting of data in accordance with the characterization information to allow proper printing and control of the printer device, the method comprising the steps of:

opening a text editor;

creating a text based minidriver using the text editor, the text based minidriver containing a text based characterization of the printer device, the text based characterization containing an implementation of printer device specific device driver functions invoked by the graphic device interface, the text based minidriver including means for outputting the text based characterization to the universal driver; and installing the text based minidriver.

19. The method of claim 18, wherein the step of creating a text based minidriver comprises the steps of:

creating a text based rendering module including implementations of printer device specific device driver functions; and creating a text based user interface module including output device specific user interface information relating to printer device specific device driver functions.

20. A method of modifying a printer minidriver characterizing a printer device to allow its inclusion in a computer system having an application program which invokes graphic device interface functions to control the outputting of printable data, and an universal driver for implementing device specific functions based on characterization information for the particular printer device provided by the minidriver, the device specific functions controlling the outputting of data in accordance with the characterization information to allow proper printing and control of the printer device, the method comprising the steps of:

opening the minidriver in a text editor;

modifying the minidriver;

saving the minidriver in the text editor; and installing the minidriver.

21. The method of claim 20, wherein the step of modifying the minidriver comprises the step of adding a new feature to the printer characterization.

22. The method of claim 20, wherein the step of modifying the minidriver comprises the step of specifying a dependency between printer settings.

* * * * *